United States Patent
Iizuka et al.

(10) Patent No.: US 7,064,754 B2
(45) Date of Patent: Jun. 20, 2006

(54) STEREOSCOPIC-IMAGE DISPLAY APPARATUS

(75) Inventors: Yoshio Iizuka, Kanagawa-ken (JP); Tomoaki Kawai, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 387 days.

(21) Appl. No.: 10/699,801

(22) Filed: Nov. 4, 2003

(65) Prior Publication Data

US 2004/0090445 A1   May 13, 2004

Related U.S. Application Data

(62) Division of application No. 09/671,514, filed on Sep. 26, 2000, now Pat. No. 6,657,655.

(30) Foreign Application Priority Data

Sep. 30, 1999  (JP) .................................. 11-279322
Jan. 31, 2000  (JP) ............................. 2000-022946

(51) Int. Cl.
*G06T 15/00* (2006.01)
(52) U.S. Cl. ........................................ 345/419; 348/47
(58) Field of Classification Search ........ 345/419–420, 345/7–8; 348/47–52, 56–61
See application file for complete search history.

(56) References Cited

U.S. PATENT DOCUMENTS

| | | | |
|---|---|---|---|
| 5,499,362 A | 3/1996 | Kawai et al. | 395/109 |
| 5,993,001 A | 11/1999 | Bursell et al. | 351/212 |
| 6,023,277 A | 2/2000 | Osaka et al. | 345/419 |
| 6,031,565 A | 2/2000 | Getty et al. | 348/56 |
| 6,278,480 B1 | 8/2001 | Kurahashi et al. | 348/59 |
| 6,366,281 B1 | 4/2002 | Lipton et al. | 345/419 |
| 6,657,655 B1 * | 12/2003 | Iizuka et al. | 348/47 |

* cited by examiner

*Primary Examiner*—Phu K. Nguyen
(74) *Attorney, Agent, or Firm*—Fitzpatrick, Cella, Harper & Scinto

(57) ABSTRACT

A stereoscopic-image display apparatus displays a stereoscopic image by inputting a character string of a portion common to two image-file names corresponding to an arbitrary pair of stereoscopic images when selecting the pair of stereoscopic images from a plurality of image files, each corresponding to a pair of images for the left eye and the right eye, adding an identifier for a left eye or a right eye to the input character string, reading two image files having the identifier as a pair of stereoscopic images for the left eye and the right eye, and displaying the pair of stereoscopic images.

21 Claims, 41 Drawing Sheets

FIG.6

| C:¥scene1¥take1l. bmp | C:¥scene1¥take1r. bmp |
| C:¥scene1¥take2l. bmp | C:¥scene1¥take2r. bmp |
| C:¥scene1¥take3l. bmp | C:¥scene1¥take3r. bmp |
| C:¥scene1¥take4l. bmp | C:¥scene1¥take4r. bmp |
| C:¥scene1¥take5l. bmp | C:¥scene1¥take5r. bmp |
| ⟨P⟩ | |
| C:¥scene2¥take1l. bmp | C:¥scene2¥take1r. bmp |
| C:¥scene2¥take2l. bmp | C:¥scene2¥take2r. bmp |
| C:¥scene2¥take3l. bmp | C:¥scene2¥take3r. bmp |
| C:¥scene2¥take4l. bmp | C:¥scene2¥take4r. bmp |
| C:¥scene2¥take5l. bmp | C:¥scene2¥take5r. bmp |
| ⟨P⟩ | |
| C:¥scene3¥take1l. bmp | C:¥scene3¥take1r. bmp |
| C:¥scene3¥take2l. bmp | C:¥scene3¥take2r. bmp |
| C:¥scene3¥take3l. bmp | C:¥scene3¥take3r. bmp |
| C:¥scene3¥take4l. bmp | C:¥scene3¥take4r. bmp |
| C:¥scene3¥take5l. bmp | C:¥scene3¥take5r. bmp |

FIG.16A

|        | TAKE1 | TAKE2 | TAKE3 | TAKE4 | TAKE5 |
|--------|-------|-------|-------|-------|-------|
| SCENE1 | (0,0) | (1,0) | (2,0) | (3,0) | (4,0) |
| SCENE2 | (0,1) | (1,1) | (2,1) | (3,1) | (4,1) |
| SCENE3 | (0,2) | (1,2) | (2,2) | (3,2) | (4,2) |

FIG.16B

INFORMATION RELATING TO RAW DATA FILE

FILE-HEADER SIZE (F): [0] BYTE

IMAGE-HEADER SIZE (I): [0] BYTE

WIDTH OF IMAGE (W): [0] PIXEL

HEIGHT OF IMAGE (H): [0] PIXEL

NUMBER OF FRAMES (C): [0]

(0 REPRESENTS AUTOMATIC DETECTION)

COLOR REPRESENTATION
[NUMBER OF SAMPLES PER PIXEL]:

⦿ MONOCHROME [1 SAMPLE] (M)
○ RGB COLOR [3 SAMPLES] (R)

NUMBER OF BITS PER SAMPLE AND SIGN:

⦿ UNSIGNED 8 BITS (1)
○ SIGNED 8 BITS (2)
○ UNSIGNED 16 BITS (3)
○ SIGNED 16 BITS (4)

BYTE ORDER :

⦿ LITTLE ENDIAN (L)
○ BIG ENDIAN (U)

[ OK ]  [ CANCEL ]

FIG.43

| INFORMATION RELATING TO RAW DATA FILE | |
|---|---|
| FILE-HEADER SIZE (F): [0] BYTE | COLOR REPRESENTATION [NUMBER OF SAMPLES PER PIXEL]: |
| IMAGE-HEADER SIZE (I): [0] BYTE | ⦿ MONOCHROME [1 SAMPLE] (M) |
| WIDTH OF IMAGE (W): [0] PIXEL | ○ RGB COLOR [3 SAMPLES] (R) |
| HEIGHT OF IMAGE (H): [0] PIXEL | NUMBER OF BITS PER SAMPLE AND SIGN : |
| NUMBER OF FRAMES (C): [0] | ○ UNSIGNED 8 BITS (1) |
| | ○ SIGNED 8 BITS (2) |
| (0 REPRESENTS AUTOMATIC DETECTION) | ⦿ UNSIGNED 16 BITS (3) |
| | ○ SIGNED 16 BITS (4) |
| | BYTE ORDER : |
| | ⦿ LITTLE ENDIAN (L) |
| OK   CANCEL | ○ BIG ENDIAN (U) |

FIG. 44

STEREOSCOPIC-IMAGE DISPLAY APPARATUS

This is a divisional application of application Ser. No. 09/671,514, filed on Sep. 26, 2000 now U.S. Pat. No. 6,657,655.

BACKGROUND OF THE INVENTION

1. Field of the Invention

The present invention relates to a stereoscopic-image display apparatus and method which allows a user to see a stereoscopic image by displaying an image for the left eye to the left eye of the user and displaying an image for the right eye to the right eye of the user, and to a storage medium storing such a method.

2. Description of the Related Art

Various types of stereoscopic display apparatuses which allow a user to see a stereoscopic image by displaying an image for the left eye to the left eye of the user and displaying an image for the right eye to the right eye of the user have been proposed. For example, in a polarizing-spectacle type, left and right images are displayed using plane-polarized light beams whose wave surfaces are polarized in a horizontal direction and in a vertical direction, respectively, or vice versa, and the user can see a stereoscopic image by wearing polarizing spectacles.

In a liquid-crystal-shutter-spectacle type, left and right images are displayed by being switched with a frequency of at least 90 Hz, more preferably, 120–150 Hz, and the user can see a stereoscopic image by wearing liquid-crystal-shutter spectacles. In a lenticular-lens type, a lenticular lens is attached on a picture surface, and a stereoscopic image is provided by deflecting optical paths so that one of two adjacent points is seen only by the left eye and the other point is seen only by the right eye. There is also a parallax-barrier type, in which fine slits are attached on a picture surface, and a stereoscopic image is provided by arranging so that one of two adjacent points is seen only by the left eye and the other point is seen only by the right eye.

In an HMD (head mounted display) type, a stereoscopic image is provided by displaying an image for the left eye on the left display surface of an HMD and displaying an image for the right eye on the right display surface of the HMD.

However, in the above-described conventional stereoscopic-image display apparatuses, in order to display a stereoscopic image by reading two image files corresponding to a pair of left and right stereoscopic images from a storage device, the user must input a file name of each of the two image files (i.e., the user must input file names twice), thereby requiring time and trouble for inputting the file names.

In order to display a plurality of stereoscopic images, the user must assign pairs of left and right stereoscopic images corresponding to the number of stereoscopic images, thereby requiring an increased burden for the user.

SUMMARY OF THE INVENTION

The present invention has been made in consideration of the above-described problems.

It is an object of the present invention to provide a stereoscopic-image display apparatus and method which can reduce the burden of inputting file names when the user displays a plurality of stereoscopic images, and a storage medium storing such a method.

According to one aspect, the present invention which achieves the above-described object relates to a stereoscopic-image display apparatus for reading and displaying image files of a pair of left and right stereoscopic images. The apparatus includes input means for defining a file name including a portion where a part of a character string regularly changes and a portion where a character string does not change, for each member of a set of image files corresponding to a plurality of images having a parallax between left and right eyes, and for inputting the character string to the portion where the character string does not change, addition means for adding the character string of the regularly changing portion to the character string input by the input means, and image determination means for making images corresponding to file names in each of which the character string has been added by the addition means, to be images corresponding to the left and right eyes.

It is preferable that the image determination means makes images corresponding to an m(a positive integer)-th file name and an n(a positive integer different from m)-th file name to be a first image for the left eye and a first image for the right eye, respectively, and makes images corresponding to an (m+k(k being a positive integer))-th file name and an (n+k)-th file name to be a k-th image for the left eye and a k-th image for the right eye, respectively.

According to another aspect, the present invention which achieves the above-described object relates to a stereoscopic-image display method for reading and displaying image files of a pair of left and right stereoscopic images. The method includes an input step of defining a file name including a portion where a part of a character string regularly changes and a portion where a character string does not change, for each member of a set of image files corresponding to a plurality of images having a parallax between left and right eyes, and for inputting the character string to the portion where the character string does not change, an addition step of adding the character string of the regularly changing portion to the character string input in the input step, and an image determination step of making images whose file names, for each of which the character string is added in the addition step, to be images corresponding to the left and right eyes.

According to still another aspect, the present invention which achieves the above-described object relates to a storage medium storing a program for reading and displaying image files of a pair of left and right stereoscopic images. The program includes an input step of defining a file name including a portion where a part of a character string regularly changes and a portion where a character string does not change, for each member of a set of image files corresponding to a plurality of images having a parallax between left and right eyes, and for inputting the character string to the portion where the character string does not change, an addition step of adding the character string of the regularly changing portion to the character string input in the input step, and an image determination step of making images whose file names, for each of which the character string is added in the addition step, to be images corresponding to the left and right eyes.

According to yet another aspect, the present invention which achieves the above-described object relates to a stereoscopic-image display apparatus for reading and displaying image files of a pair of left and right stereoscopic images. The apparatus includes input means for inputting a character string of a portion common to two image-file names corresponding to an arbitrary pair of stereoscopic images when selecting the stereoscopic images from a plurality of image files, and identifier addition means for adding an identifier for a left eye or a right eye to the character string input by the input means. Two image files having the identifier added by the identifier addition means are read as a pair of stereoscopic images for the left eye and the right eye.

According to yet a further aspect, the present invention which achieves the above-described object relates to a stereoscopic-image display apparatus for reading and displaying image files of a pair of left and right stereoscopic images. The apparatus includes file-name input means for inputting a character string of one of two image-file names corresponding to an arbitrary pair of stereoscopic images when selecting the pair of stereoscopic images from a plurality of image files, identifier replacement means for replacing an identifier for a left eye or a right eye present at a predetermined position in the character string input by the file-name input means with an identifier for the right eye or the left eye, respectively, and reading means for reading two image files having a file name for the left eye or the right eye input by the file-name input means and a file name for the right eye or the left eye where the identifier has been replaced by the identifier replacement means, as a pair of stereoscopic images for the left eye and the right eye.

According to still another aspect, the present invention which achieves the above-described object relates to a stereoscopic-image display method for reading and displaying image files of a pair of left and right stereoscopic images. The method includes an input step of inputting a character string of a portion common to two image-file names corresponding to an arbitrary pair of stereoscopic images when selecting the pair of stereoscopic images from a plurality of image files, an identifier addition step of adding an identifier for a left eye or a right eye to the character string input in the input step, and a reading step of reading two image files having the identifier added in the identifier addition step as a pair of stereoscopic images for the left eye and the right eye.

According to still another aspect, the present invention which achieves the above-described object relates to a stereoscopic-image display method for reading and displaying image files of a pair of left and right stereoscopic images. The method includes a file-name input step of inputting a character string of one of two image-file names corresponding to an arbitrary pair of stereoscopic images when selecting the pair of stereoscopic images from a plurality of image files, an identifier replacement step of replacing an identifier for a left eye or a right eye present at a predetermined position in the character string input in the file-name input step with an identifier for the right eye or the left eye, respectively, and a reading step of reading two image files having a file name for the left eye or the right eye input by the file-name input means and a file name for the right eye or the left eye where the identifier has been replaced in the identifier replacement step, as a pair of stereoscopic images for the left eye and the right eye.

According to still another aspect, the present invention which achieves the above-described object relates to a storage medium storing a program for reading and displaying image files of a pair of left and right stereoscopic images. The program includes execution of an input step of inputting a character string of a portion common to two image file names corresponding to an arbitrary pair of stereoscopic images when selecting the pair of stereoscopic images from a plurality of image files, an identifier addition step of adding an identifier for a left eye or a right eye to the character string input in the input step, and a reading step of reading two image files having the identifier added in the identifier addition step as a pair of stereoscopic images for the left eye and the right eye.

According to still another aspect, the present invention which achieves the above-described object relates to a storage medium storing a program for reading and displaying image files of a pair of left and right stereoscopic images. The program includes execution of a file-name input step of inputting a character string of one of two image file names corresponding to an arbitrary pair of stereoscopic images when selecting the pair of stereoscopic images from a plurality of image files, an identifier replacement step of replacing an identifier for a left eye or a right eye present at a predetermined position in the character string input in the file-name input step with an identifier for the right eye or the left eye, respectively, and a reading step of reading two image files having a file name for the left eye or the right eye input in the file-name input step and a file name for the right eye or the left eye where the identifier has been replaced in the identifier replacement step, as a pair of stereoscopic images for the left eye and the right eye.

According to still another aspect, the present invention which achieves the above-described object relates to a stereoscopic-image display apparatus for reading and displaying image files of a pair of left and right stereoscopic images. The apparatus includes display-order reading means for reading information assigning an order of display of a plurality of stereoscopic images from a file, and stereoscopic-image display means for sequentially displaying the plurality of stereoscopic images in accordance with the order indicated by the information read by the display-order reading means.

According to still another aspect, the present invention which achieves the above-described object relates to a stereoscopic-image display apparatus for reading and displaying image files of a pair of left and right stereoscopic images. The apparatus includes display-order input means for inputting information assigning an order of display of a plurality of stereoscopic images, in accordance with an instruction of a user, and stereoscopic-image display means for sequentially displaying the plurality of stereoscopic images in accordance with the order indicated by the information input by the display-order input means.

According to still another aspect, the present invention which achieves the above-described object relates to a stereoscopic-image display apparatus for reading and displaying image files of a pair of left and right stereoscopic images. The apparatus includes horizontal-interval input means for inputting, when a number consecutively changing so as to correspond to a change in the contents of an image is given to a part of each of respective file names of a plurality of image files, each having an image which rotates with a constant angle in a predetermined direction, and two image files separated by an interval between the values of numbers, each given to the part of the corresponding file name, are made to be image files of a pair of left and right stereoscopic images, the interval between the numerical values in accordance with an instruction of a user. The apparatus also includes stereoscopic-image-file determination means for automatically determining two image files, each having one of two numbers having the interval between the numerical values input by the horizontal-interval input means as a part of a file name, as image files of a pair of left and right stereoscopic images, and stereoscopic-image display means for displaying the image files of the stereoscopic images determined by the stereoscopic-image-file determination means in an ascending order or a descending order of the values of numbers, each given to the part of the corresponding image file name.

According to still another aspect, the present invention which achieves the above-described object relates to a stereoscopic-image display apparatus for reading and displaying image files of a pair of left and right stereoscopic images. The apparatus includes horizontal-frame-interval input means for inputting, when a plurality of image frames, each having an image which rotates with a constant angle in a predetermined direction, are stored in an image file in an order of changes of the contents of respective images, and two image frames separated by a predetermined frame interval from among the plurality of image frames stored in the image file are made to be a pair of left and right stereoscopic images, the frame interval in accordance with an instruction of a user. The apparatus also includes stereoscopic-image determination means for automatically determining two image files having the frame interval input by the horizontal-frame-interval input means, as a pair of left and right stereoscopic images, and stereoscopic-image display means for displaying the stereoscopic images determined by the stereoscopic-image determination means in an order of storage of the image frames.

According to still another aspect, the present invention for achieving the above-described object relates to a stereoscopic-image display apparatus for reading and displaying image files of a pair of left and right stereoscopic images. The apparatus includes horizontal-frame-interval input means for inputting, when a plurality of image frames, each having an image which rotates with a constant angle in a predetermined direction, are stored in a plurality of image files which are referred from a file in an order of changes of the contents of respective images, and two image frames separated by a predetermined frame interval from among the plurality of image frames stored in the plurality of image files which are referred from the file are made to be a pair of left and right stereoscopic images, the frame interval in accordance with an instruction of a user. The apparatus also includes stereoscopic-image determination means for automatically determining two image files having the frame interval input by the horizontal-frame-interval input means, as a pair of left and right stereoscopic images, and stereoscopic-image display means for displaying a stereoscopic image represented by the pair of left and right stereoscopic images determined by the stereoscopic-image determination means in an order of reference from the file.

According to still another aspect, the present invention which achieves the above-described object relates to a stereoscopic-image display method for reading and displaying image files of a pair of left and right stereoscopic images. The method includes a display-order reading step of reading information assigning an order of display of a plurality of stereoscopic images from a file, and a stereoscopic-image display step of sequentially displaying the plurality of stereoscopic images in accordance with the order indicated by the information read in the display-order reading step.

According to still another aspect, the present invention which achieves the above-described object relates to a stereoscopic-image display method for reading and displaying image files of a pair of left and right stereoscopic images. The method includes a display-order input step of inputting information assigning an order of display of a plurality of stereoscopic images, in accordance with an instruction of a user, and a stereoscopic-image display step of sequentially displaying the plurality of stereoscopic images in accordance with the order indicated by the information input in the display-order input step.

According to still another aspect, the present invention which achieves the above-described object relates to a stereoscopic-image display method for reading and displaying image files of a pair of left and right stereoscopic images. The method includes a horizontal-interval input step of inputting, when a consecutively changing number corresponding to a change in the contents of an image is given to a part of each of respective file names of a plurality of image files, each having an image which rotates with a constant angle in a predetermined direction, and two image files separated by an interval between the values of numbers, each given to the part of the corresponding file name, are made to be image files of a pair of left and right stereoscopic images, the interval between the numerical values in accordance with an instruction of a user. The method also includes a stereoscopic-image-file determination step of automatically determining two image files, each having one of two numbers having the interval between the numerical values input in the horizontal-interval input step as a part of a file name, as image files of a pair of left and right stereoscopic images, and a stereoscopic-image display step of displaying the image files of the stereoscopic images determined in the stereoscopic-image-file determination step in an ascending order or a descending order of the values of numbers, each given to the part of the corresponding image file name.

According to still another aspect, the present invention which achieves the above-described object relates to a stereoscopic-image display method for reading and displaying image files of a pair of left and right stereoscopic images. The method includes a horizontal-frame-interval input step of inputting, when a plurality of image frames, each having an image which rotates with a constant angle in a predetermined direction, are stored in an image file in an order of changes of the contents of respective images, and two image frames separated by a predetermined frame interval from among the plurality of image frames stored in the image file are made to be a pair of left and right stereoscopic images, the frame interval in accordance with an instruction of a user. The method also includes a stereoscopic-image determination step of automatically determining two image files having the frame interval input in the horizontal-frame-interval input step as a pair of left and right stereoscopic images, and a stereoscopic-image display step of displaying the stereoscopic images determined in the stereoscopic-image determination step in an order of storage of the image frames.

According to still another aspect, the present invention which achieves the above-described object relates to a stereoscopic-image display method for reading and displaying image files of a pair of left and right stereoscopic images. The method includes a horizontal-frame-interval input step of inputting, when a plurality of image frames, each having an image which rotates with a constant angle in a predetermined direction, are stored in a plurality of image files which are referred from a file in an order of changes of the contents of respective images, and two image frames separated by a predetermined frame interval from among the plurality of image frames stored in the plurality of image files which are referred from the file are made to be a pair of left and right stereoscopic images, the frame interval in accordance with an instruction of a user. The method also includes a stereoscopic-image determination step of automatically determining two image files having the frame interval input in the horizontal-frame-interval input step as a pair of left and right stereoscopic images, and a stereoscopic-image display step of displaying the stereoscopic images determined in the stereoscopic-image determination step in an order of reference from the file.

According to still another aspect, the present invention which achieves the above-described object relates to a storage medium storing a program, capable of being executed by a computer, for reading and displaying image files of a pair of left and right stereoscopic images. The program includes a display-order reading procedure of reading information assigning an order of display of a plurality of stereoscopic images from a file, and a stereoscopic-image display procedure of sequentially displaying the plurality of stereoscopic images in accordance with the order indicated by the information read in the display-order reading procedure.

According to still another aspect, the present invention which achieves the above-described object relates to a storage medium storing a program, capable of being executed by a computer, for reading and displaying image files of a pair of left and right stereoscopic images. The program includes a display-order input procedure of inputting information assigning an order of display of a plurality of stereoscopic images, in accordance with an instruction of a user, and a stereoscopic-image display procedure of sequentially displaying the plurality of stereoscopic images in accordance with the order indicated by the information input in the display-order input procedure.

According to still another aspect, the present invention which achieves the above-described object relates to a storage medium storing a program, capable of being executed by a computer, for reading and displaying image files of a pair of left and right stereoscopic images. The program includes a horizontal-interval input procedure of inputting, when a consecutively changing number corresponding to a change in the contents of an image is given to a part of each of respective file names of a plurality of image files, each having an image which rotates with a constant angle in a predetermined direction, and two image files separated by an interval between the values of numerals, each given to the part of the corresponding file name, are made to be image files of a pair of left and right stereoscopic images, the interval between the numerical values in accordance with an instruction of a user. The program also includes a stereoscopic-image-file determination procedure of automatically determining two image files, each having one of two numbers having the interval between the numerical values input in the horizontal-interval input procedure as a part of a file name, as image files of a pair of left and right stereoscopic images, and a stereoscopic-image display procedure of displaying the image files of the stereoscopic images determined in the stereoscopic-image-file determination procedure in an ascending order or a descending order of the values of numbers, each given to the part of the corresponding image file name.

According to still another aspect, the present invention which achieves the above-described object relates to a storage medium storing a program, capable of being executed by a computer, for reading and displaying image files of a pair of left and right stereoscopic images. The program includes a horizontal-frame-interval input procedure of inputting, when a plurality of image frames, each having an image which rotates with a constant angle in a predetermined direction, are stored in an image file in an order of changes of the contents of respective images, and two image frames separated by a predetermined frame interval from among the plurality of image frames stored in the image file are made to be a pair of left and right stereoscopic images, the frame interval in accordance with an instruction of a user. The program also includes a stereoscopic-image determination procedure of automatically determining two image files having the frame interval input in the horizontal-frame-interval input procedure as a pair of left and right stereoscopic images, and a stereoscopic-image display procedure of displaying the stereoscopic images determined in the stereoscopic-image determination procedure in an order of storage of the image frames.

According to still another aspect, the present invention which achieves the above-described object relates to a storage medium storing a program, capable of being executed by a computer, for reading and displaying image files of a pair of left and right stereoscopic images. The program includes a horizontal-frame-interval input procedure of inputting, when a plurality of image frames, each having an image which rotates with a constant angle in a predetermined direction, are stored in a plurality of image files which are referred from a file in an order of changes of the contents of respective images, and two image frames separated by a predetermined frame interval from among the plurality of image frames stored in the plurality of image files which are referred from the file are made to be a pair of left and right stereoscopic images, the frame interval in accordance with an instruction of a user. The program also includes a stereoscopic-image determination procedure of automatically determining two image files having the frame interval input in the horizontal-frame-interval input procedure as a pair of left and right stereoscopic images, and a stereoscopic-image display procedure of displaying the stereoscopic images determined in the stereoscopic-image determination procedure in an order of reference from the file.

According to still another aspect, the present invention which achieves the above-described object relates to a stereoscopic-image display apparatus for reading and displaying image files of a pair of left and right stereoscopic images. The apparatus includes stereoscopic-image-setting reading means for reading setting values relating to formation or display of a stereoscopic image which is not contained in the image files of the stereoscopic images from a predetermined file.

According to still another aspect, the present invention which achieves the above-described object relates to a stereoscopic-image display method for reading and displaying image files representing a pair of left and right stereoscopic images. The method includes a stereoscopic-image-setting storage step of storing setting values relating to formation or display of a stereoscopic image which is not contained in the image files of the stereoscopic images in a predetermined file.

According to still another aspect, the present invention which achieves the above-described object relates to a stereoscopic-image display method for reading and displaying image files of a pair of left and right stereoscopic images. The method includes a stereoscopic-image-setting reading step of reading setting values relating to formation or display of a stereoscopic image which is not contained in the image files of the stereoscopic images, from a predetermined file.

According to still another aspect, the present invention which achieves the above-described object relates to a storage medium storing a program, capable of being executed by a computer, for reading and displaying image files of a pair of left and right stereoscopic images. The program includes a stereoscopic-image-setting storage procedure of storing setting values relating to formation or display of a stereoscopic image which is not contained in the image files of the stereoscopic images in a predetermined file.

According to still another aspect, the present invention which achieves the above-described object relates to a storage medium storing a program, capable of being executed by a computer, for reading and displaying image files of a pair of left and right stereoscopic images. The program includes a stereoscopic-image-setting reading procedure of reading setting values relating to formation or display of a stereoscopic image which is not contained in the image files of the stereoscopic images, from a predetermined file.

According to still another aspect, the present invention which achieves the above-described object relates to a stereoscopic-image display apparatus for displaying a stereoscopic image formed by alternately synthesizing a pair of left and right images with a constant interval adapted to display characteristics of a display on the display. The apparatus includes synthesis-order inversion means for inverting an order of synthesis of the left and right images.

According to still another aspect, the present invention which achieves the above-described object relates to a stereoscopic-image display apparatus for displaying a stereoscopic image formed by alternately synthesizing a pair of left and right images with a constant interval adapted to display characteristics of a display on the display. The apparatus includes display-position moving means for performing display by moving a display position of the stereoscopic image by a constant interval adapted to the display characteristics of the display.

According to still another aspect, the present invention which achieves the above-described object relates to a stereoscopic-image display method for displaying a stereoscopic image formed by alternately synthesizing a pair of left and right images with a constant interval adapted to display characteristics of a display on the display. The method includes a synthesis-order inversion step of inverting an order of synthesis of the left and right images.

According to still another aspect, the present invention which achieves the above-described object relates to a stereoscopic-image display method for displaying a stereoscopic image formed by alternately synthesizing a pair of left and right images with a constant interval adapted to display characteristics of a display on the display. The method includes a display-position moving step of performing display by moving a display position of the stereoscopic image by a constant interval adapted to the display characteristics of the display.

According to still another aspect, the present invention which achieves the above-described object relates to a storage medium storing a program, capable of being executed by a computer, for displaying a stereoscopic image formed by alternately synthesizing a pair of left and right images with a constant interval adapted to display characteristics of a display on the display. The program includes a synthesis-order inversion procedure of inverting an order of synthesis of the left and right images.

According to still another aspect, the present invention which achieves the above-described object relates to a storage medium storing a program, capable of being executed by a computer, for displaying a stereoscopic image formed by alternately synthesizing a pair of left and right images with a constant interval adapted to display characteristics of a display on the display. The program includes a display-position moving procedure of performing display by moving a display position of the stereoscopic image by a constant interval adapted to the display characteristics of the display.

The foregoing and other objects, advantages and features of the present invention will become more apparent from the following detailed description of the preferred embodiments taken in conjunction with the accompanying drawings.

BRIEF DESCRIPTION OF THE DRAWINGS

FIG. 6 is a diagram illustrating an example of a display of a dialog box for inputting information necessary for acquiring file names corresponding to a plurality of pairs of stereoscopic images from file names of respective serial images from a user in the first embodiment;

FIGS. 16A and 16B are diagrams illustrating an example of a basic description and a two-dimensional arrangement, respectively, of an SSI file;

FIG. 43 is a diagram illustrating an "information relating to RAW-data file" dialog box;

FIG. 44 is a diagram illustrating the "information relating to RAW-data file" dialog box when an "unsigned 16 bits" radio button has been selected;

DETAILED DESCRIPTION OF THE PREFERRED EMBODIMENTS

Preferred embodiments of the present invention will now be described with reference to the drawings. In the present invention, a stereoscopic image may be an image formed according to animation, CG (computer graphics) or the like, an image input according to a photographing operation or reading by a scanner, or an image formed by processing these images.

In the following embodiments of the present invention, a pair of left and right stereoscopic images obtained by synthesizing an image for the left eye and an image for the right eye whose contents differ by an amount corresponding to a parallax between the left eye and the right eye are termed a "stereoscopic pair".

First Embodiment

Figure 1:
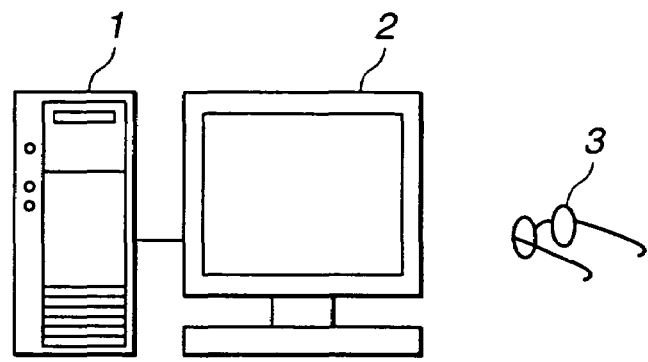
FIG. 1 is a schematic diagram illustrating a polarizing-spectacle-type or liquid-crystal-shutter-spectacle-type stereoscopic-image display apparatus.
Figure 2:
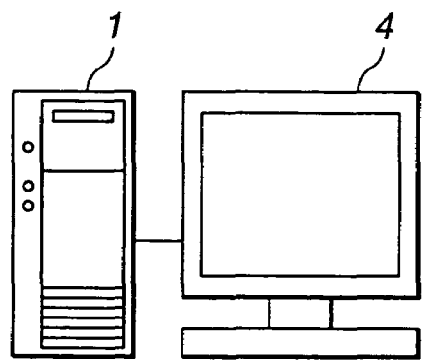
FIG. 2 is a schematic diagram illustrating a parallax-barrier-type or lenticular-lens-type stereoscopic-image display apparatus.
Figure 3:
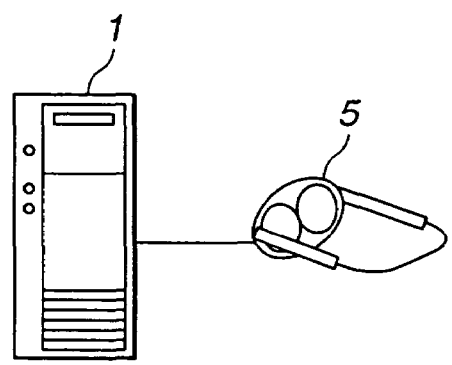
FIG. 3 is a block diagram illustrating an HMD-type stereoscopic-image display apparatus.

FIGS. 1 through 3 are diagrams illustrating outlines of three different types of stereoscopic-image display apparatuses, to which the present invention can be applied.

FIG. 1 illustrates a stereoscopic-image display apparatus using polarizing spectacles or liquid-crystal-shutter spectacles. In FIG. 1, stereoscopic-image display software according to the present invention can operate in a PC 1, which is connected to a display 2 for displaying left and right images using plane-polarized light beams which are orthogonal to each other, or by alternately switching left and right images with a frequency of about several-ten to several-hundred Hz.

A user can see an image for the left eye and an image for the right eye only with the left eye and the right eye, respectively, by wearing polarizing spectacles or liquid-crystal-shutter spectacles 3. Accordingly, by displaying images for the left eye and the right eye whose contents differ by an amount of the parallax between the left eye and the right eye, the user can see a stereoscopic image.

FIG. 2 illustrates a lenticular-lens-type stereoscopic-image display apparatus. The stereoscopic-image display software according to the present invention can operate in the PC 1, which is connected to a display 4 having a lenticular lens attached on its picture surface. The lenticular lens on the picture surface causes an image for the left eye and an image for the right eye to be seen only by the left eye and the right eye, respectively, by deflecting the optical paths of light beams emitted from adjacent points on the picture surface in different directions.

FIG. 3 illustrates an HMD-type stereoscopic-image display apparatus. The stereoscopic-image display software according to the present invention can operate in the PC 1, which is connected to an HMD 5. The HMD causes the user to see a stereoscopic image by displaying an image for the left eye and an image for the right eye on a left display surface and a right display surface, respectively.

Figure 4:
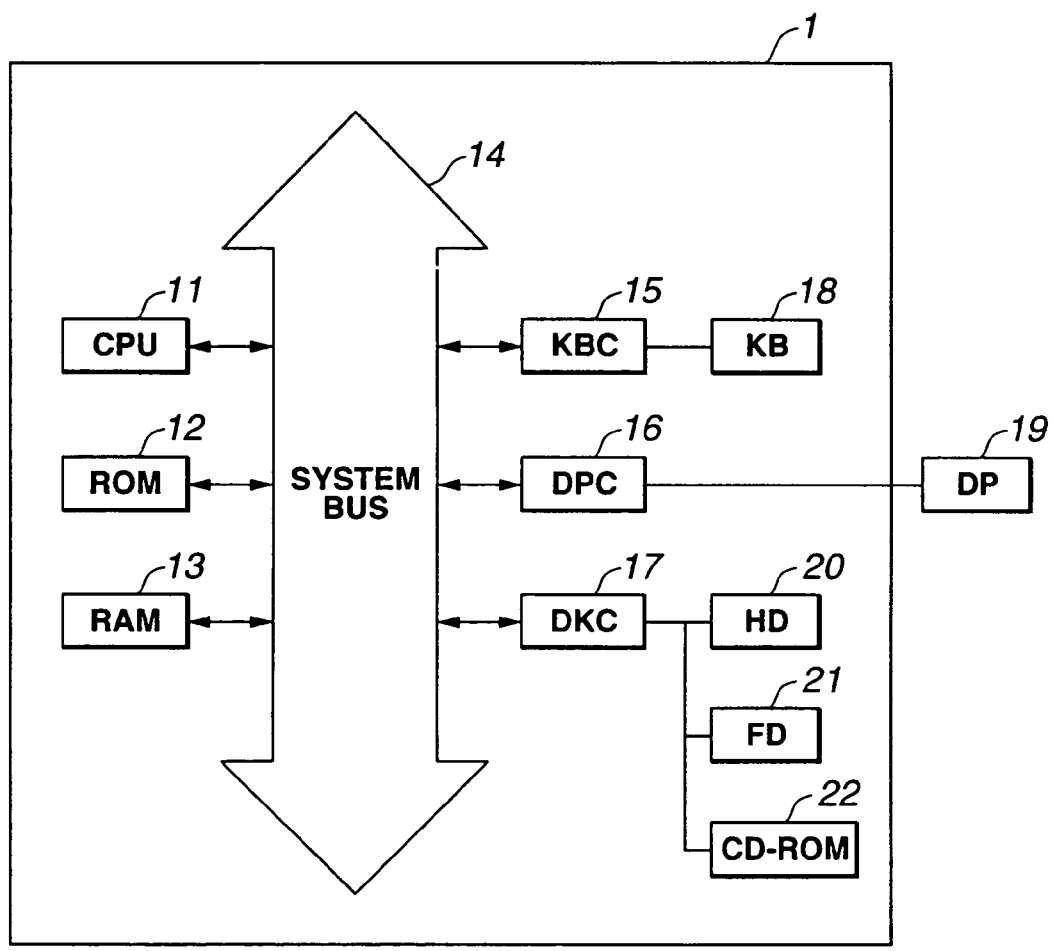
FIG. 4 is a block diagram illustrating the configuration of a PC (personal computer) in which stereoscopic-image display software according to the present invention can operate.

FIG. 4 is a block diagram illustrating the configuration of the PC 1 in which the stereoscopic-image display software according to the present invention can operate.

The PC 1 includes a CPU (central processing unit) 11 for executing programs stored on a hard disk (HD) 20, or a stereoscopic-image display program supplied from a floppy disk controller (FD) 21 or a CD-ROM drive (CD-ROM) 22. The CPU 11 controls respective devices connected to a system bus 14.

A RAM (random access memory) 13 operates, for example, as a main memory or working areas. A keyboard controller (KBC) 15 controls an instruction input, for example, from a keyboard (KB) 18 or a pointing device (not shown). A display controller (DPC) 16 controls a display on a display (DP) 19.

Any of a CRT (cathode-ray tube), a liquid-crystal display, a plasma display, a projection-type display, an HMD and the like may be used as the display (DP) 19. The display (DP) 19 generically represents any of the display 2, the display 4 and the HMD 5 shown in FIGS. 1–3, and the like.

A disk controller (DKC) 17 controls access to the hard disk (HD) 20, the floppy disk (FD) 21, and the CD-ROM 22. These storage media store boot programs, OSs (operating systems), various types of application programs, editing files, user files, a stereoscopic-image display program and the like.

In the first embodiment, a PC having the same configuration as an ordinary PC is used as hardware. The first embodiment has a feature in control according to software, as will be described below.

In the first embodiment, in a stereoscopic-image display apparatus for reading and displaying image files of a pair of left and right stereoscopic images, the CPU 11 provides input means for defining a file name, including a portion where a part of a character string regularly changes and a portion where a character string does not change, for each member of a set of image files corresponding to a plurality of images having a parallax between left and right eyes, and for inputting the character string to the portion where the character string does not change. The CPU 11 also provides addition means for adding the character string of the regularly changing portion to the character string input by the input means, and image determination means for making images whose file names, for each of which the character string has been added by the addition means, to be images corresponding to the left and right eyes. The image determination means makes images corresponding to an m(a positive integer)-th file name and an n(a positive integer different from m)-th file name to be a first image for the left eye and a first image for the right eye, respectively, and makes images corresponding to an (m+k(k being a positive integer))-th file name and an (n+k)-th file name to be a k-th image for the left eye and a k-th image for the right eye, respectively.

The stereoscopic-image display apparatus according to the present invention is realized in a computer having the same configuration as the PC which can realize the stereoscopic-image display apparatus shown in FIG. 4. A program of stereoscopic-image display software according to the present invention, which operates in the following manner, is stored in on the hard disk (HD) 20. In the following description, the principal portion of hardware is the CPU 11, unless otherwise mentioned.

The principal portion of control of software is the stereoscopic-image display software stored on the hard disk (HD) 20. The stereoscopic-image display software according to the present invention may be supplied in a state of being stored in a storage medium, such as a floppy disk, a CD-ROM or the like. In this case, the program is read from the storage medium by the floppy-disk controller (FD) 21 or the CD-ROM drive (CD-ROM) 22 shown in FIG. 4, or the like, and is installed on the hard disk (HD) 20.

Figure 5:
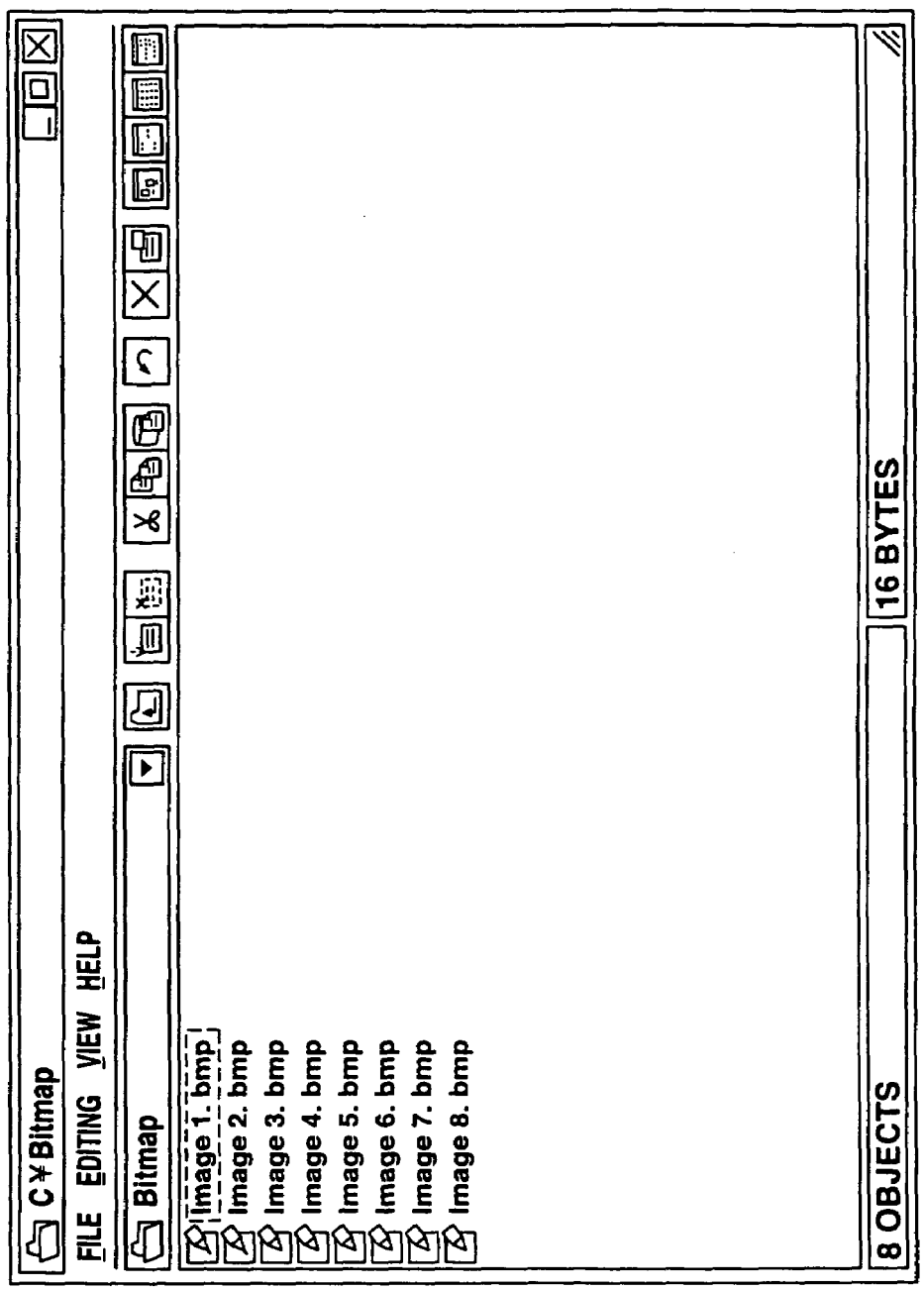
FIG. 5 is a diagram illustrating an example of a display of a dialog box on which a summary of file names of respective serial images is displayed in a first embodiment of the present invention.

Next, a control operation by the stereoscopic-image display software of the first embodiment will be described with reference to FIGS. 5 through 8. FIG. 5 is a diagram illustrating an example of a display of a dialog box on which a summary of file names of respective serial images is displayed. In this specification, a plurality of image files, each comprising numerical characters obtained by converting positive numerical values having consecutive characters (a character string) immediately before an extender of a file name into characters, or a set of a plurality of images read from the image files are termed "serial images".

In the case of FIG. 5, eight image files from "Image1.bmp" to "Image8.bmp" are present as serial images. Such image files are formed, for example, when consecutively photographing an object from slightly different directions.

At that time, since two consecutive arbitrary image files (for example, "Image2.bmp" and "Image3.bmp" or "Image3.bmp" and "Image4.bmp") have a deviation in the contents of their respective images equivalent to binocular parallax, these image files may be used as a stereoscopic pair.

Figure 6:
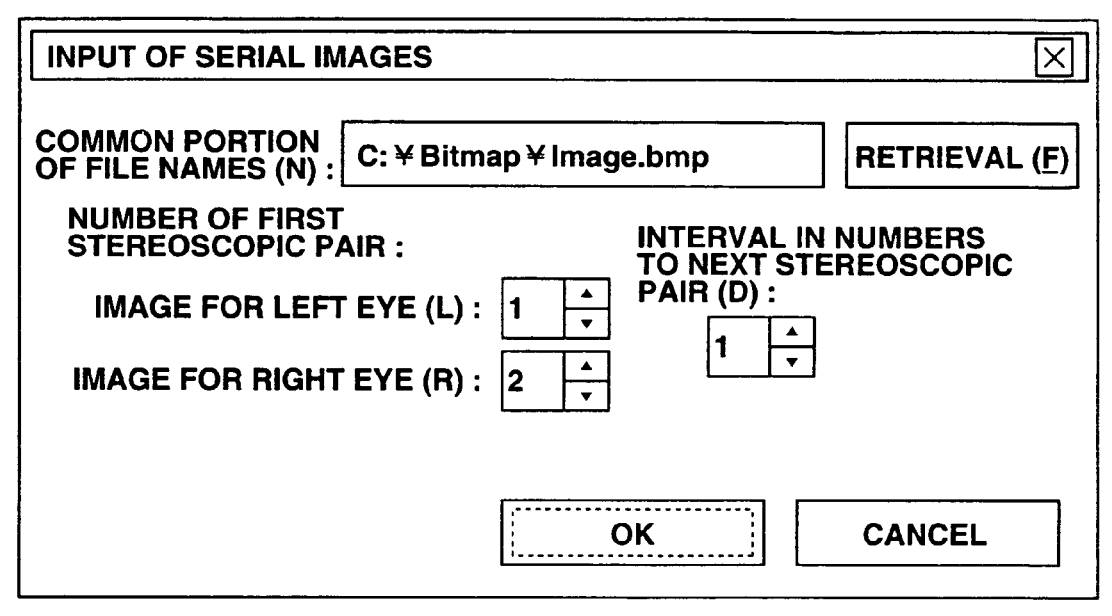

FIG. 6 is a diagram illustrating an example of display of a dialog box for inputting information necessary for acquiring file names corresponding to a plurality of stereoscopic pairs from file names of respective serial images from the user. Information necessary for acquiring file names corresponding to a plurality of stereoscopic pairs from file names of respective serial images includes a common portion of file names of respective serial images (a common file name), the number (m) of an image file for the left eye corresponding to the first stereoscopic pair, the number (n) of an image file for the right eye corresponding to the first stereoscopic pair, and an interval (d) in numbers to the next stereoscopic pair.

In the case of FIG. 6, "C:¥Bitmap¥Image.bmp", 1, 2 and 1 are input as the common file name, m, n and d, respectively. In this case, if processing of acquiring file names corresponding to a plurality of stereoscopic pairs from file names of serial images is executed as will be described later, the following seven stereoscopic pairs are obtained. In the following items, each line represents one stereoscopic pair, and the number within each parenthesis ( ) represents the numerical order of the corresponding stereoscopic pair.

File names described at the left side are image-file names for the left eye, and file names described at the right side are image-file names for the right eye.

(1) "Image1.bmp" "Image2.bmp"
(2) "Image2.bmp" "Image3.bmp"
(3) "Image3.bmp" "Image4.bmp"
(4) "Image4.bmp" "Image5.bmp"
(5) "Image5.bmp" "Image6.bmp"
(6) "Image6.bmp" "Image7.bmp"
(7) "Image7.bmp" "Image8.bmp"

FIG. 6 illustrates a standard dialog box when using an ordinary OS. The present invention does not depend on a specific OS. Although a dialog box is used as means for inputting data from the user, any other appropriate means, such as input from a command line, or the like, may also be utilized.

Conventionally, in order to acquire file names corresponding to the above-described seven stereoscopic pairs, the user must input two file names per stereoscopic pair, i.e., 14 file names in total.

In the first embodiment, however, as described with reference to FIG. 6, it is only necessary to input four types of information, i.e., a common portion of file names of serial images (a common file name), the number (m) of an image file for the left eye corresponding to the first stereoscopic pair, the number (n) of an image file for the right eye corresponding to the first stereoscopic pair, and the interval in numbers (d) to the next stereoscopic pair. The reason will now be described in detail.

Figure 7:
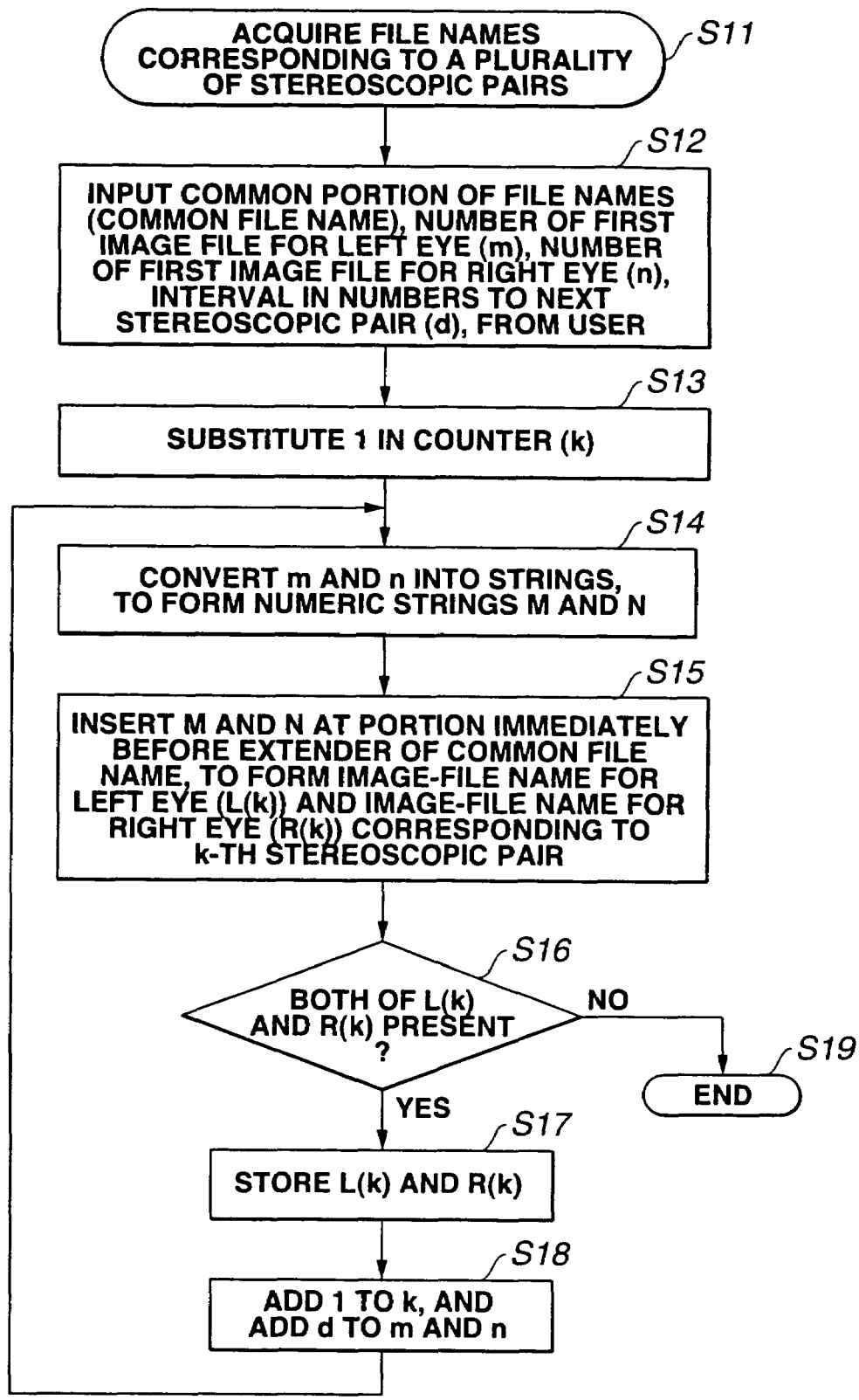
FIG. 7 is a flowchart illustrating processing for acquiring file names corresponding to a plurality of pairs of stereoscopic images from the file names of respective serial images in the first embodiment.

FIG. 7 is a flowchart illustrating processing for acquiring file names corresponding to a plurality of stereoscopic pairs from file names of serial images, in stereoscopic-image display software according to the present invention. Step S11 indicates the start of the processing.

In step S12, a common portion of file names of serial images (a common file name), the number (m) of an image file for the left eye corresponding to the first stereoscopic pair, the number (n) of a file name for the right eye corresponding to the first stereoscopic pair, and the interval in numbers (d) to the next stereoscopic pair are input from the user, using, for example, the dialog box shown in FIG. 6. In step S13, 1 is substituted in a counter (k). The value k indicates the numerical order of a stereoscopic pair.

In step S14, the values m and n are converted into characters, to form numerical characters M and N, respectively. In step S15, the numerical values M and N are inserted to a portion immediately before an extender of the common file name, to form an image-file name for the left eye (L(k)) and an image-file name for the right eye (R(k)), respectively, corresponding to the k-th stereoscopic pair.

In step S16, it is determined if both of the L(k) and the R(k) are present. If the result of the determination in step S16 is affirmative, the process proceeds to step S17. If the result of the determination in step S16 is negative, the process proceeds to step S19, and the processing is terminated.

In step S17, the L(k) and R(k) are stored in the RAM 13 shown in FIG. 4 as the k-th stereoscopic pair. In step S18, 1 is added to k, and d is added to m and n, and the process then returns to step S14.

When applying the example shown in FIGS. 5 and 6 to the processing shown in FIG. 7, and k equals 1, then, in step S15, "Image1.bmp" and "Image2.bmp" are formed as L(k) and R(k), respectively. While k equals a value between 1 and 7, the processing from step S14 to step S18 is repeated. When k becomes 8, the process proceeds from step S16 to step S19, and the processing shown in FIG. 7 is terminated. This is because, when k becomes 8, then, in step S15, "Image8.bmp" and "Image9.bmp" are formed as L(k) and R(k), respectively. As a result, in step S16, it is determined that R(k) does not exist, and the process proceeds to step S19.

Figure 8:
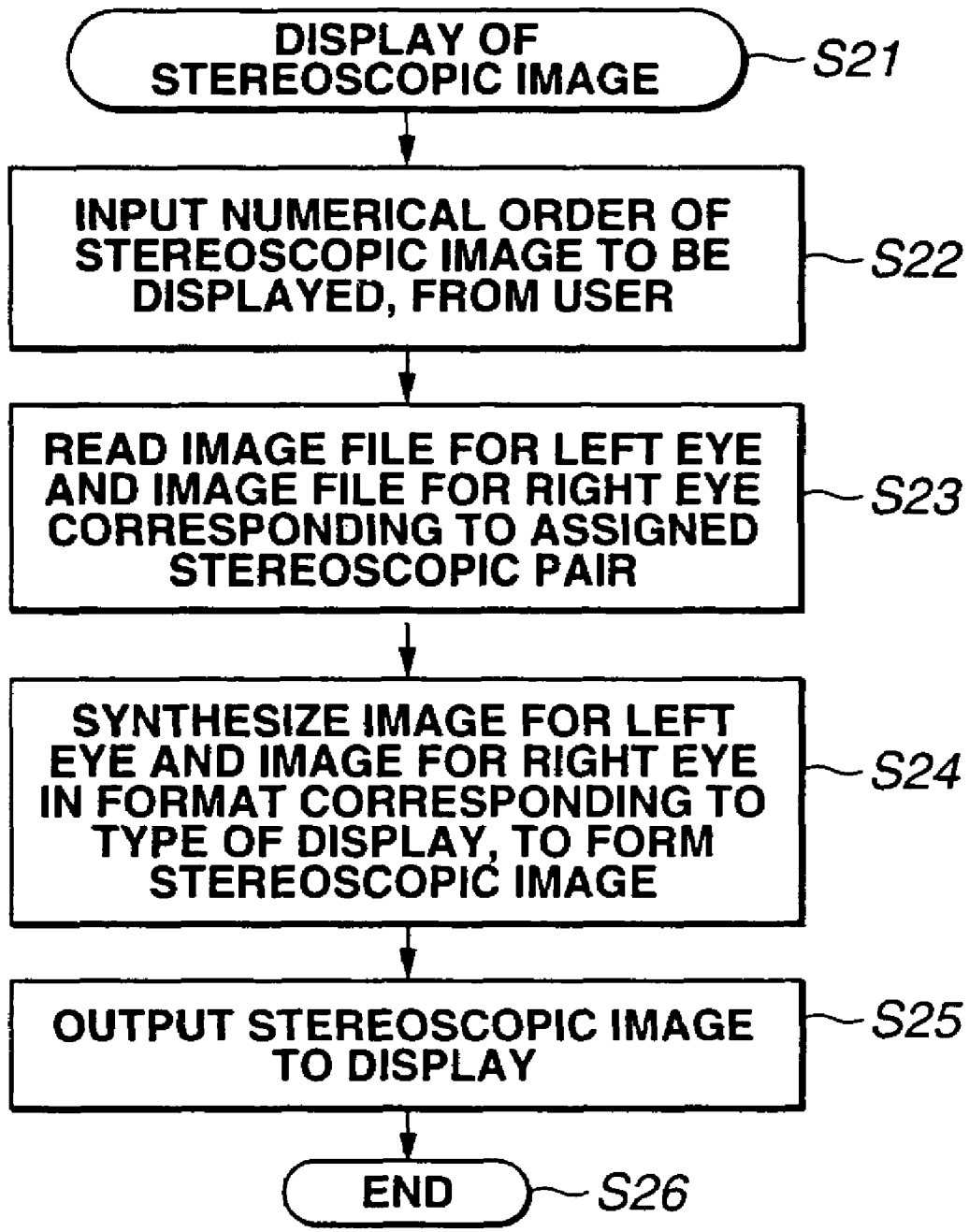
FIG. 8 is a flowchart illustrating processing for reading and displaying a stereoscopic image using acquired file names in the first embodiment.

FIG. 8 is a flowchart illustrating processing for reading and displaying a stereoscopic image using the file names acquired in the processing shown in FIG. 7, in the stereoscopic-image display software according to the present invention. Step S21 indicates the start of the processing.

In step S22, the numerical order of a stereoscopic image to be displayed from among the plurality of stereoscopic images acquired in the processing shown in FIG. 7 is input from the user. In step S23, the image-file name for the left eye and the image-file name for the right eye corresponding to the stereoscopic pair having the number input in step S22 are read from the RAM 13. Then, the image file for the left eye and the image file for the right eye having the read image-file names are read from the HD 20 or the like, and are stored in the RAM 13.

In step S24, the image for the left eye and the image for the right eye stored in the RAM 13 are synthesized in a format corresponding to the type of the display 13 to form a stereoscopic image, which is stored in the RAM 13. The format of the stereoscopic image corresponding to the type of the display (DP) 19 is selected from the following formats.

(1) Left and right images are synthesized by halving the width of each of the images and horizontally arranging the resultant images.

(2) Left and right images are synthesized by halving the height of each of the images and vertically arranging the resultant images.

(3) Let and right images are synthesized by alternately extracting a pixel from the images.

(4) Left and right images are synthesized by alternately extracting a line from each of the images.

In step S25, the stereoscopic image stored in the RAM 13 in step S24 is output to the display (DP) 19. Step S26 indicates end of the processing of display of the stereoscopic image.

As described above, according to the first embodiment, when file names, in each of which a part of the character string regularly changes so as to correspond to a change in the contents of the image, are given to a plurality of image files in which the contents of images consecutively change to the same degree as a change due to binocular parallax, i.e., for example, when serial images are present, in order to display a plurality of stereoscopic images, it is only necessary to perform a single operation of inputting four types of information, in contrast to the conventional approach in which the user must input file names several times. As a result, the user's burden of inputting file names can be greatly reduced.

Second Embodiment

The configuration of a second embodiment of the present invention is the same as the configuration shown in FIGS. 1 through 4. Hence, further description thereof will be omitted.

In the second embodiment, the CPU 11 provides common-portion input means for inputting a character string of a portion common to two image file names corresponding to an arbitrary pair of stereoscopic images selected from a plurality of image files, and identifier addition means for adding an identifier for the left eye or the right eye to the character string input by the common-portion input means. Two image files having the identifier added by the identifier addition means are read as a pair of stereoscopic images for the left eye and the right eye.

Figure 9:
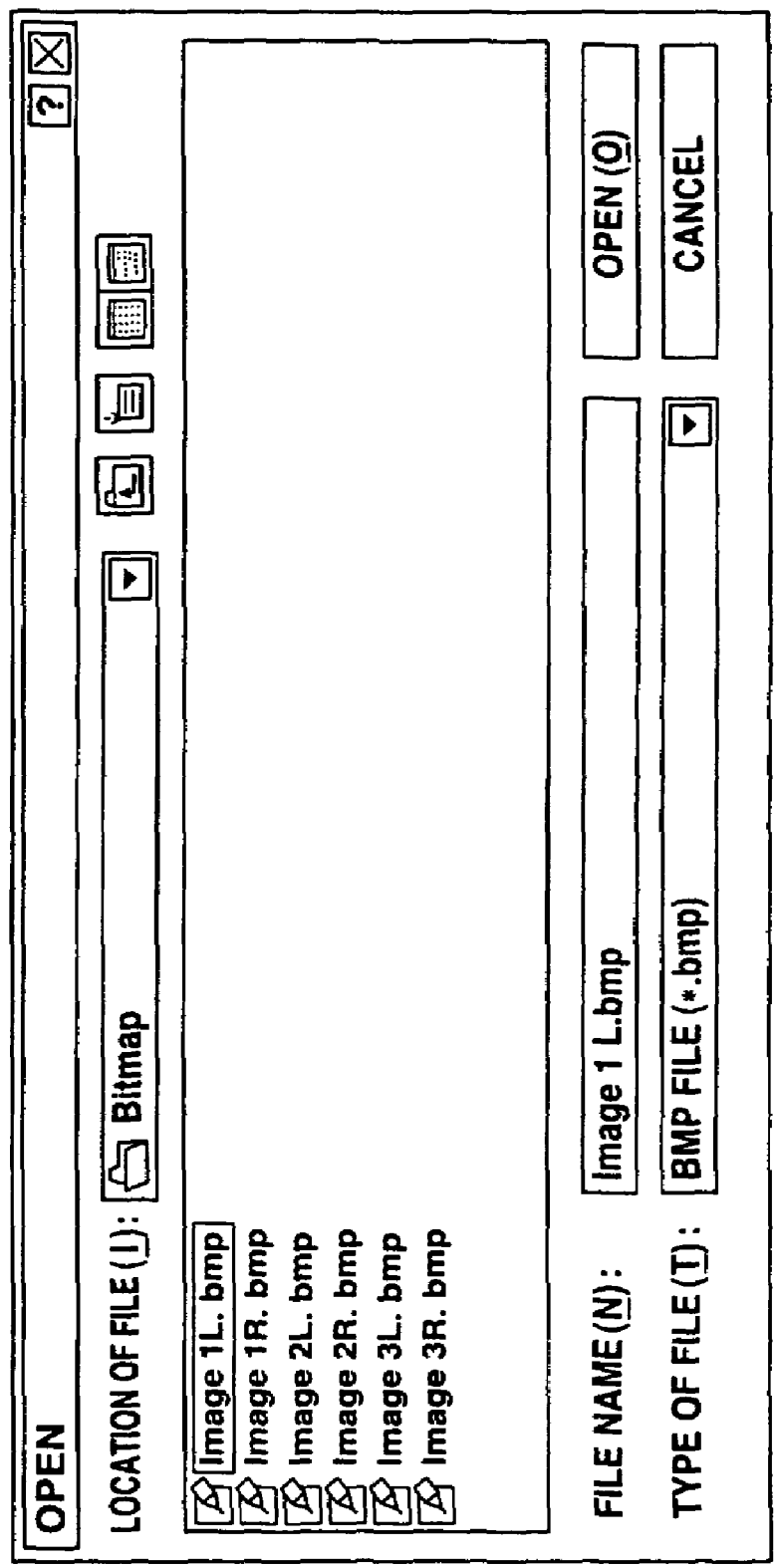
FIG. 9 is a diagram illustrating an example of a display of a dialog box for inputting a file name from a user in a second embodiment of the present invention.

FIG. 9 is a diagram illustrating an example of a display of a dialog box for inputting file names from the user in the second embodiment. In FIG. 9, a standard dialog box when using an ordinary OS is indicated. The second embodiment does not depend on a specific OS. Although a dialog box is used as means for inputting file names, any other appropriate means, such as drag-and-drop of a file, input from a command line, or the like, may also be utilized.

Since a method for inputting or selecting a file name using a dialog box as that shown in FIG. 9 is well known, further description thereof will be omitted.

Conventionally, in order to read a stereoscopic-image file, it is necessary to input or select one of two image files corresponding to a stereoscopic pair, separately for the left eye and the right eye. In order to select a stereoscopic-image file using the dialog box shown in FIG. 9, it is necessary to display the dialog box twice for the left eye and the right eye, and to perform an operation of inputting a file name twice. Alternatively, by improving the dialog box, an input field for the image-file name for the left eye and an input field for the image-file name for the right eye may be displayed within a single dialog box. In any cases, the user must perform an operation of inputting a file name twice.

In the second embodiment, however, it is necessary to input or select a file name common to an image-file name for the left eye and an image-file name for the right eye, or an image file name for the left eye or the right eye only once. That is, in the example shown in FIG. 9, when two image files "Image1L.bmp" and "Image1R.bmp" corresponding to the first stereoscopic pair are necessary in order to display the first stereoscopic image, it is only necessary for the user to input or select a file name "Image1.bmp", or one of the file names "Image1L.bmp" and "Image1R.bmp". The reason will be described below.

Figure 10:
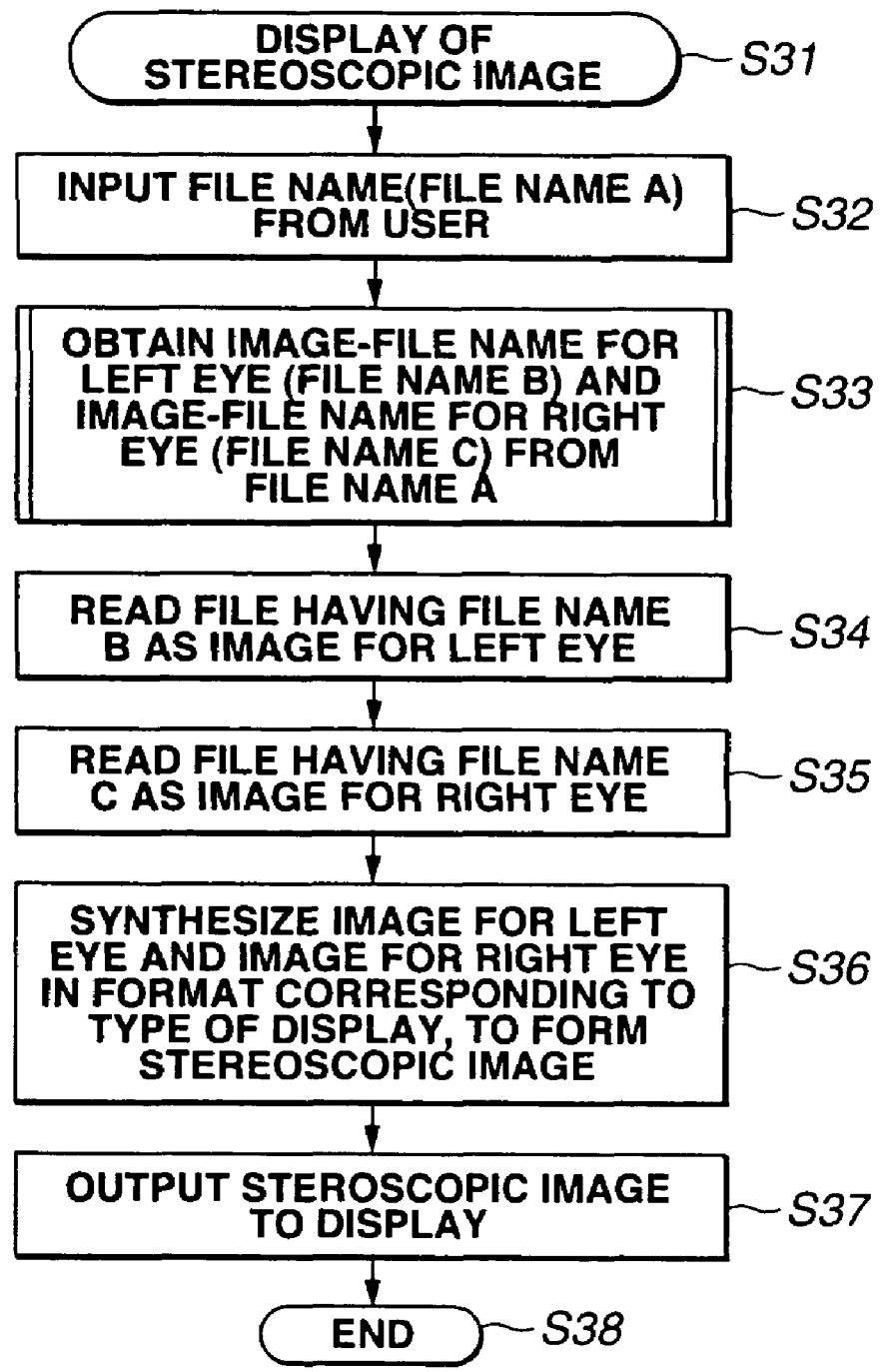
FIG. 10 is a flowchart illustrating an outline of processing of stereoscopic-image display software in the second embodiment.

FIG. 10 is a flowchart illustrating an outline of the processing of the stereoscopic-image display software of the second embodiment. Step S31 indicates start of processing of displaying a stereoscopic image.

In step S32, using, for example, the dialog box shown in FIG. 9, a file name common to an image file for the left eye and an image file for the right eye ("Image1.bmp" in the case of FIG. 9), or one of image files for the left eye and the right eye ("Image1L.bmp" and "Image1R.bmp" in the case of FIG. 9) is input from the user (hereinafter termed a "file name A").

In step S33, as will be described in detail later, the image-file name for the left eye (hereinafter termed a "file name B") and the image-file name for the right eye (hereinafter termed a "file name C") are obtained from the file name A. In step S34, the file having the file name B is read, for example, from the hard disk (HD) 20 shown in FIG. 4, and is stored in the RAM 13 as the image for the left eye.

Similarly, the file having the file name C is read, for example, from the hard disk (HD) 20, and is stored in the RAM 13 as the image for the right eye. In step S36, the image for the left eye and the image for the right eye stored in the RAM 13 are synthesized in a format corresponding to the type of the display (DP) 19, to form a stereoscopic image, which is stored in the RAM 13. The format of the stereoscopic image corresponding to the type of the display (DP) 19 is selected from the following formats.

(1) Left and right images are synthesized by halving the width of each of the images and horizontally arranging the resultant images.

(2) Left and right images are synthesized by halving the height of each of the images and vertically arranging the resultant images.

(3) Let and right images are synthesized by alternately extracting a pixel from each of the images.

(4) Left and right images are synthesized by alternately extracting a line from each of the images.

In step S37, the stereoscopic image stored in the RAM 13 in step S36 is output to the display (DP) 19. Step S38 indicates end of the processing of display of the stereoscopic image.

Figure 11:
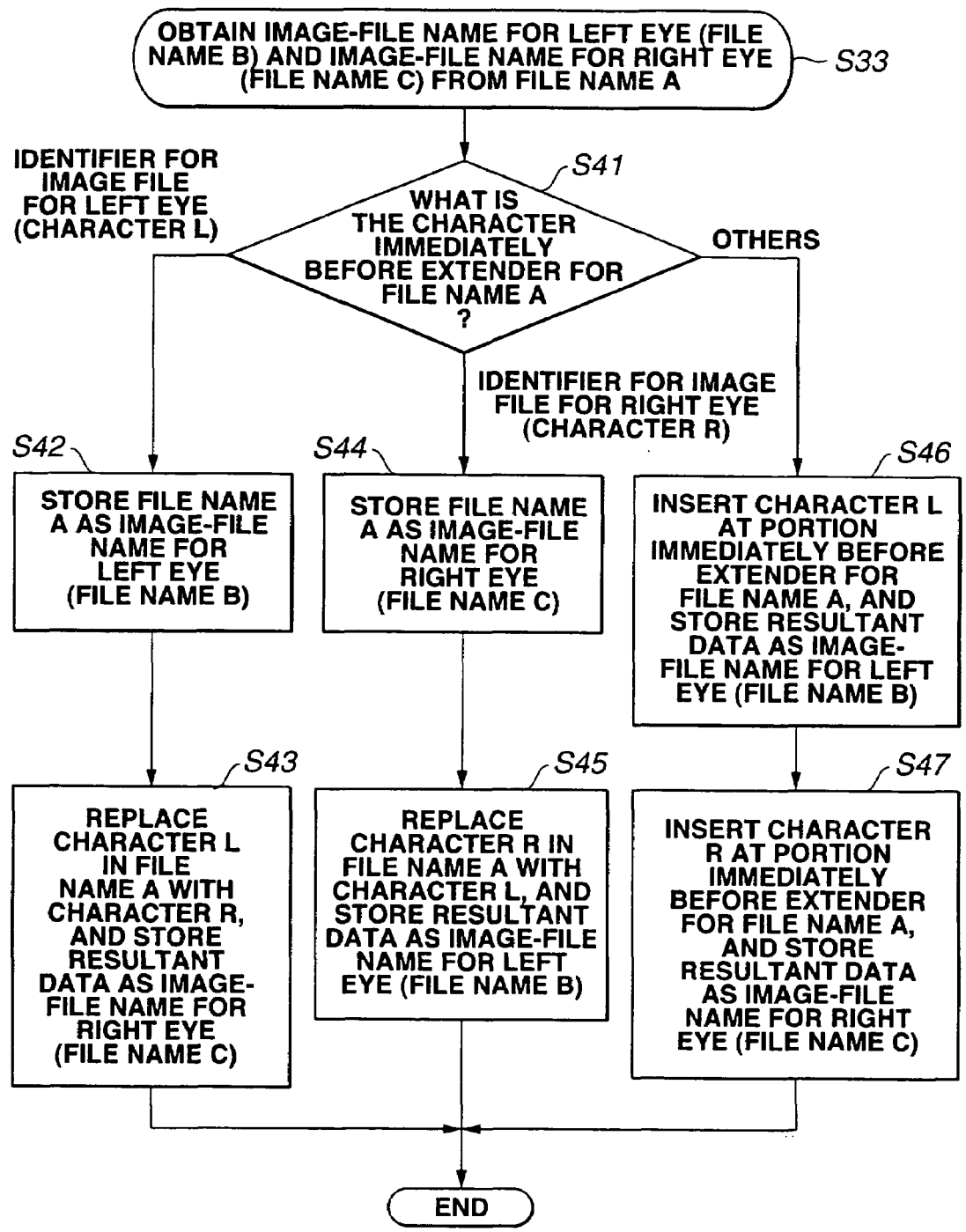
FIG. 11 is a flowchart illustrating the details of processing in step S33 shown in FIG. 10.

FIG. 11 is a flowchart illustrating the details of the processing in step S33 shown in FIG. 10.

Step S33 shown in FIG. 11 indicates the start of processing for obtaining the image-file name for the left eye (the file name B) and the image-file name for the right eye (the file name C) from the file name A input from the user.

In step S41, it is determined what is the character immediately before the extender of the file name A. The process branches from step S41 in accordance with the result of the determination in step S41. When the character immediately before the extender of the file name A coincides with the image-file identifier for the left eye (hereinafter termed "a character L"), the process proceeds to step S42. When the character immediately before the extender of the file name A coincides with the image-file identifier for the right eye (hereinafter termed a "character R"), the process proceeds to step S44. In other cases, the process proceeds to step S46.

For example, consider a case in which the image-file identifier for the left eye (the character L) and the image-file identifier for the right eye (the character R) are determined in advance to be "L" and "R", respectively. In this case, when the file name A is "Image1L.bmp", "Image1R.bmp" and "Image1.bmp", the process proceeds to step S42, S44 and S46, respectively.

The characters L and R are determined in advance by the user in accordance with a rule for naming two image files corresponding to a stereoscopic pair. The second embodiment cannot be applied to a case in which a rule for naming two image files corresponding to a stereoscopic pair does not exist.

In step S42, the file name A is stored in the RAM 13 as the image-file name for the left eye (the file name B). Then, in step S43, the character L in the file name A is replaced with the character R, and the character string after the replacement is stored in the RAM 13 as the image-file name for the right eye (the file name C).

In step S44, the file name A is stored in the RAM 13 as the image-file name for the right eye (the file name C). Then, in step S45, the character R in the file name A is replaced with the character L, and the character string after the replacement is stored in the RAM 13 as the image-file name for the left eye (the file name B).

In step S46, the character L is inserted at a portion immediately before the extender of the file name A, and the resultant data is stored in the RAM 13 as the image-file name for the left eye (the file name B). Then, in step S47, the character R is inserted at a portion immediately before the extender of the file name A, and the resultant data is stored in the RAM 13 as the image-file name for the right eye (the file name C).

Step S48 indicates the end of the processing for obtaining the file names B and C from the file name A.

As described above, according to the second embodiment, when displaying a stereoscopic image by reading two image files corresponding to the concerned stereoscopic pair from a storage device, such as the hard disk (HD) 20 or the like, only a single operation of inputting a file name is necessary in contrast to the conventional approach in which an operation of inputting a file name must be performed twice. As a result, the user's burden of inputting file names can be reduced.

The present invention may be applied to a system comprising a plurality of apparatuses (such as a host computer, a data communication apparatus, a data input terminal, a display and the like in a distributed computer environment), or to an apparatus comprising a single unit (for example, an apparatus in which a keyboard, a pointing device, a display and the like are integrated, such as a note PC).

The object of the present invention may, of course, also be achieved by supplying a system or an apparatus with a storage medium storing program codes of software for realizing the functions of the above-described embodiments, and reading and executing the program codes stored in the storage medium by means of a computer (or a CPU or an MPU (microprocessor unit)) of the system or the apparatus. In such a case, the program codes themselves read from the storage medium realize the functions of the above-described embodiments, so that the storage medium storing the program codes constitutes the present invention.

For example, a floppy disk, a hard disk, an optical disk, a magnetooptical disk, a CD(compact disc)-ROM, a CD-R (recordable), a CD-RAM, a CD-RW (rewritable), a magnetic tape, a nonvolatile memory card/memory stick, a ROM or the like may be used as the storage medium for supplying the program codes.

The present invention may, of course, be applied not only to a case in which the functions of the above-described embodiments are realized by executing program codes read by a computer, but also to a case in which an OS or the like operating in a computer executes a part or the entirety of actual processing, and the functions of the above-described embodiments are realized by the processing.

The present invention may, of course, be applied to a case in which, after writing program codes read from a storage medium into a memory provided in a function expanding board inserted into a computer or in a function expanding unit connected to the computer, a CPU or the like provided in the function expanding board or the function expanding unit performs a part or the entirety of actual processing, and the functions of the above-described embodiments are realized by the processing.

As described above, when file names, in each of which a part of the character string regularly changes so as to correspond to a change in the contents of the image, are given to a plurality of image files in which the contents of images consecutively change to the same degree as a change due to binocular parallax, i.e., for example, when serial images are present, in order to display a plurality of stereoscopic images, it is only necessary to perform a single operation of inputting four types of information, in contrast to the conventional approach in which the user must input file names several times. As a result, the user's burden of inputting file names can be greatly reduced.

According to the present invention, when displaying a stereoscopic image by reading two image files corresponding to the concerned stereoscopic pair from a storage device, such as a hard disk or the like, only a single input operation is necessary, in contrast to the conventional approach in which the user must perform an operation of inputting a file name twice. As a result, the user's burden of inputting file names can be reduced.

Third Embodiment

Next, a third embodiment of the present invention will be described.

In the third embodiment, in addition to the features of the foregoing embodiments, stereoscopic display corresponding to various conditions can be easily controlled.

That is, any of conventional stereoscopic-image display devices does not include means for storing setting values (setting values A) relating to formation or display of a stereoscopic image which is not contained in image files of stereoscopic images, for general purposes, and means for reading the setting value A for general purposes. Hence, the user must newly set all setting values A every time image files for a stereoscopic image are read.

In conventional stereoscopic-image display apparatuses other than HMD-type apparatuses, it is necessary to display a stereoscopic image formed by alternately synthesizing a pair of left and right images at a constant interval adapted to display characteristics of a display. When the display characteristics of the display are inverted in the horizontal direction for some reason, or the user's position to see the display is inadequate in the case of a direct-view display, the user sees left and right images in an inverted state. As a result, it is impossible to perform stereoscopic-image display while providing a normal stereoscopic sense.

The third embodiment is provided in order to solve such problems. It is an object of the third embodiment to provide a stereoscopic-image display apparatus and method, and a storage medium which can store setting values relating to formation or display of a stereoscopic image set by the user, for general purposes, and can read the setting values, for general purposes.

It is another object of the third embodiment to provide a stereoscopic-image display apparatus and method, and a storage medium which can always display a stereoscopic image providing a normal stereoscopic sense by changing the method for forming or displaying a stereoscopic image depending on the situation, even if the display characteristics of the display are inverted in the horizontal direction for some reason, or the position of the user to see the display is inadequate in the case of a direct-view display.

In order to achieve these objects, the third embodiment discloses a stereoscopic-image display apparatus for reading and displaying image files of a pair of left and right stereoscopic images. The apparatus includes display-order reading means for reading information assigning an order of display of a plurality of stereoscopic images from a file, and stereoscopic-image display means for sequentially displaying a plurality of stereoscopic images in accordance with the order indicated by the information read by the display-order reading means.

The third embodiment will now be described in detail. In the third embodiment, also, a pair of left and right stereoscopic images obtained by synthesizing an image for the left eye and an image for the right eye whose contents differ by an amount of parallax in the horizontal direction is termed a "stereoscopic pair". Furthermore, a plurality of stereoscopic images having orders are termed "serial images".

In the third embodiment, it is assumed that the serial images can be arranged on a virtual two-dimensional arrangement. The upper left corner of the two-dimensional arrangement is made an origin. One dimension of the two-dimensional arrangement corresponds to a lateral direction starting from the origin toward the right. Another dimension corresponds to a longitudinal direction starting from the origin downward.

In a dialog box shown in the third embodiment, the dialog box is closed by depressing an "OK" or "cancel" button. When the "OK" button has been depressed, a value set on the dialog box becomes effective. When the "cancel" button has been depressed, a value set on the dialog box is ignored.

Figure 12:
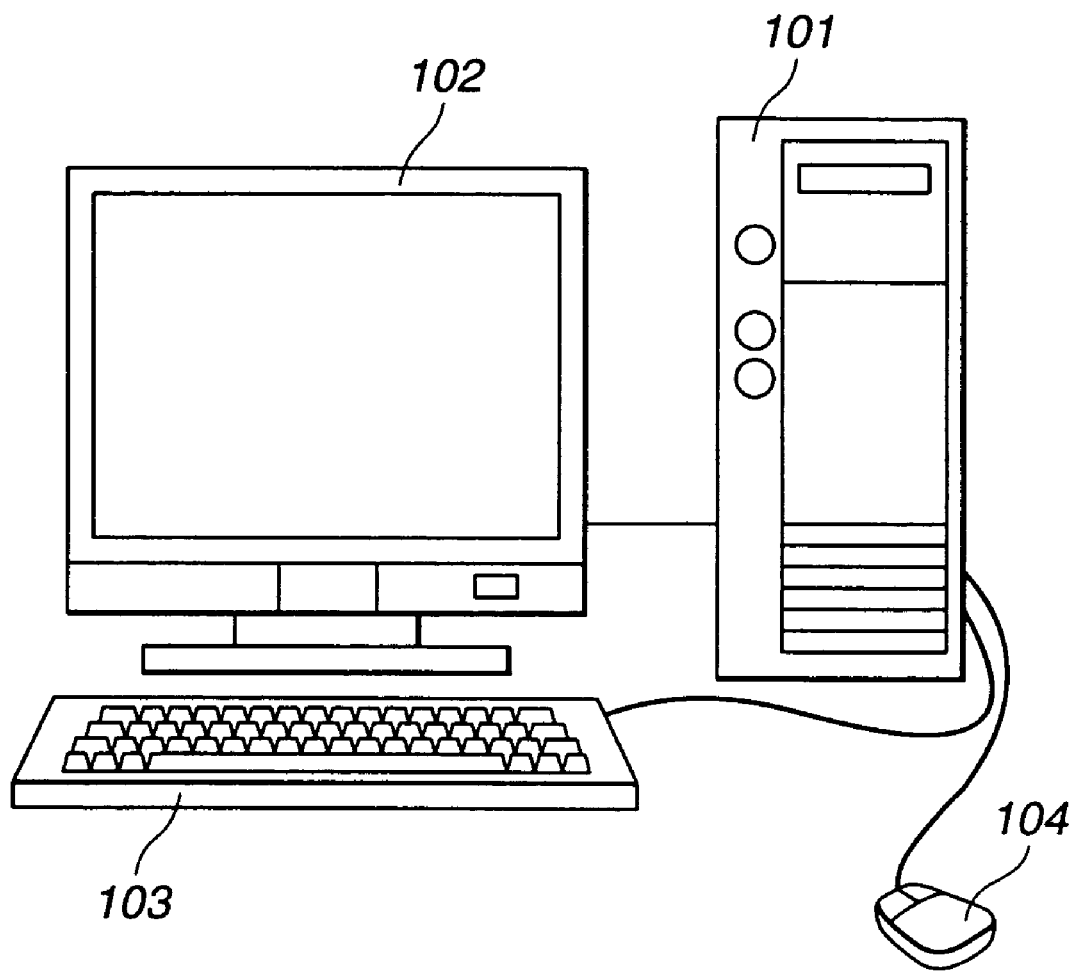
FIG. 12 is a diagram illustrating an external appearance of a direct-view stereoscopic-image display apparatus.

FIG. 12 is a diagram illustrating an external appearance of a direct-view stereoscopic-image display apparatus. A personal computer (PC) 101 which can execute stereoscopic-image display software (program) is connected to a direct-view display 102 having a stereoscopic-image display capability, a keyboard 103 and a mouse 104.

In the direct-view display 102, slits, or slits and lenticular lenses having a regular pattern in units of a pixel which are attached on the picture surface of the display arrange the optical paths of light beams emitted from adjacent points on the picture surface to go alternately in different directions, so that an image for the left eye and an image for the right eye can be seen only by the left eye and the right eye, respectively.

Although in the third embodiment, the case of using the direct-view display 102 is illustrated, the present invention may also be applied to cases of using a polarizing-spectacle-type display, a liquid-crystal-spectacle-type display, an HMD-type display, and the like. The display may have the physical configuration of a CRT, a liquid crystal, a plasma display, a projector, a reflecting plate, or the like.

Figure 13:
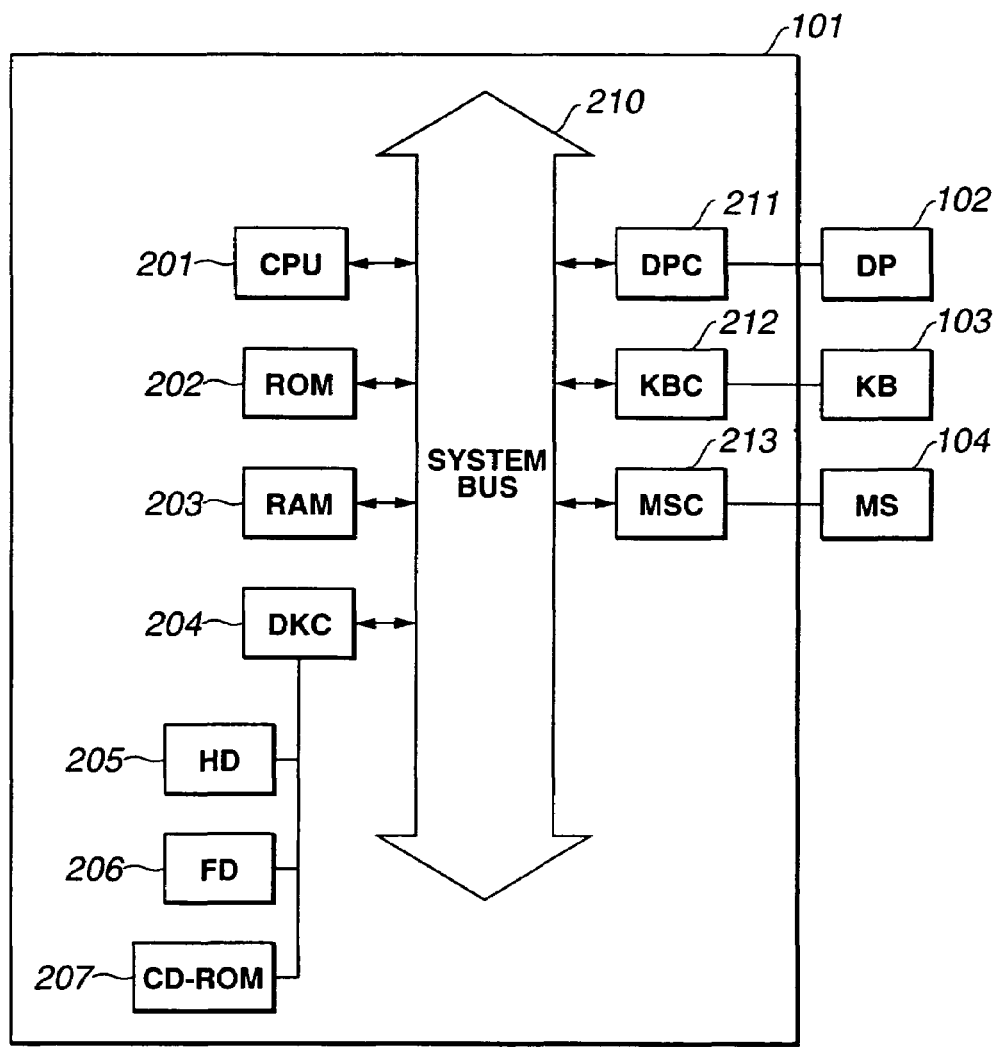
FIG. 13 is a block diagram illustrating the configuration of a PC 101, shown in FIG. 12, which can execute the stereoscopic-image display software.

FIG. 13 is a block diagram illustrating the configuration of the personal computer (PC) 101 which can execute the stereoscopic-image display software. The PC 101 includes a CPU 201 for executing programs stored in a ROM 202 or on a hard disk (HD) 205, or a stereoscopic-image display program supplied from a floppy-disk controller (FD) 206 or a CD-ROM drive (CD-ROM) 207. The CPU 201 controls respective devices connected to a system bus 210.

A RAM 203 operates as a main memory or working areas for the CPU 201. A disk controller (DKC) 204 controls access to the hard disk (HD) 205, the floppy-disk controller (FD) 206, and the CD-ROM drive (CD-ROM) 207. These storage media store boot programs, OSs, various types of application programs, editing files, user files, a stereoscopic-image display program, and the like.

A display controller (DPC) 211 controls display on the direct-view display (DP) 102 and other displays (not shown). A keyboard controller (KBC) 212 controls input of an instruction from a keyboard (KB) 103. A mouse controller (MSC) 213 controls input of an instruction from a pointing device, such as a mouse (MS) 104 or the like.

In the third embodiment, the stereoscopic-image display program is realized in a PC having the same hardware configuration as that of an ordinary PC. The third embodiment has a feature in software control which will be described below. The stereoscopic-image display apparatus can be realized in a computer having the same configuration as that of a PC which can realize the stereoscopic-image display apparatus shown in FIG. 12.

In the third embodiment, the stereoscopic-image display apparatus is stored on the hard disk (HD) 205. The principal portion of hardware is the CPU 201, and the principal portion of control of software is the stereoscopic-image display software stored on the hard disk (HD) 205.

The stereoscopic-image display software may be supplied in a state of being stored in a storage medium, such as a floppy disk, a CD-ROM or the like. In this case, the program is read from the storage medium by the floppy-disk controller (FD) 206 or the CD-ROM drive (CD-ROM) 207 shown in FIG. 13, or the like, and is installed on the hard disk (HD) 205.

Figure 14:
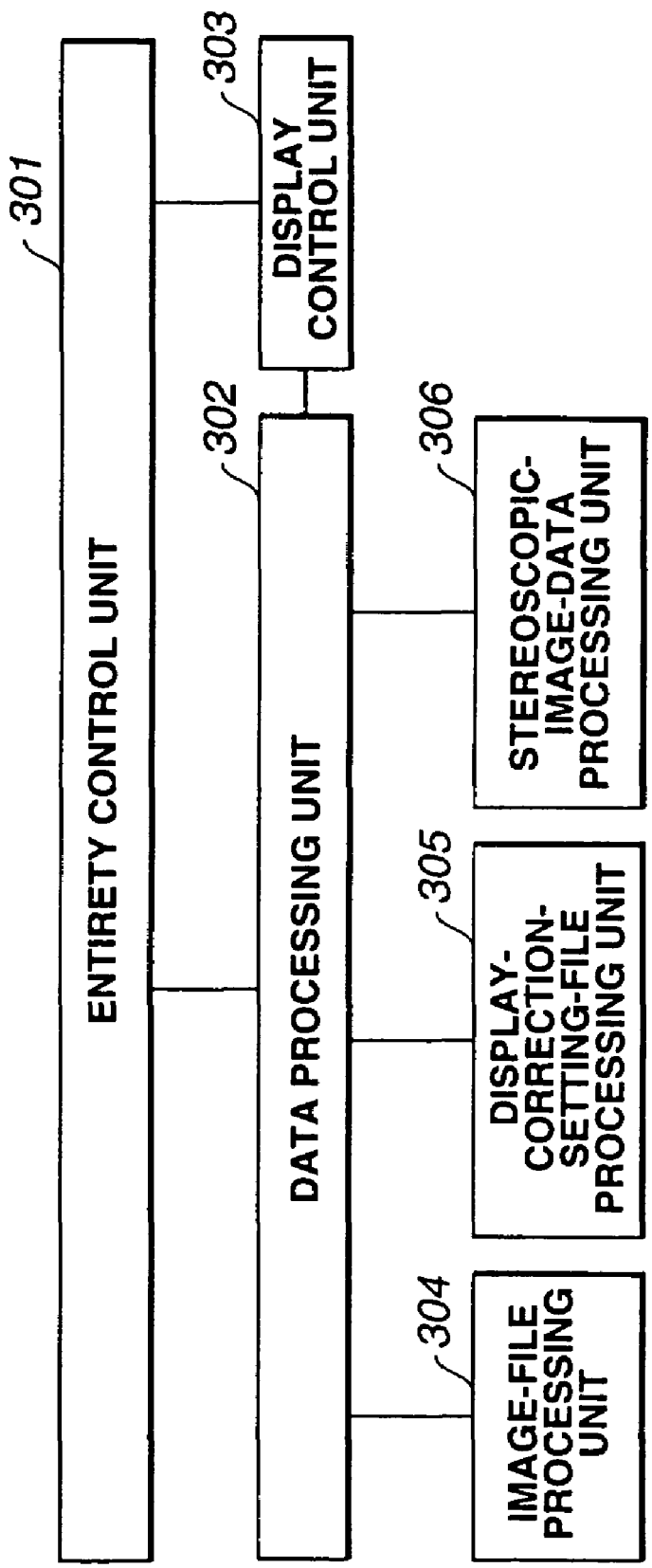
FIG. 14 is a diagram illustrating the configuration of modules of the stereoscopic-image display software.

FIG. 14 is a block diagram illustrating the configuration of modules of the stereoscopic-image display software. An entirety control unit 301 performs, for example, start and end of the stereoscopic-image display program, control of cooperating operations with other modules, storage, reading and the like of various setting values relating to the entire program, in a state of close cooperation with an OS. Modules directly controlled by the entire control unit 302 are a data processing unit 302 and a display control unit 303.

The data processing unit 302 performs, for example, reading of various files and processing of stereoscopic-image data in accordance with a request from the entirety control unit 301 or the display control unit 303. The data processing unit 302 includes three submodules i.e., an image-file processing unit 304, a display-correction-setting-file processing unit 305 and a stereoscopic-image-data processing unit 306, and executes the functions of the data processing unit 302 by controlling these submodules.

The image-file processing unit 304 reads various types of image files, analyzes the contents of the read file, decodes compressed data if necessary, and converts the data into image data having a predetermined standard format. The details of the image-file processing unit 304 will be described later.

The display-correction-setting-file processing unit 305 receives a request from the display control unit 303 via the data processing unit 302, and stores or reads setting values relating to display correction of a stereoscopic image in or from a file.

The stereoscopic-image-data processing unit 306 combines a pair of left and right image data in the standard format received from the image-file processing unit 304, based on display-correction setting data received from the display-correction-setting-file processing unit 305, to form stereoscopic-image data in a format adapted to a case of performing display on the direct-view display (DP) 102.

The display control unit 303 receives stereoscopic-image data formed by the stereoscopic-image-data processing unit 306 via the data processing unit 302, and displays the received data on the direct-view display (DP) 102. The display control unit 303 also receives an instruction from the user relating to display control input from the keyboard (KB) 103 or the mouse (MS) 104 via an OS or the entirety control unit 301, and performs display control corresponding to the received instruction. The types of display control will be described later. Each of the elements shown in block outline in FIG. 14, as well as in FIG. 15, is well known per se, and a specific type of construction is not critical to carrying out the invention or to a disclosure of the best mode for carrying out the invention.

Figure 15:
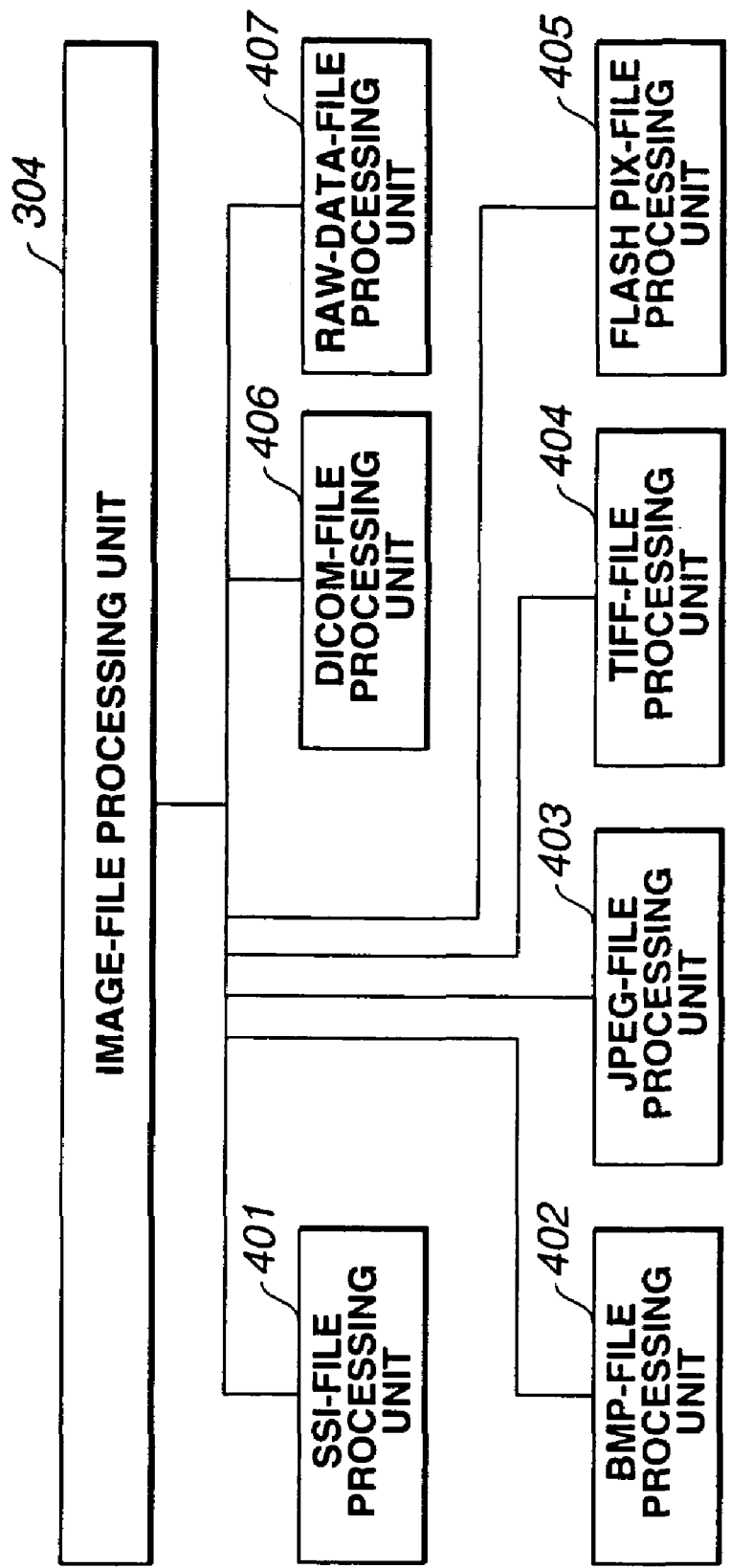
FIG. 15 is a diagram illustrating the configuration of an image-file processing unit 304 shown in FIG. 14.

FIG. 15 is a diagram illustrating the configuration of the image-file processing unit 304 shown in FIG. 14. The image-file processing unit 304 must process various types of image files and flexibly deal with data even when the number of types of files to be processed increases.

The image-file processing unit 304 has the structure of having a submodule for each type of file, so that it is only necessary to add a submodule for a new type of image file when the number of types of image files increases.

An SSI-file processing unit 401 reads an SSI file and analyzes the contents of the read file. The contents of an SSI file and the details of the SSI-file processing unit 401 will be described later.

A BMP-file processing unit 402, a JPEG-file processing unit 403, a TIFF-file processing unit 404, a FlashPix-file processing unit 405, a DICOM-file processing unit 406 and a RAW-data-file processing unit 407 read a BMP file, a JPEG file, a TIFF file, a FlashPix file, a DICOM file and a RAW-data file, respectively, analyze the contents of the read file, decode compressed data if necessary, and convert the data into image data having a predetermined standard form.

The standards of the BMP file are described in the manual of the Windows series, serving as the OS of Microsoft Corporation. The standards of the JEPG file are described in ISO/IEC 10918, serving as international standards. The standards of the TIFF file are described in a document "TIFF Revision 6.0" distributed by Adobe Systems Incorporated. The standards of the FlashPix file are described in a document "Flashpix Format Specification Version 1.01" distributed by Kodak Corporation.

The standards of the DICOM file are described in "NEMA Standards Publication PS 3. January 1992 Digital Imaging and Communications in Medicine (DICOM)", serving as international standards in the medical field.

The RAW-data file is a generic name for arbitrary uncompressed image-data files which do not belong to any of the above-described files, and does not have the standards of the format. The RAW-data file will be again described later when describing menus.

In the third embodiment, it is assumed that each of the BMP file, the JPEG file, the TIFF file and the FlashPix file includes only one frame within the file. Each of the TIFF file and the FlashPix file can include at least two frames within the file. However, even if at least two frames are included, only the first frame is read, and the second and succeeding frames are neglected. The file name of each of the BMP file, the JPEG file, the TIFF file and the FlashPix file can be described in the SSI file.

In the third embodiment, it is assumed that each of the DICOM file and the RAW-data file includes at least one frame within the file. Accordingly, each of the DICOM file and the RAW-data file can represent serial images only with one file. In this case, each frame contained in the DICOM file or the RAW-data file is arranged only at the uppermost row of the two-dimensional arrangement of serial images.

That is, each frame is sequentially arranged to the right starting from the origin (the uppermost left corner) of the two-dimensional arrangement in the order of storage in the file.

The file name of each of the DICOM file and the RAW-data file can be described in the SSI file. It is assumed that each of the DICOM file and the RAW-data file described in the SSI file includes only one frame within the file. When a plurality of frames are included, the second and succeeding frames are neglected, because, as will be described later, the SSI file is a file for representing serial images. If an image file whose file name is described in the SSI file further represents serial images, processing of serial images is very complicated because of the generation of multiple series.

In order to avoid such trouble, processing is performed assuming that an image file whose file name is described in the SSI file includes only one frame.

FIGS. 16A and 16B are diagrams illustrating an example of the most basic description and the two-dimensional arrangement, respectively, of the SSI file. The format of the SSI file is uniquely provided by the inventors of the present invention. In this specification, in order to simplify the description, the entirety of the format of the SSI file will not be described. Instead, only items relating to the present invention will be described.

The SSI file is a file for representing serial images, and does not contain image data. In the SSI file, image-file names for the left eye and image file names for the right eye (the file names of stereoscopic pairs) included in serial images are sequentially described, and a predetermined control-character string is also described.

Two file names written on each row of the example of description shown in FIG. 16A are an image-file name for the left eye and an image-file name for the right eye. In FIG. 16A, a character string "<P>" is a control-character string for moving the position on the two-dimensional arrangement of serial images downward by one row and to the leftmost side.

FIG. 16B illustrates the two-dimensional arrangement of serial images corresponding to the description of the SSI file shown in FIG. 16A. In FIG. 16B, a large rectangle represents the two-dimensional arrangement of serial images, and a small rectangle represents each element of the two-dimensional arrangement, i.e., the file name of a stereoscopic image or a stereoscopic pair. The position of each element of the two-dimensional arrangement is described within the small rectangle in the format of (X coordinate, Y coordinate).

The SSI-file processing unit 401 shown in FIG. 15 sequentially reads respective rows of the SSI file, and sequentially stores the file names of stereoscopic pairs on the two-dimensional arrangement which is provided in advance. At that time, the position to be stored starts from the origin (0,0) of the two-dimensional arrangement, sequentially moves to the right, and, when the control-character string "<P>" appears in the SSI file, moves downward by one row and to the leftmost side. Thus, the SSI-file processing unit 401 stores the file names of stereoscopic pairs of serial images described in the SSI file so as to correspond to the positions on the two-dimensional arrangement.

The configurations of application windows displayed during operations according to the stereoscopic-image display program will now be described with reference to FIGS. 17 through 20.

Figure 17:
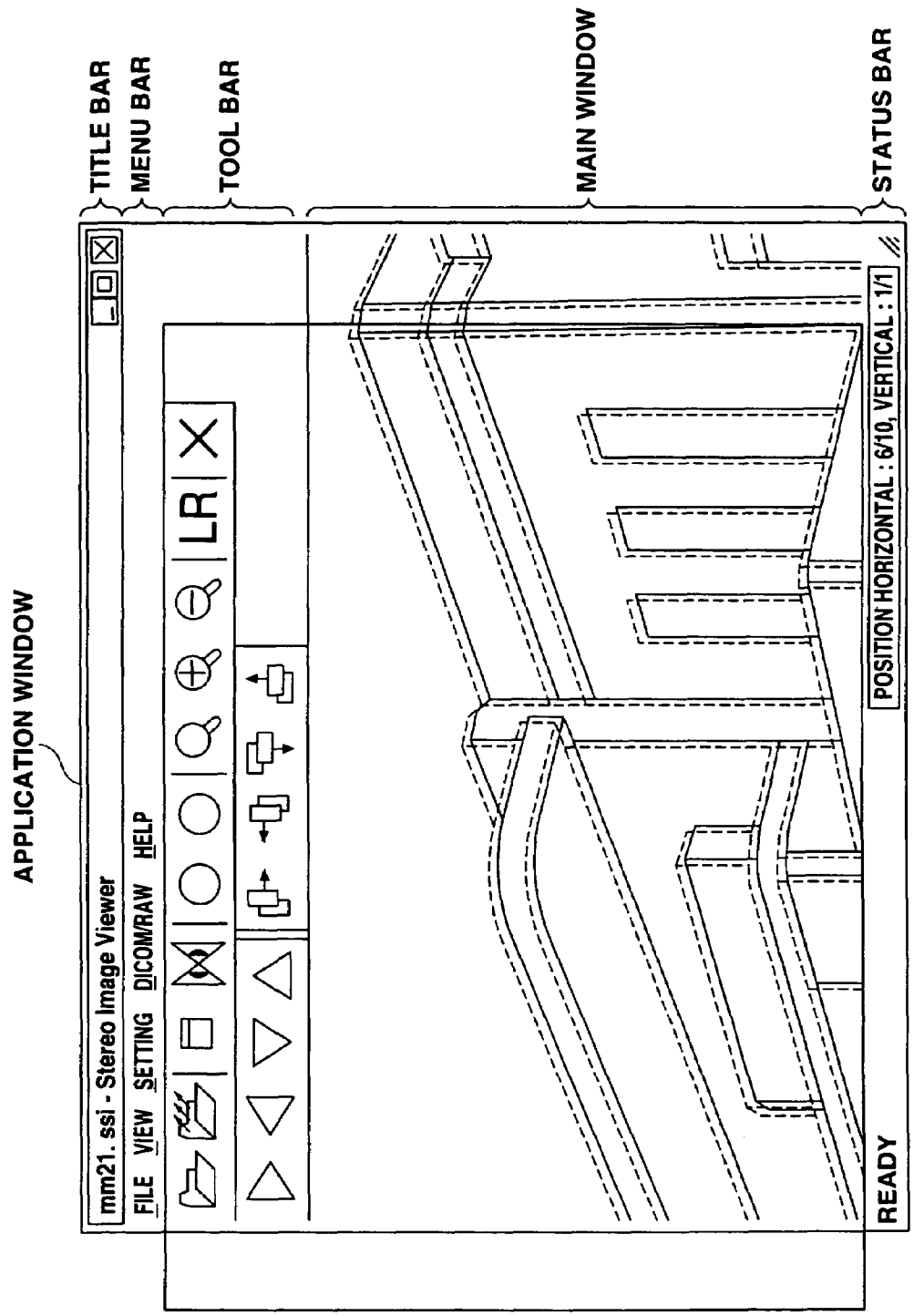
FIG. 17 is a diagram illustrating the configuration of an application window of a stereoscopic-image display program.

FIG. 17 is a diagram illustrating the configuration of an application window of the stereoscopic-image display program. The components of the application window are a title bar, a menu bar, a tool bar, a main window and a status bar, from above.

At the left side of the title bar, an icon indicating the stereoscopic-image display program, and the title of the window are displayed in this order starting from the left end. The title of the window includes a file name opened by the stereoscopic-image display program. At the right side of the title bar, a minimizing button, a maximizing button and a closing button are displayed in this order from the left side. Since these buttons are standard Windows buttons, further description thereof will be omitted.

Main menus are displayed on the menu bar. The details of the main menus will be described later.

Figure 18:
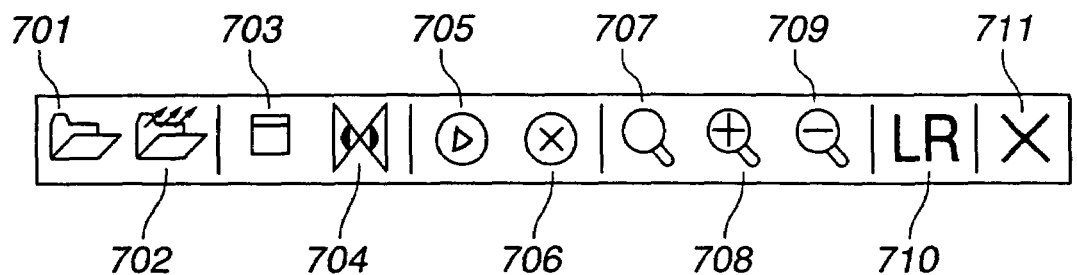
FIG. 18 is a diagram illustrating a main tool bar.
Figure 19:
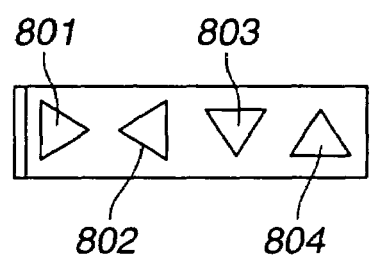
FIG. 19 is a diagram illustrating a manual-switching tool bar.
Figure 20:
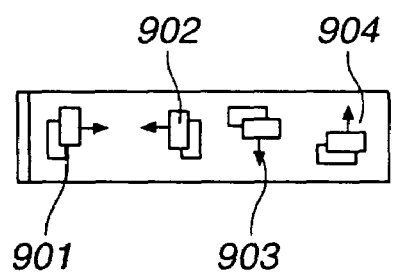
FIG. 20 is a diagram illustrating a deviation-correction tool bar.

The tool bar includes three tool bars, i.e., a main tool bar, a manual-switching tool bar, and a deviation-correction tool bar. FIG. 18 illustrates the main tool bar. FIG. 19 illustrates the manual-switching tool bar. FIG. 20 illustrates the deviation-correction tool bar. Each tool bar provides means for replacing a part of the functions of the menu. That is, each icon in the tool bar corresponds to each item of the menu (to be described later). Mouse clicking of an icon on the tool bar by the user and selection of a corresponding menu item by the user provide the same result. The function of each icon on the tool bar will be described later together with the function of each item of the menu.

The main tool bar shown in FIG. 18 includes an "open" icon 701, an "open plural consecutive images" icon 702, a "display entire picture frame" icon 703, an "inversion in horizontal direction" icon 704, a "start automatic display" icon 705, a "stop automatic display" icon 706, an "original size" icon 707, a "magnification" icon 708, a "reduction" icon 709, a "confirm left/right" icon 710, and an "end" icon 711.

The manual-switching tool bar shown in FIG. 19 includes a "display image present at immediate right" icon 801, a "display image present at immediate left" icon 802, a "display image at immediately below" icon 803, and a "display image at immediately above" icon 804.

The deviation-correction tool bar shown in FIG. 20 includes a "shift right image to right" icon 901, a "shift right image to left" icon 902, a "shift right image downward" icon 903, and a "shift right image upward" icon 904.

On the main window, a stereoscopic image in a form suitable when performing display using the direct-view display (DP) 102 which is formed by the stereoscopic-image-data processing unit 306 is displayed. On the main window shown in FIG. 17, in order to easily understand that a stereoscopic image is displayed, one of an image for the left eye and an image for the right eye is depicted with solid lines and another image is depicted with broken lines. The situation is the same in FIGS. 48, 49 and 50 which will be described later.

At the left end of the status bar shown in FIG. 17, the operational state of application software is displayed in the form of character information. When the user makes a menu item in a selected state, or a mouse cursor is moved onto an icon of the tool bar, a brief description of the selected menu item or icon is displayed at that portion.

When one of the SSI file, the DICOM file and the RAM-data file has been opened according to the stereoscopic-image display program, the size of the two-dimensional arrangement of serial images represented by the opened file, and the position of the stereoscopic image currently displayed on the main window are displayed at the right end of the status bar.

Figure 21:
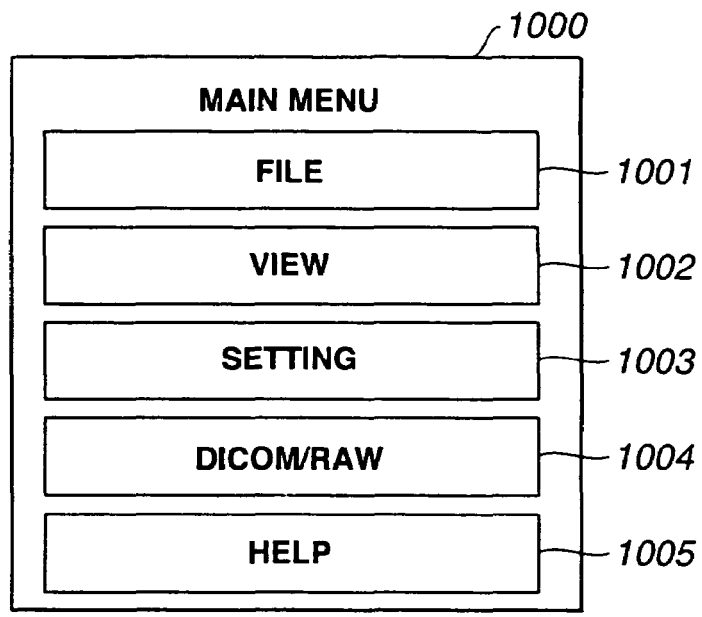
FIG. 21 is a diagram illustrating a main menu 1000.

Next, menus will be described with reference to FIGS. 21 through 26. FIG. 21 is a diagram illustrating a main menu 1000. The main menu 1000 includes five submenus, i.e., a file menu 1001, a display menu 1002, a setting menu 1003, a DICOM/RAW menu 1004 and a help menu 1005.

Figure 22:
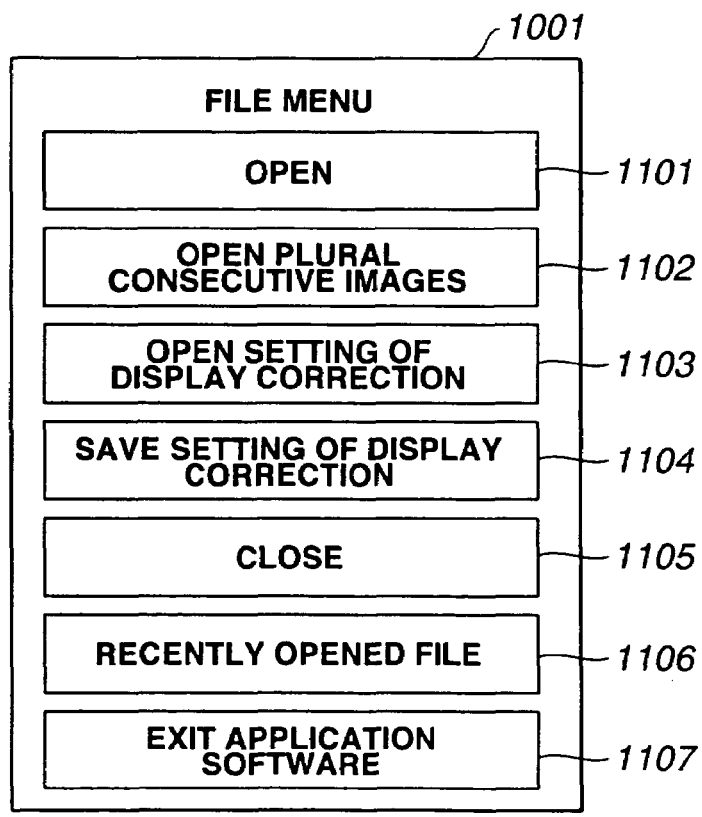
FIG. 22 is a diagram illustrating a file menu 1001.
Figure 27:
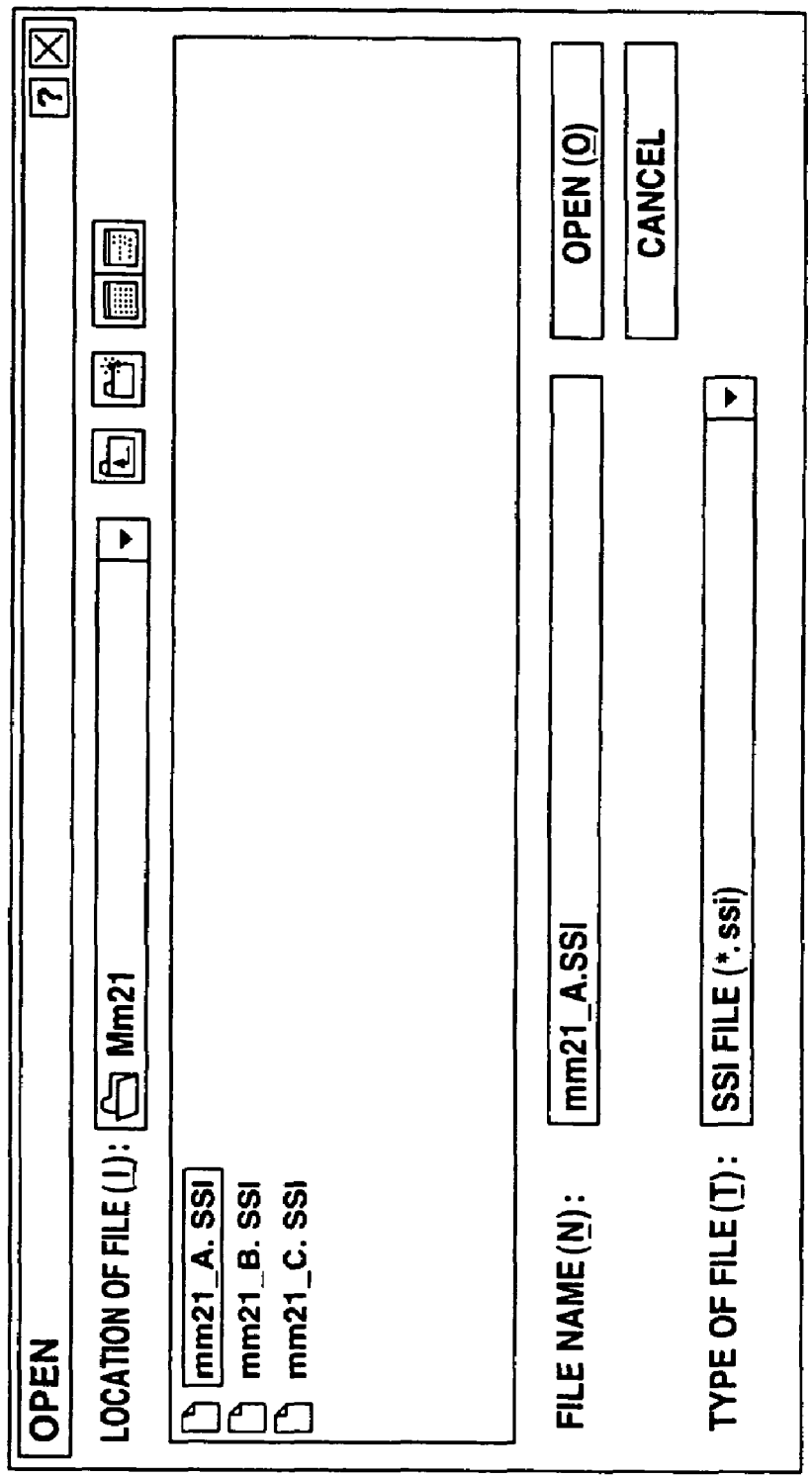
FIGS. 27 and 28 are diagrams, each illustrating an "open" dialog box.
Figure 28:
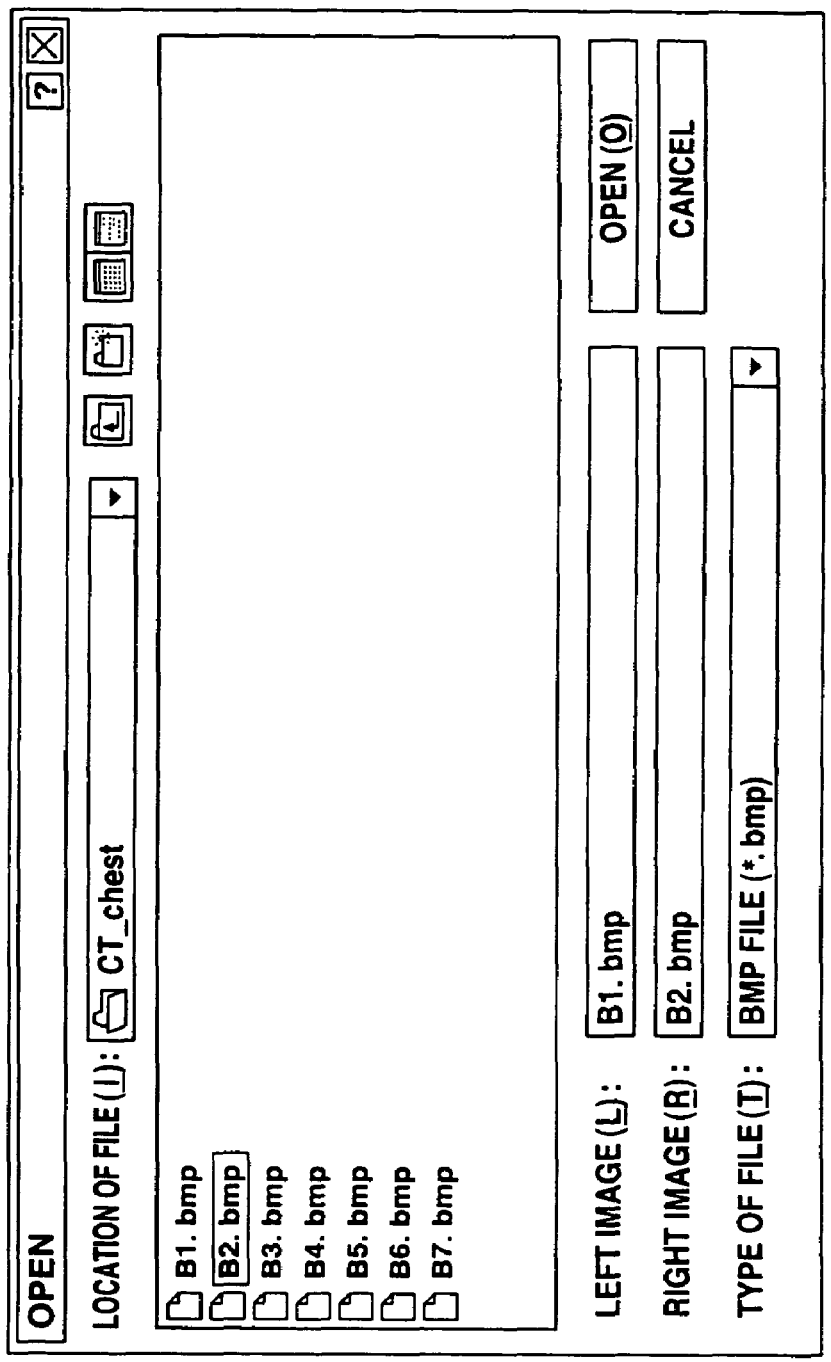

FIG. 22 is a diagram illustrating the file menu 1001. The file menu 1001 has the following menu items. An "open" menu item 1101 corresponds to the "open" icon 701 shown in FIG. 18, and is selected when opening an image file. By selecting the "open" menu item 1101 or performing mouse clicking of the "open" icon 701, an "open" dialog box is displayed. FIGS. 27 and 28 are diagrams, each illustrating an "open" dialog box.

In the open dialog box, when the user selects or directly inputs a "file name" after selecting a "location of file" and a "type of file", and then depresses an "open" button, the "open" dialog box is closed, and then the assigned image file is opened.

On this "open" dialog box, when the SSI file, the DICOM file including a plurality of frames, or the RAW-data file including a plurality of frames is selected as the "type of file", a state in which only one "file name" can be input is provided, as shown in FIG. 27. When the image file assigned by the user using the "open" dialog box is the SSI file, the files of the first stereoscopic pair described in the SSI file are read and synthesized, and then a stereoscopic image is displayed.

When the image file assigned by the user is the DICOM file including a plurality of frames or the RAW-data file including a plurality of frames, the first frame and a frame having a predetermined frame interval with the first frame are read and synthesized, and then a stereoscopic image is displayed. The above-described predetermined frame interval is a value set in a "setting of frame interval between left image and right image" menu 1401 (see FIG. 25) which will be described later.

On the "open" dialog box, when the BMP file, the JPEG file, the TIFF file, the FlashPix file, the DICOM file including only one frame, or the RAW-data file including only one frame is selected as the "type of file", then, as shown in FIG. 28, a state in which one "left image" file name and one "right image" file name can be selected is provided. In this case, since only one stereoscopic pair can be provided, that stereoscopic pair is read and synthesized, and then a stereoscopic image is displayed.

An "open plural consecutive images" menu item 1102 corresponds to the "open plural consecutive images" icon 702 shown in FIG. 18, and is selected when automatically forming an SSI file from a plurality of consecutive image files, and automatically opening that SSI file. The plurality of consecutive image files indicate a set of image files which satisfies all of the following four conditions.

(1) The image files are under the same directory (although they may be separated in a plurality of subdirectories having the same depth).

(2) The image files have the same extender, or none of the image files have an extender.

(3) A part of the path name of each of the image files comprises a numerical-character string having a fixed number of digits, and the number of the numerical-character string consecutively changes in a plurality of files.

(4) The contents of images consecutively change in the order of the numbers of file names (usually, the contents of the image rotate with a constant angle in a fixed direction).

Figure 29:
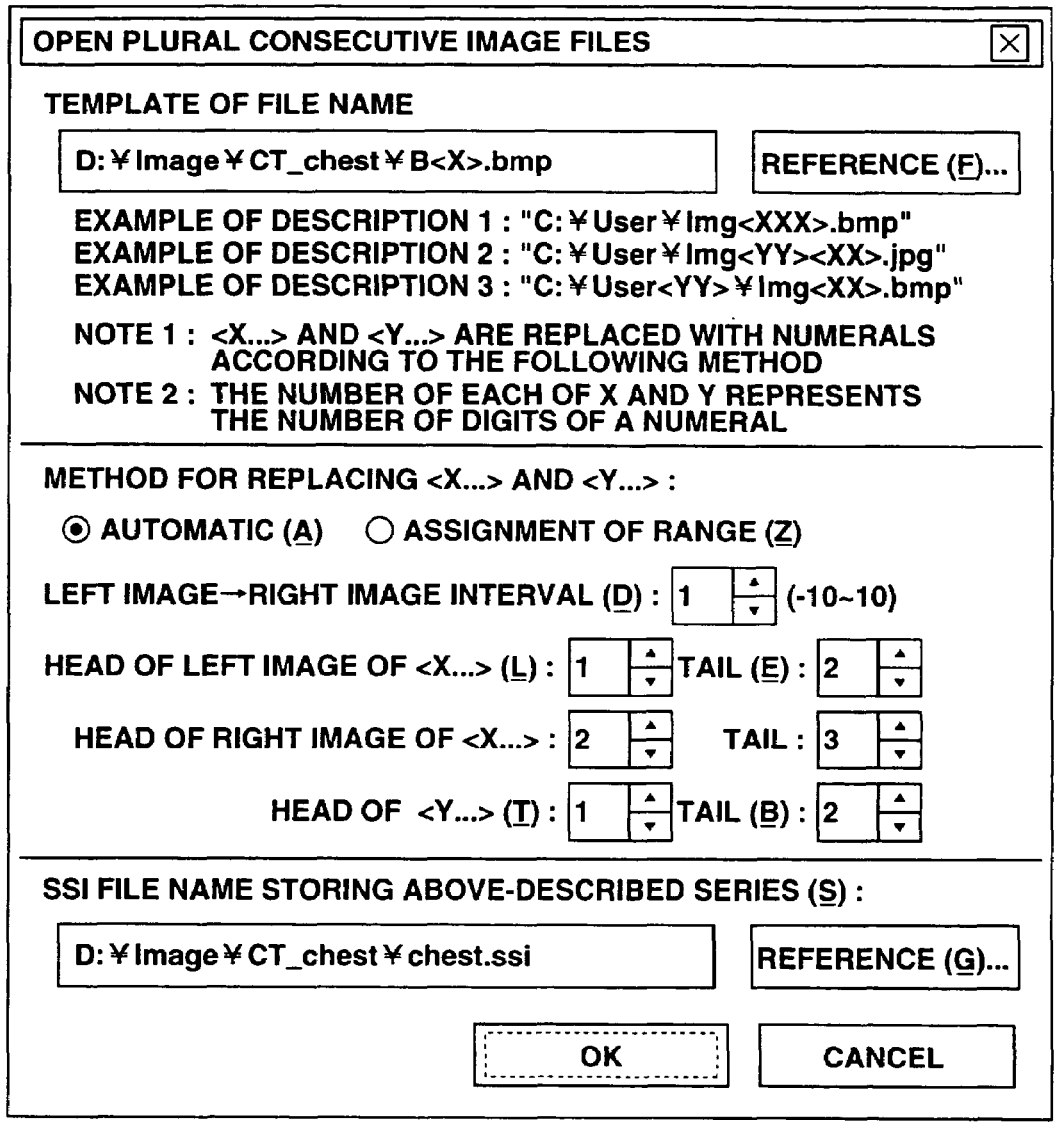
FIG. 29 is a diagram illustrating an "open plural consecutive images" dialog box.

By selecting the "open plural consecutive images" menu item 1102, or performing mouse clicking of the "open plural consecutive images" icon 702, an "open plural consecutive image files" dialog box is displayed. FIG. 29 is a diagram illustrating the "open plural consecutive image files" dialog box.

On the "open plural consecutive image files" dialog box, when the user inputs a "template of file name" and an "SSI file name storing above-described series", changes a "method for replacing <X . . . > and <Y . . . >" if necessary, and finally depresses an "OK" button, character strings <X . . . > and <Y . . . > in the "template of file name" character string are automatically replaced with consecutive numerical character strings, to form a plurality of consecutive image-file names. A plurality of stereoscopic-pair file names are formed from the plurality of consecutive image file names, and are described in the SSI file assigned by the "SSI file name storing above-described series". Then, the "open plural consecutive image files" dialog box is closed.

When an SSI file is normally formed, the SSI file is automatically opened, the first stereoscopic-pair file described in the SSI file is read and synthesized, and then a stereoscopic image is displayed.

The <X . . . > character string is a character string in which a character "X" is repeatedly described between a "<" character and a ">" character by the number of digits of a numerical-character string. Similarly, the <Y . . . > character string is a character string in which a character "Y" is repeatedly described between the "<" character and the ">" character by the number of digits of the numerical-character string.

The character string to be input in the "template of file name" may be a character string including only the <X . . . > character string, or a character string including both of the <X . . . > character string and the <Y . . . > character string, but cannot be a character string including only the <Y . . . > character string. The <X . . . > character string and the <Y . . . > character string correspond to the dimension in the horizontal direction and the dimension in the vertical direction, respectively, of the two-dimensional arrangement of serial images.

Figure 31:
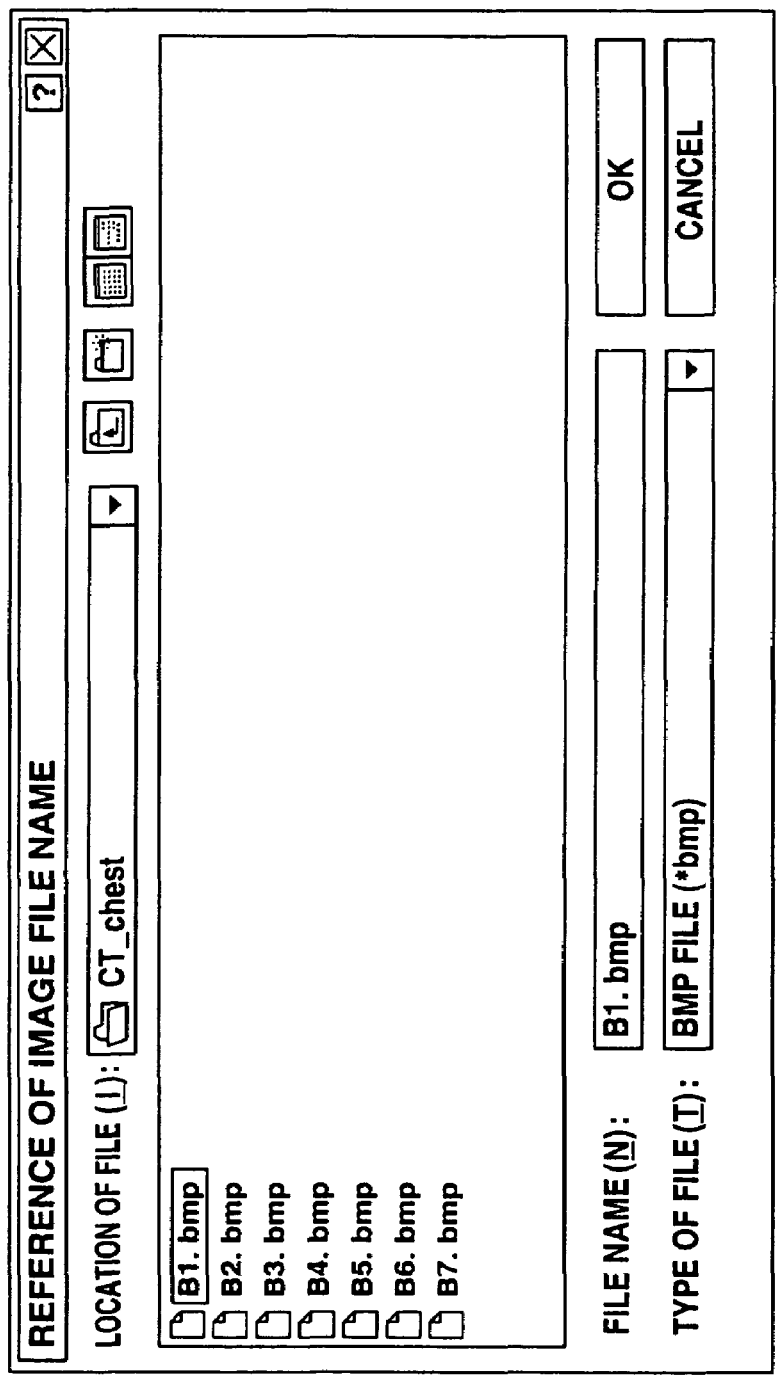
FIG. 31 is a diagram illustrating a "reference of image file name" dialog box.

On the "open plural consecutive image files" dialog box, when a "reference" button at the right of the "template of file name" is depressed, a "reference of image-file name" dialog box is displayed. FIG. 31 is a diagram illustrating the "reference of image-file name" dialog box. On the "reference of image-file name" dialog box, when the user depresses an "OK" button after inputting a "file name", the "reference of image-file name" dialog box is closed, and then the following two types of processing are performed. In one type of processing, a character string where the last numerical-character string included in the full path name of the file assigned by the user is replaced with a <X . . . > character string is automatically formed from the full path name of the assigned file, and is automatically input to the "template of file name". In another type of processing, a character string where the last numerical-character string included in the full path name of the assigned file is removed is automatically formed from the full path name of the file, and is automatically input to the "SSI file name storing above-described series".

Figure 32:
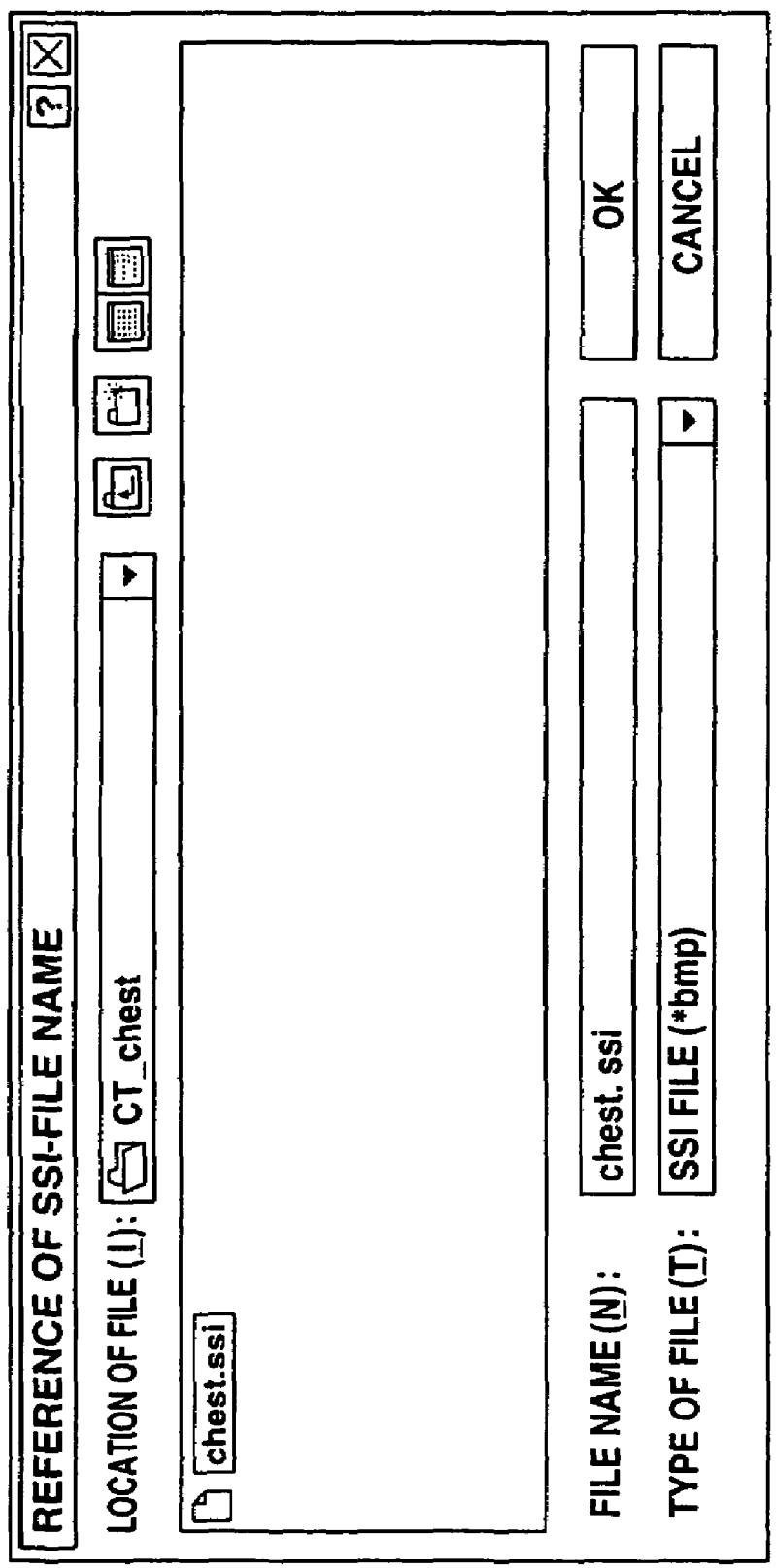
FIG. 32 is a diagram illustrating a "reference of SSI-file name" dialog box.

On the "open plural consecutive image files" dialog box, when a "reference" button at the right of the "SSI-file name storing above-described series" is depressed, a "reference of SSI-file name" dialog box is displayed. FIG. 32 is a diagram illustrating the "reference of SSI-file name" dialog box.

On the "reference of SSI file name" dialog box, when the user depresses an "OK" button after inputting a "file name", the reference of SSI file name dialog box is closed, and then the full path name of the file assigned by the user is automatically input to the "SSI file name storing above-described series".

On the "open plural consecutive image files" dialog box, when "automatic" is selected as the "method for replacing <X . . . > and <Y . . . >" as shown in FIG. 29, a state in which only a "left image→right image interval" can be assigned is provided. The "left image→right image interval" is a value for assigning the numerical value of a numerical-character string provided for the image-file name for the right eye, relative to the numerical value of a numerical-character string provided for the image-file name for the left eye, when a plurality of file names are formed by automatically replacing the <X . . . > character string within the "template of file name" character string with consecutive numerical-character strings. For example, when seven files, i.e., "B1.bmp", "B2.bmp", . . . "B7.bmp", are present in a root directory of a C drive, and a character string "C:¥B<X>.bmp" is input to the "template of file name", if "1" is input to the "left image→right image interval", the following six stereoscopic-pair file names are automatically formed:

C:¥B1.bmp C:¥B2.bmp
C:¥B2.bmp C:¥B3.bmp
C:¥B3.bmp C:¥B4.bmp
C:¥B4.bmp C:¥B5.bmp
C:¥B5.bmp C:¥B6.bmp
C:¥B6.bmp C:¥B7.bmp.

Similarly, if "−2" is input to the "left image→right image interval", the following five stereoscopic-pair file names are formed:

C:¥B3.bmp C:¥B1.bmp
C:¥B4.bmp C:¥B2.bmp
C:¥B5.bmp C:¥B3.bmp
C:¥B6.bmp C:¥B4.bmp
C:¥B7.bmp C:¥B5.bmp.

The sign of the value input to the "left image→right image interval" is determined by the horizontal directions in which the contents of each image included in the plurality of consecutive image files rotate. That is, in the case of rotation of the contents of each image to the left (i.e., rotation in which the image facing the front side gradually rotates toward the left), a positive value is input. On the other hand, in the case of rotation of the contents of each image to the right (i.e., rotation in which the image facing the front side gradually rotates toward the right), a negative value is input. The value input to the "left image→right image interval" is determined by the degrees to which the contents of each image included in the plurality of consecutive image file rotate. When the angle of rotation of the contents of the image is represented by α degrees, and the absolute value of the "left image→right image interval" is represented by d, a value so as to provide a condition close to α×d=6 (degrees) is appropriate for d.

When "automatic" is selected as the "method for replacing <X . . . > and <Y . . . >", since whether or not file names obtained when the stereoscopic-image display program replaces the <X . . . > character string and the <Y . . . > character string contained in the "template of file name" with numerical-character strings actually exist is automatically checked, only stereoscopic-pair files using only existing file names are written in the SSI file.

Figure 30:
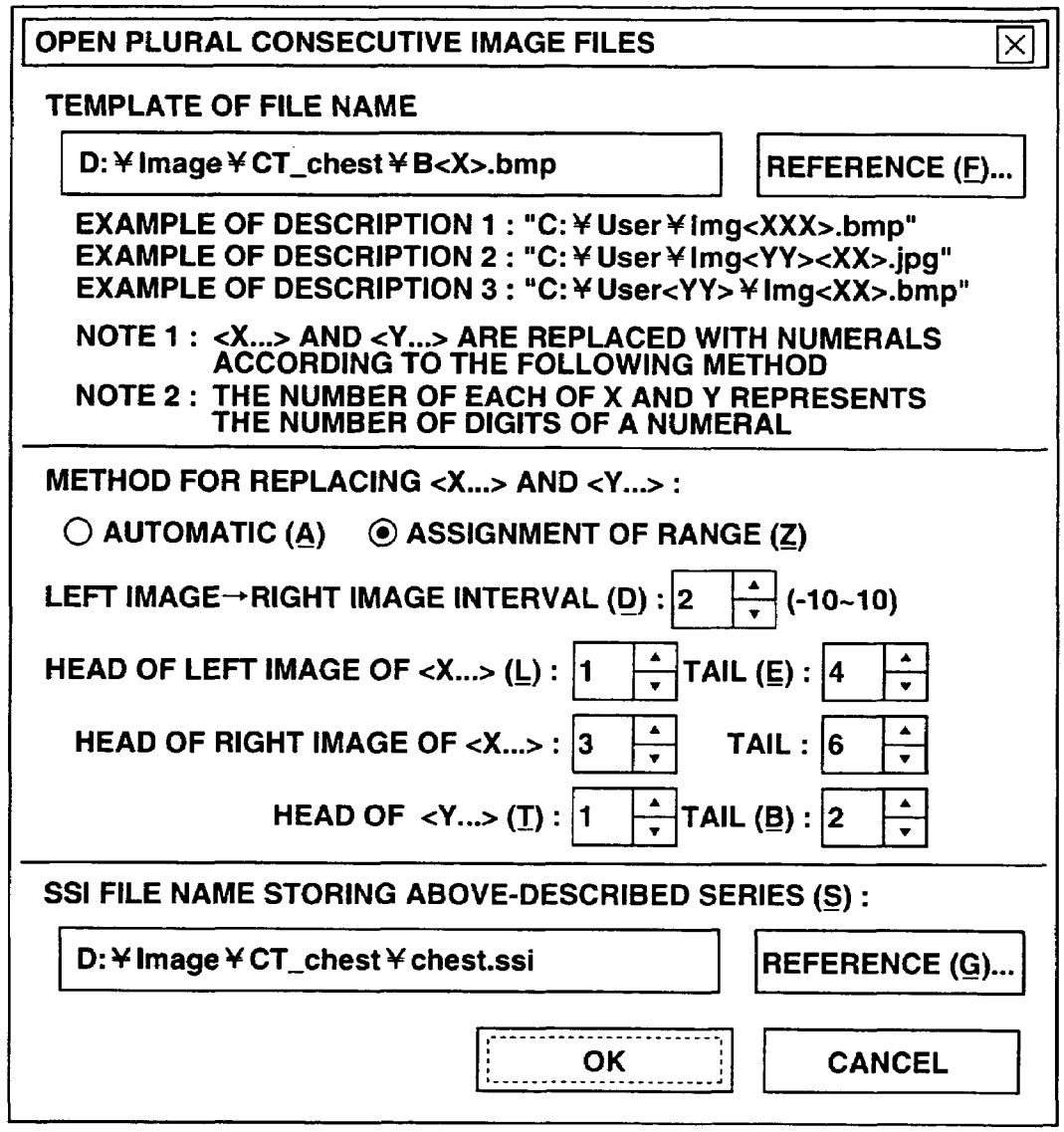
FIG. 30 is a diagram illustrating the "open plural consecutive images" dialog box when "assignment of range" has been selected as a "method for replacing <X . . . > and <Y . . . >"

FIG. 30 is a diagram illustrating an "open plural consecutive image files" when "assignment of range" has been selected as the "method for replacing <X . . . > and <Y . . . >". As shown in FIG. 30, on the "open plural consecutive image files", when the "assignment of range" has been selected as the "method for replacing <X . . . > and <Y . . . >", an "left image→right image interval", a "head of left image of <X . . . >", a "tail of left image <X . . . >", a "head of right image of <Y . . . >" and a "tail of right image of <Y . . . >" can be assigned.

The "head of right image of <X . . . >" and the "tail of right image of <X . . . >" are automatically calculated from other values. Hence, the user cannot assign these values.

Thus, when the user inputs the "template of file name" and the "SSI file name storing above-described series", changes the "method for replacing <X . . . > and <Y . . . >" if necessary, and finally depresses the "OK" button, an SSI file is automatically formed, and then the "open plural consecutive image files" dialog box is closed. When the SSI file has been normally formed, the SSI file is automatically opened, the first stereoscopic-pair file described in the SSI file is read and synthesized, and then a stereoscopic image is displayed.

An "open setting of display correction" menu item 1103 shown in FIG. 22 is selected when opening and reading setting values relating to display correction of a stereoscopic image (display-correction setting values) by opening a display-correction setting file. The display-correction setting values are values which can be set using each menu item of a "correction of deviation" submenu 1301, or a "bump correction of deviation" menu item 1306 (see FIG. 24, which will be described later), or values which can be set using respective menu items of the "DICOM/RAW" menu 1004 (to be described later, see FIG. 21).

Figure 33:
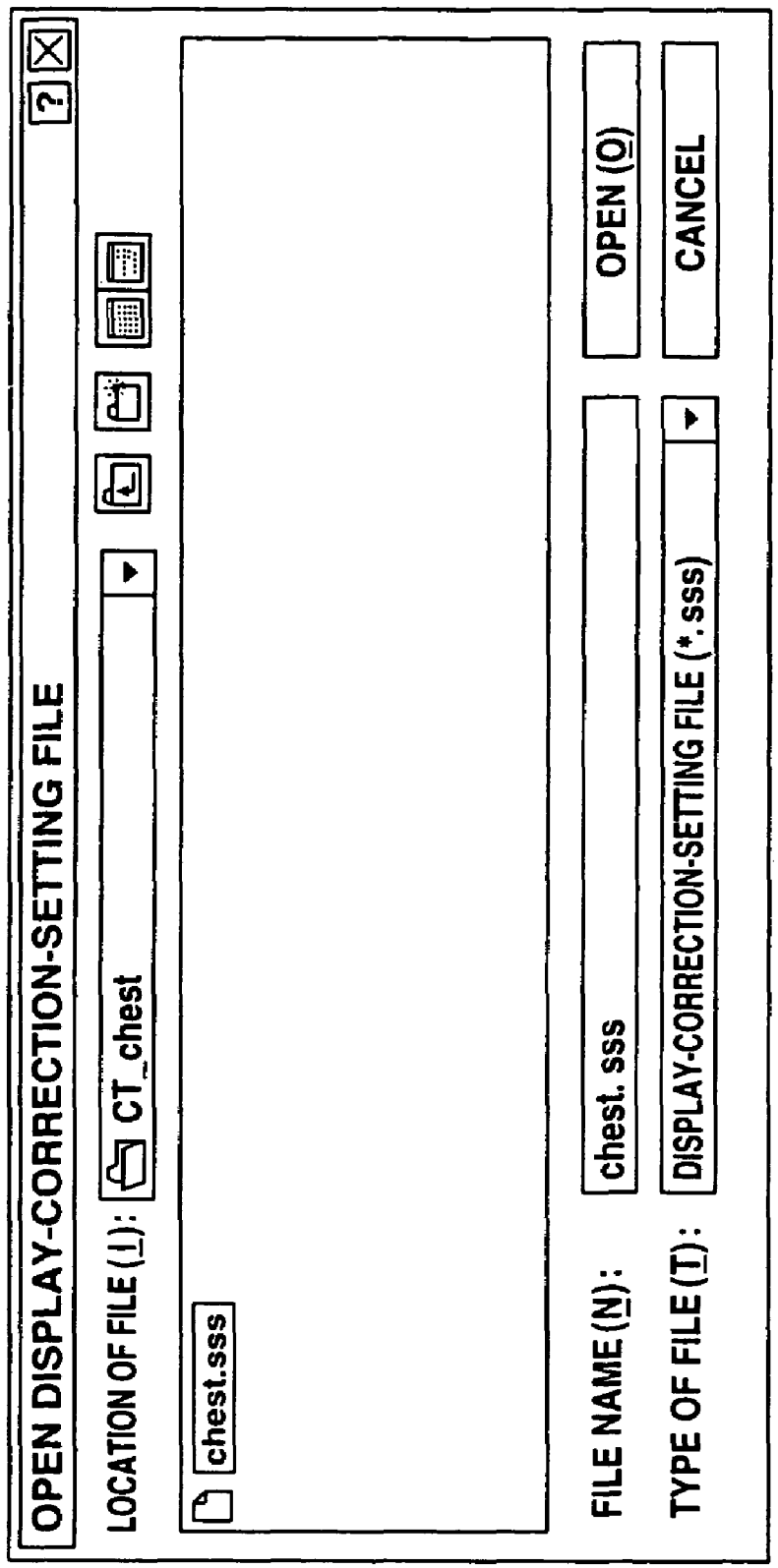
FIG. 33 is a diagram illustrating an "open display-correction-setting file" dialog box.

When the "open setting of display correction" menu item 1103 has been selected, an "open display-correction-setting file" dialog box is displayed. FIG. 33 is a diagram illustrating the "open display-correction-setting file" dialog box. On the "open display-correction-setting file" dialog box, when the user selects or directly inputs a "file name" after selecting a "location of file", and finally depresses an "open" button, the assigned display-correction-setting file is opened after closing the "open display-correction-setting file" dialog box, and display-correction-setting values are read.

When the display-correction-setting-file processing unit 305 (see FIG. 14) reads display-correction setting values by opening the display-correction-setting file, the read setting values are transmitted to the stereoscopic-image-data processing unit 306 via the data processing unit 302. The stereoscopic-image-data processing unit 306 corrects the form of display of the stereoscopic image based on the display-correction setting values. The corrected stereoscopic image is transmitted to the display control unit 303 via the data processing unit 302, and is displayed on the direct-view display 101.

Figure 34:
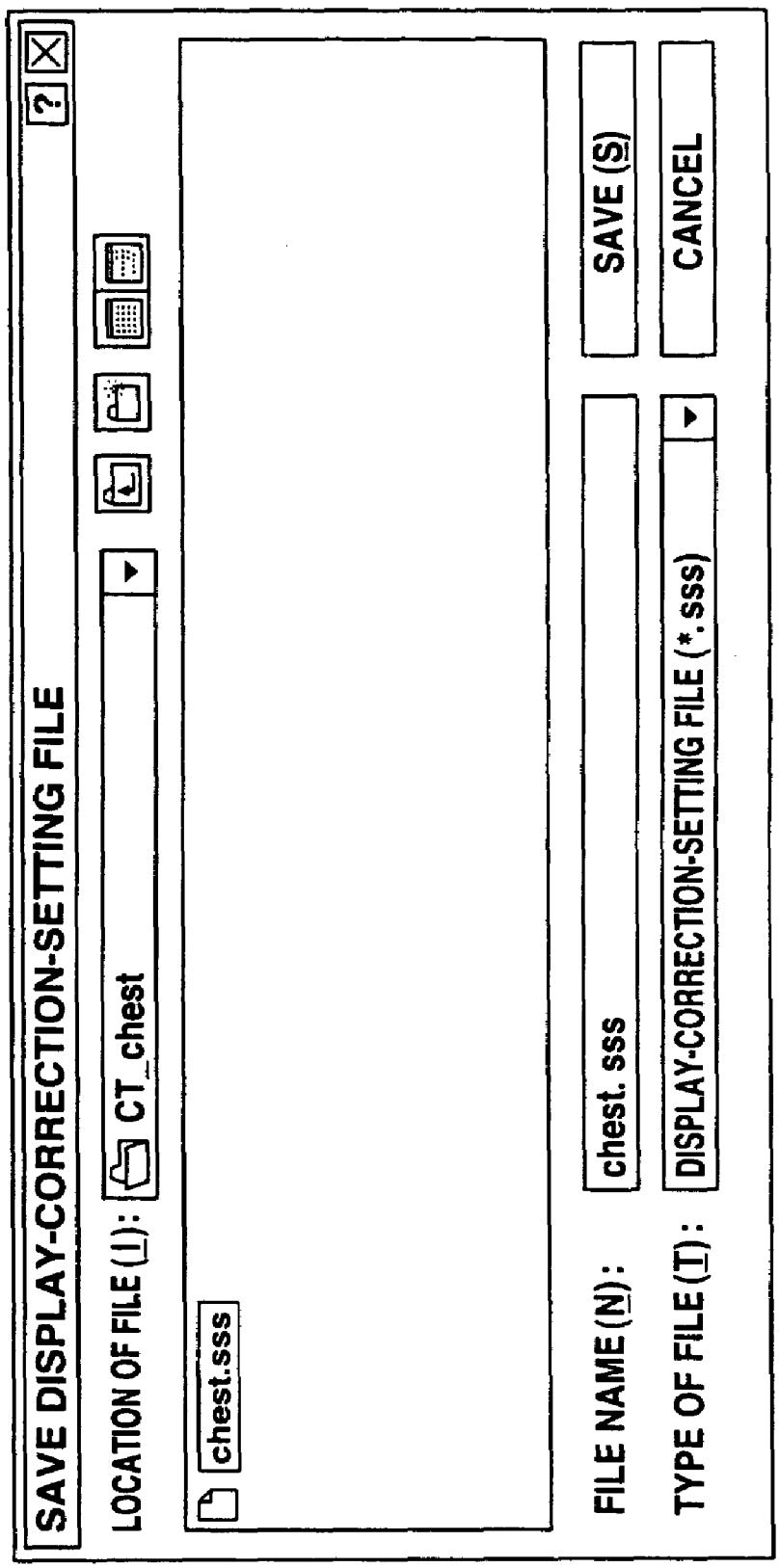
FIG. 34 is a diagram illustrating a "save display-correction-setting file dialog box.

A "store setting of display correction" menu item 1104 is selected when storing display-correction setting values in the display-correction-setting file. When the "store setting of display correction" menu 1104 has been selected, a "store display-correction-setting file" dialog box is displayed. FIG. 34 is a diagram illustrating the "store display-correction-setting file" dialog box. On the "store display-correction-setting file" dialog box, when the user selects or directly inputs a "file name" after selecting a "location of file", and finally depresses a "store" button, display-correction setting values are stored in the assigned display-correction-setting file after closing the "store display-correction-setting file" dialog box.

The display-correction setting values set by the user are input to the display control unit 303, and are transmitted to the stereoscopic-image-data processing unit 306 via the data processing unit 302. When the display-correction-setting-file processing unit 305 stores the display-correction-setting file, the display-correction setting values are transmitted from the stereoscopic-image-data processing unit 306 to the display-correction-setting-file processing unit 305 via the data processing unit 302.

A "close" menu item 1105 is selected when closing the currently opened image file. When the "close" menu item 1105 has been selected, the currently opened image file is closed, and only a background color is displayed on the main window.

A "recently opened file" menu item 1106 is selected when reopening a recently opened image file. When the "recently opened file" menu item 1106 has been selected, the file names of eight recently opened image files at maximum are displayed. When the user has selected one of these file names, the selected image file is opened. The method for opening the image file is the same as the method described in the "open" menu item 1101. However, when the "recently opened file" menu item 1106 has been selected, since a file name has already been assigned, an "open" dialog box is not displayed.

Figure 23:
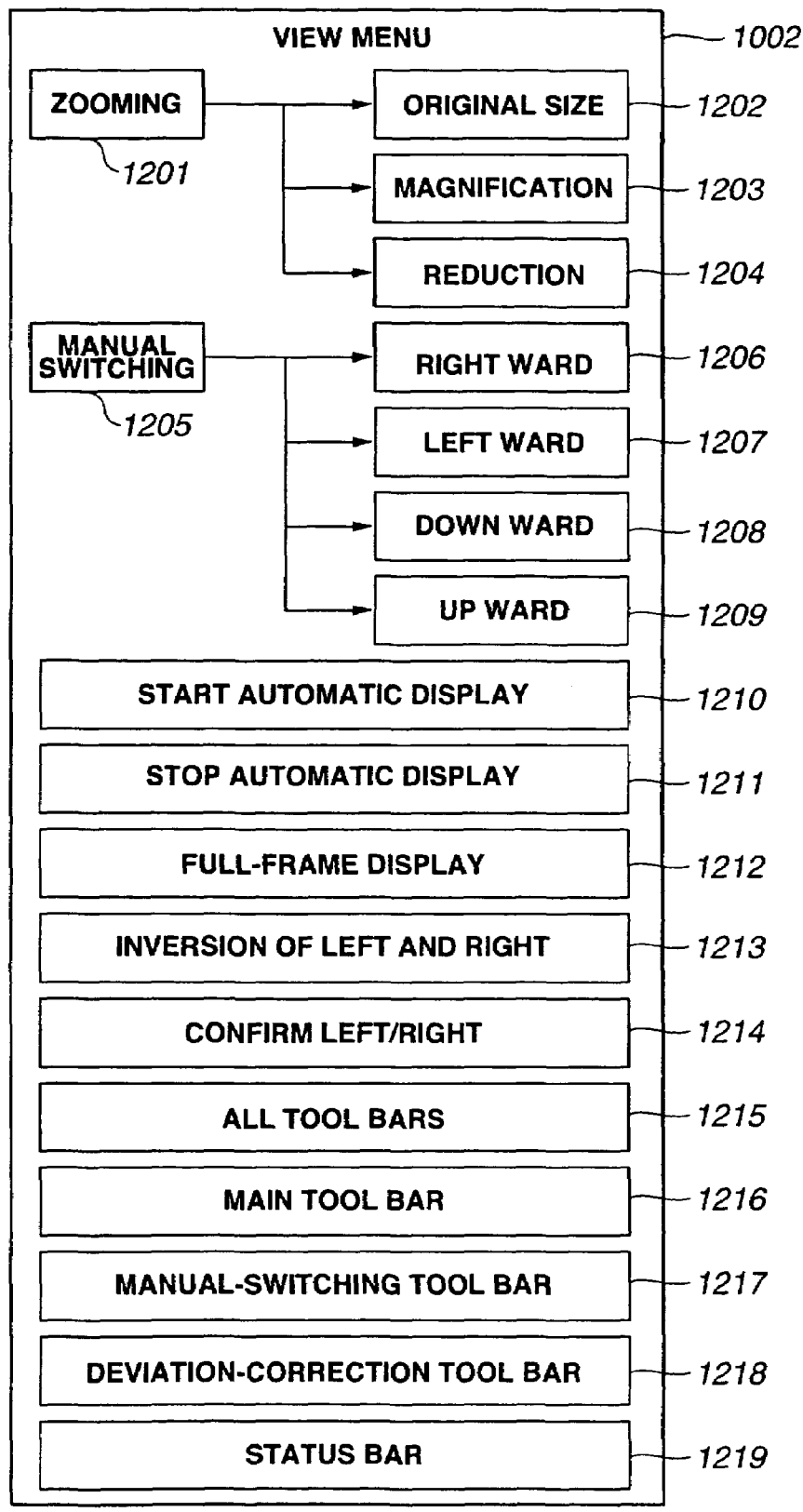
FIG. 23 is a diagram illustrating a view menu 1002.

An "end of application software" menu item 1107 corresponds to the end" icon 711 shown in FIG. 18, and is selected when terminating the stereoscopic-image display program. When the "end of application software" menu item 1107 is selected, or the "end" icon 711 is subjected to mouse clicking, if a currently opened image file is present, the stereoscopic-image display program is terminated after closing that image file. FIG. 23 is a diagram illustrating the display menu 1002. The display menu 1002 includes the following submenus and menu items.

A "zooming" submenu 1201 includes an "original size" menu item 1202, a "magnification" menu item 1203 and a "reduction" menu item 1204.

The "original size" menu item 1202 corresponds to the "original size" icon 707 shown in FIG. 18. When the "original size" menu item 1202 has been selected or the "original size" icon 707 has been subjected to mouse clicking, the size of the stereoscopic image currently displayed on the main window returns to the original size (a size which is neither magnified nor reduced).

The "magnification" menu item 1203 corresponds to the "magnification" icon 708 shown in FIG. 18. When the "magnification" menu item 1203 has selected or the "magnification" icon 708 has been subjected to mouse clicking, the size of the stereoscopic image currently displayed on the main window is magnified twice both in the horizontal and vertical directions.

The "reduction" menu item 1204 corresponds to the "reduction" icon 709 shown in FIG. 18. When the "reduction" menu item 1204 has been selected or the "reduction" icon 709 has been subjected to mouse clicking, the size of the stereoscopic image currently displayed on the main window is halved both in the horizontal and vertical directions.

In any of the above-described cases of the original size, magnification of the size, and reduction of the size, it is necessary to form a stereoscopic image in a form adapted to the form of display of the direct-view display 102. Such an image forming operation is correctly performed by the stereoscopic-image-data processing unit 306 shown in FIG. 14.

Immediately after opening a new image file, the stereoscopic image has its original size.

A "manual switching" submenu 1205 includes a "rightward" menu item 1206, a "leftward" menu item 1207, a "downward" menu item 1208, and an "upward" menu item 1209. The manual switching indicates an operation of changing a stereoscopic image to be displayed by the user's manual switching of the position on the two-dimensional arrangement of serial images, using each menu item of the "manual switching" submenu 1205.

The "rightward" menu item 1206 corresponds to the "display image present at immediate right" icon 801 shown in FIG. 19. When the "rightward" menu item 1206 has been selected or the "display image present at immediate right" icon 801 has been subjected to mouse clicking, a stereoscopic image positioned at the immediate right of the stereoscopic image currently being displayed on the two-dimensional arrangement of serial images is displayed.

The "leftward" menu item 1207 corresponds to the "display image present at immediate left" icon 802 shown in FIG. 19. When the "leftward" menu item 1207 has been selected or the "display image present at immediately left" icon 802 has been subjected to mouse clicking, a stereoscopic image positioned at the immediately left of the stereoscopic image currently being displayed on the two-dimensional arrangement of serial images is displayed.

The "downward" menu item 1208 corresponds to the "display image present at immediately below" icon 803 shown in FIG. 19. When the "downward" menu item 1208 has been selected or the "display image present at immediately below" icon 803 has been subjected to mouse clicking, a stereoscopic image positioned immediately below the stereoscopic image currently being displayed on the two-dimensional arrangement of serial images is displayed.

The "upward" menu item 1209 corresponds to the "display image present at immediately above" icon 804 shown in FIG. 19. When the "upward" menu item 1209 has been selected or the "display image present at immediately above" icon 804 has been subjected to mouse clicking, a stereoscopic image positioned immediately above the stereoscopic image currently being displayed on the two-dimensional arrangement of serial images is displayed. Immediately after opening a new image file, a stereoscopic image present at the origin (0,0) on the two-dimensional arrangement of serial images is displayed.

A "start automatic display" menu item 1210 corresponds to the "start automatic display" icon 705 shown in FIG. 18. The automatic display is an operation of automatically switching the position on the two-dimensional arrangement of serial images at every predetermined time interval in accordance with a setting value set using a "switching time of automatic display" menu item 1307 and a "setting of image display" menu item 1308 (to be described later), and thereby changing a stereoscopic image to be displayed. If the "start automatic display" menu item 1210 is selected or the "start automatic display" icon 705 is subjected to mouse clicking when automatic display is not performed, automatic display is started.

A "stop automatic display" menu item 1211 corresponds to the "stop automatic display" icon 706 shown in FIG. 18. If the "stop automatic display" menu item 1211 is selected or the "stop automatic display" icon 706 is subjected to mouse clicking when automatic display is performed, the automatic display is stopped. Immediately after opening a new image file, automatic display is not performed.

A "display entire picture frame" menu item 1212 corresponds to the "display entire picture frame" icon 703 shown in FIG. 18. Display of the entire picture frame is a state in which the application window is magnified to a size covering the entire picture surface of the direct-view display 102, so that the title bar, the menu bar and the status bar are not displayed. If the "display entire picture frame" menu item 1212 is selected or the "display entire picture frame" icon 703 is subjected to mouse clicking when display of the entire picture frame is not performed, display of the entire picture frame is performed. On the other hand, if the "display entire picture frame" icon 703 is subjected to mouse clicking when display of the entire picture frame is performed, the display of the entire frame is released, and the state before the application window performs display of the entire picture frame is recovered.

The state of display of the entire picture frame is stored on the hard disk (HD) 205 when terminating the stereoscopic-image display program. When starting the program next time, the state of display of the entire picture frame stored on the hard disk (HD) 205 is read and reproduced.

An "inversion in horizontal direction" menu item 1213 corresponds to the "inversion in horizontal direction" icon 704 shown in FIG. 18. When the "inversion in horizontal direction" menu item 1213 has been selected or the "inversion in horizontal direction" icon 704 has been subjected to mouse clicking, the position of display of the stereoscopic image currently being displayed is shifted by one pixel or one line in accordance with the characteristics of the direct-view display 102, so that the user sees the stereoscopic image in a state in which the left and right images are inverted.

As described above, in the direct-view display 102, the optical paths of adjacent pixels or lines are directed to different directions, so that images on every other pixel or line are seen only with the left eye or the right eye. Accordingly, by merely shifting the position of display of a stereoscopic image by one pixel or one line, a stereoscopic image is seen by the user in a state in which the left and right images are inverted in the horizontal direction.

If the "inversion in horizontal direction" menu item 1213 is selected or the "inversion in horizontal direction" icon 704 is subjected to mouse clicking when the "inversion in horizontal direction" display is performed, the position of display of the stereoscopic image currently being displayed is returned to the original position, so that the user sees the stereoscopic image in a state in which the left and right images are displayed in the original state (in a state in which the left and right images are not inverted in the horizontal direction).

Although inversion of display of the left and right images in the horizontal direction to the user may also be performed by using a "basic setting of left/right" menu item 1309 (to be described later), means for realizing the effects and the method of storage differ between the "inversion in horizontal direction" menu item 1213 and the "basic setting of left/right" menu item 1309. That is, means used by the "inversion in horizontal direction" menu item 1213 is high-speed means for only shifting the position of display, and the state of display of inversion in the horizontal direction is stored in the RAM 203 only during the operation of the stereoscopic-image display program.

A "confirm left/right" menu item 1214 corresponds to the "confirm left/right" icon 710 shown in FIG. 18. When the "confirm left/right" menu item 1214 has been selected or the "confirm left/right" icon 710 has been subjected to mouse clicking, images for confirming left/right are displayed on the four corners of the main window. The images for confirming left/right include images for the left eye (for example, a character "L") disposed at pixel positions within a region which can be seen only by the left eye, and images for the right eye (for example, a character "R") disposed at pixel positions within the same region which can be seen only by the right eye, in accordance with the characteristics of the direct-view display 102. Only when the user sees the direct-view display 102 from a correct position of observation, an image for the left eye and an image for the right eye are seen only by the left eye and the right eye, respectively. When the user see the direct-view display 102 from an incorrect position of observation, an image for the left eye and an image for the right eye are mixed to the left eye and the right eye. Hence, the user can know the correct position of observation.

If the "confirm left/right" menu item 1214 is selected or the "confirm left/right" icon 710 is subjected to mouse clicking when an image for confirming left/right is displayed, the image for confirming left/right is erased. The state of display of the image for confirming left/right is stored in the RAM 203 only during the operation of the stereoscopic-image display program.

An "all tool bars" menu item 1215 causes all of the main tool bar shown in FIG. 8, the manual-switching tool bar shown in FIG. 8, and the deviation-correction tool bar shown in FIG. 9 to simultaneously become either in a displayed state or non-displayed state. If the "all tool bars" menu item 1215 is selected when at least one of the main tool bar, the manual-switching tool bar and the deviation-correction tool bar is displayed, all the tool bars become in a non-displayed state. On the other hand, if the "all tool bars" menu item 1215 is selected when none of the tool bars are displayed, all the tool bars become in a displayed state.

A "main tool bar" menu item 1216 switches the state of display of the main tool bar. If the "main tool bar" menu item 1216 is selected when the main tool bar is displayed, the main tool bar becomes in a non-displayed state. On the other hand, if the "main tool bar" menu item 1216 is selected when the main tool bar is not displayed, the main tool bar is displayed.

A "manual-switching tool bar" menu item 1217 switches the state of display of the manual-switching tool bar. If the "manual-switching tool bar" menu item 1217 is selected when the manual-switching tool bar is displayed, the manual-switching tool bar becomes in a non-displayed state. On the other hand, if the "manual-switching tool bar" menu item 1217 is selected when the manual-switching tool bar is not displayed, the manual-switching tool bar is displayed.

A "deviation-correction tool bar" menu item 1218 switches the state of display of the deviation-correction tool bar. If the "deviation-correction tool bar" menu item is selected when the deviation-correction tool bar is displayed, the deviation-correction tool bar becomes in a non-displayed state. On the other hand, if the "deviation-correction tool bar" menu item 1218 is selected when the deviation-correction tool bar is not displayed, the deviation-correction tool bar is displayed.

A "status bar" menu item 1219 switches the state of display of the status bar. If the "status bar" menu item 1219 is selected when the status bar is displayed, the status bar becomes in a non-displayed state. On the other hand, if the "status bar" menu item 1219 is selected when the status bar is not displayed, the status bar is displayed.

The state of display of each of the tool bars and the status bars is stored on the hard disk (HD) 205 when terminating the stereoscopic-image display program. When starting the program next time, the state of display of each of the tool bars and the status bars stored on the hard disk (HD) 205 is read and reproduced.

Figure 24:
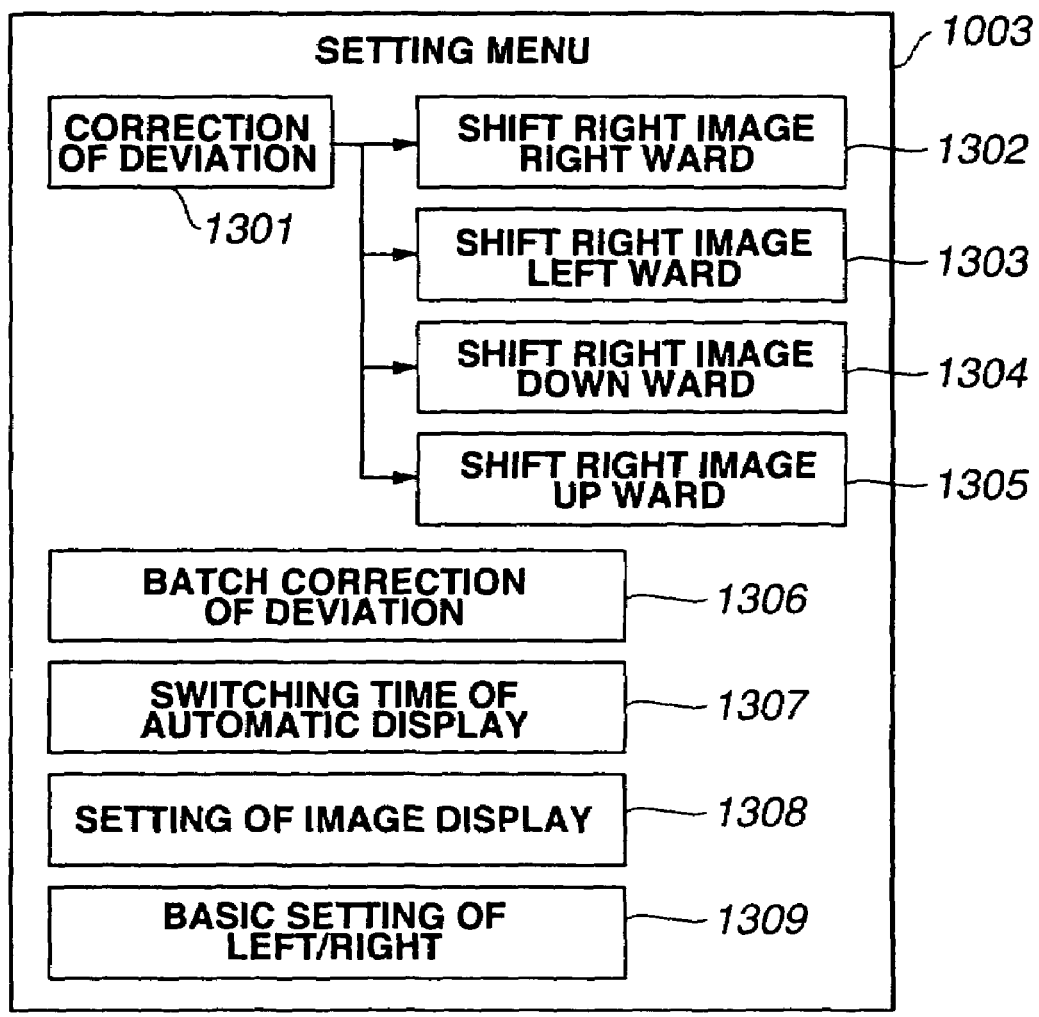
FIG. 24 is a diagram illustrating a setting menu 1003.

FIG. 24 is a diagram illustrating the setting menu 1003. The setting menu 1003 has the following submenus and menu items.

A "correction of deviation" submenu 1301 includes a "shift right image rightward" menu item 1302, a "shift right image leftward" menu item 1303, a "shift right image downward" menu item 1304, and a "shift right image upward" menu item 1305. The "deviation" indicates deviation in the position of superposition of the left image and the right image when forming a stereoscopic image by synthesizing the left image and the right image. The "correction of deviation" indicates formation of a stereoscopic image by synthesizing the left image and the right image by superposing them at a position obtained by shifting the right image with respect to the left image by the respective assigned amounts of pixels in the horizontal direction and the vertical direction. In the stereoscopic-image display program, the amounts of correction of deviation are initialized to a value 0 both in the horizontal direction and the vertical direction immediately after opening an image file.

The "shift right image rightward" menu item 1302 corresponds to the "shift right image to right" icon 901 shown in FIG. 20. When the "shift right image rightward" menu item 1302 has been selected or the "shift right image to right" icon 901 has been subjected to mouse clicking, the amount of correction of deviation in the horizontal direction is incremented by one, and a stereoscopic image is redisplayed.

The "shift right image leftward" menu item 1303 corresponds to the "shift right image to left" icon 902 shown in FIG. 20. When the "shift right image leftward" menu item 1303 has been selected or the "shift right image to left" icon 902 has been subjected to mouse clicking, the amount of correction of deviation in the horizontal direction is decremented by one, and a stereoscopic image is redisplayed.

The "shift right image downward" menu item 1304 corresponds to the "shift right image downward" icon 903 shown in FIG. 20. When the "shift right image downward" menu item 1304 has been selected or the "shift right image downward" icon 903 has been subjected to mouse clicking, the amount of correction of deviation in the vertical direction is incremented by one, and a stereoscopic image is redisplayed.

The "shift right image upward" menu item 1305 corresponds to the "shift right image upward" icon 904 shown in FIG. 20. When the "shift right image upward" menu item 1305 has been selected or the "shift right image upward" icon 904 has been subjected to mouse clicking, the amount of correction of deviation in the vertical direction is decremented by one, and a stereoscopic image is redisplayed.

Figure 35:
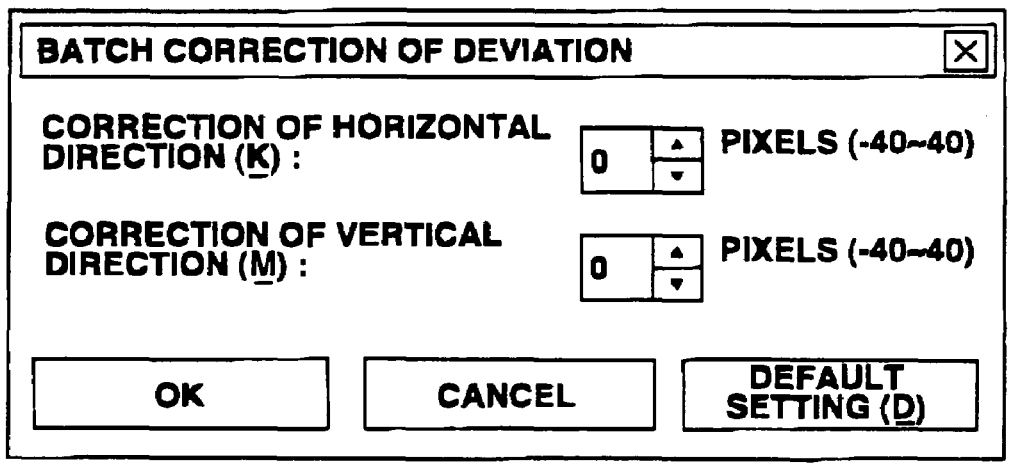
FIG. 35 is a diagram illustrating a "batch correction of deviation" dialog box.

A "batch correction of deviation" menu item 1306 is selected when the user directly inputs a numerical value as the amount of correction of deviation. When the "batch correction of deviation" menu item 1306 has been selected, a "batch correction of deviation" dialog box is displayed. FIG. 35 is a diagram illustrating the "batch correction of deviation" dialog box.

On the "batch correction of deviation" dialog box, when the user directly inputs a numerical value equal to or larger than −40 and equal to or smaller than 40 on each of "correction of deviation in horizontal direction" and "correction of deviation in vertical direction" editing boxes, and then depresses an "OK" button, a stereoscopic image is reformed and displayed in accordance with the assigned amounts of correction of deviation, after closing the "batch correction of deviation" dialog box.

On the "batch correction of deviation" dialog box, when a "default setting" button is depressed, both of the numerical values displayed on the "correction of horizontal deviation" and "correction of vertical deviation" editing boxes are changed to a value 0.

Immediately after opening a new image file, both of the amount of correction of deviation in the horizontal direction and the amount of correction of deviation in the vertical direction are initialized to a value 0. These amounts of correction of deviation are included in the setting values of correction of display mentioned in the description of the "open setting of display correction" menu item 1103 shown in FIG. 22. Hence, when the display-correction-setting file is opened, the amounts of correction of deviation are again initialized by the setting values of display correction read from that file.

A "switching time of automatic display" menu item 1307 is selected when setting a switching time of automatic display. During automatic display, the display of a stereoscopic image is automatically switched at every constant time period. In the third embodiment, the constant time period is termed a "switching time".

Figure 36:
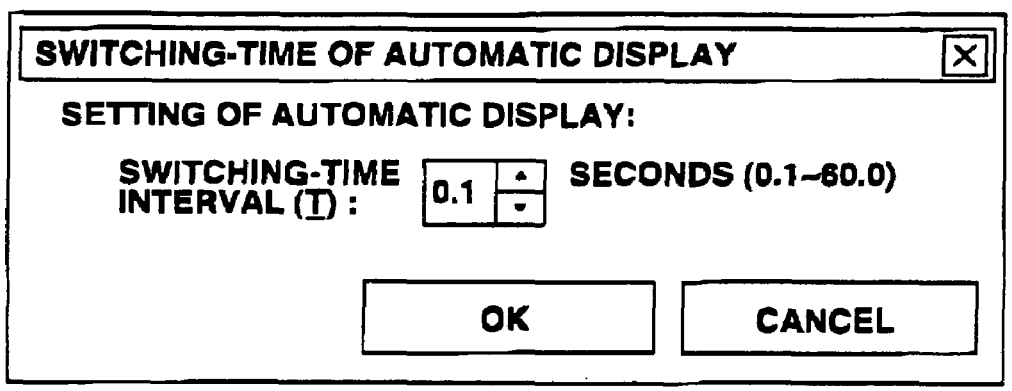
FIG. 36 is a diagram illustrating a "switching time of automatic display" dialog box.

When the "switching time of automatic display" menu item 1307 has been selected, a "switching time of automatic display" dialog box is displayed. FIG. 36 is a diagram illustrating the "switching time of automatic display" dialog box.

On the "switching time of automatic display" dialog box, when the user directly inputs a numerical value equal to or larger than 0.1 and equal to or smaller than 60.0 with a minimum step of 0.1 on a "switching-time interval" editing box, and then depresses an "OK" button, the "switching time of automatic display" dialog box is closed, and a switching time of automatic display is set.

The switching time of automatic display is stored on the hard disk (HD) 205 when the stereoscopic-image display program is terminated. The switching time of automatic display stored on the hard disk (HD) 205 is read and set when starting the program next time.

Figure 37:
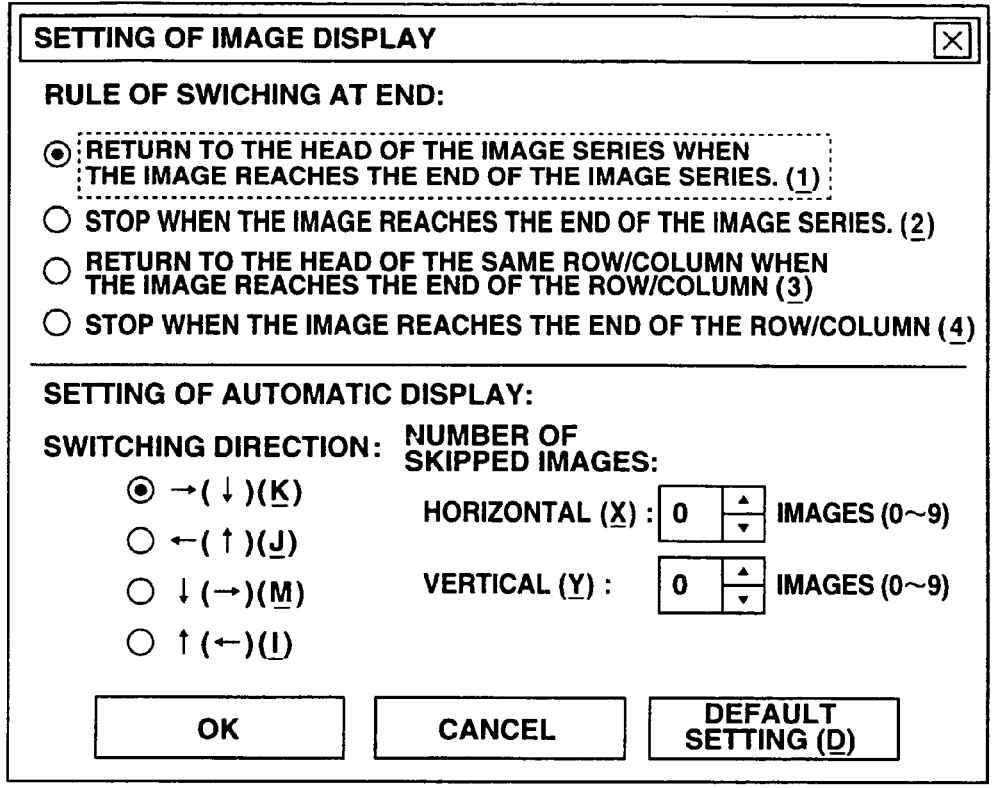
FIG. 37 is a diagram illustrating a "setting of image display" dialog box.

A "setting of image display" menu item 1308 is selected when changing some setting values which influence the operations of manual switching and automatic display. When the "setting of image display" menu item 1308 is selected, a "setting of image display" dialog box is displayed. FIG. 37 is a diagram illustrating the "setting of image display" dialog box. On the "setting of image display" dialog box, when the user selects or inputs the following items and then depresses an "OK" button, the "setting of image display" dialog box is closed, and setting of image display becomes effective.

A "rule of switching at end" on the "setting of image display" dialog box is a rule for determining the position of the stereoscopic image to be displayed next time on the two-dimensional arrangement of serial images, when the stereoscopic image currently being displayed is positioned at one of the four corners of the two-dimensional arrangement, and manual switching or automatic switching to move the position on the two-dimensional arrangement in a direction exceeding the corner is performed. A description will now be provided for a case in which, as shown in FIG. 16B, the two-dimensional arrangement of serial images is from the origin (0, 0) to the lowermost right end (4, 2).

When a "return to the head of the image series when the image reaches the end of the image series" radio button is selected as the "rule of switching at end", the position on the two-dimensional arrangement is switched in the following manner. That is, if it is intended to move the position to the right or below when the current position is at the lowermost right end (4, 2), the next position becomes the uppermost left end (0, 0). If it is intended to move the position to the left or above when the current position is at the uppermost left end (0, 0), the next position becomes the lowermost right end (4, 2). If it is intended to move the position to the right when the current position is at the right end (4, 0), the next position becomes the left end (0, 1) on a row immediately below the current row. If it is intended to move the position to the left when the current position is at the left end (0, 1), the next position becomes the right end (4, 0) on a row immediately above the current row. If it is intended to move the position downward when the current position is at the low end (1, 2), the next position becomes the upper end (2, 0) on a column immediately at the right of the current column. If it is intended to move the position upward when the current position is at the upper end (2, 0), the next position becomes the lower end (1, 2) on a column immediately at the left of the current column.

When a "stop when the image reaches the end of the image series" radio button is selected as the "rule of switching at end", the position on the two-dimensional arrangement is switched in the following manner. Even if it is intended to move the position to the right or below when the current position is at the lowermost right end (4, 2), the position does not change. Even if it is intended to move the position to the left or above when the current position is at the uppermost left end (0, 0), the position does not change. If it is intended to move the position to the right when the current position is at the right end (4, 0), the next position becomes the left end (0, 1) on a row immediately below the current row. If it is intended to move the position to the left when the current position is at the left end (0, 1), the next position becomes the right end (4, 0) on a row immediately above the current row. If it is intended to move the position downward when the current position is at the low end (1, 2), the next position becomes the upper end (2, 0) on a column immediately at the right of the current column. If it is intended to move the position upward when the current position is at the upper end (2, 0), the next position becomes the lower end (1, 2) on a column immediately at the left of the current column.

When a "return to the head of the same row/column when the image reaches the end of the row/column" radio button is selected as the "rule of switching at end", the position on the two-dimensional arrangement is switched in the following manner. If it is intended to move the position to the right when the current position is at the right end (4, 0), the next position becomes the left end (0, 0) where the position in the vertical direction does not change. If it is intended to move the position to the left when the current position is at the left end (0, 0), the next position becomes the right end (4, 0) where the position in the vertical direction does not change. If it is intended to move the position downward when the current position is at the lower end (1, 2), the next position becomes the upper end (1, 0) where the position in the horizontal direction does not change. If it is intended to move the position upward when the current position is at the upper end (1, 0), the next position becomes the lower end (1, 2) where the position in the horizontal direction does not change.

When a "stop when the image reaches the end of the row/column" radio button is selected as the "rule of switching at end", the position on the two-dimensional arrangement is switched in the following manner. Even if it is intended to move the position to the right when the current position is at the right end (4, 0), the position does not change. Even if it is intended to move the position to the left when the current position is at the left end (0, 0), the position does not change. Even if it is intended to move the position downward when the current position is at the lower end (1, 2), the position does not change. Even if it is intended to move the position upward when the current position is at the upper end (1, 0), the position does not change.

"Switching direction" on the "setting of image display" dialog box shown in FIG. 37 is an item for determining the direction of switching of the position when switching the position on the two-dimensional arrangement of serial images during automatic display. When a "→(↓)" radio button is selected, the position is switched to the right. When a "←(↑)" radio button is selected, the position is switched to the left. When a "↓(→)" radio button is selected, the position is switched downward. When a "↑(←)" radio button is selected, the position is switched upward. When the current position reaches an end of the two-dimensional arrangement, the position is switched according to the "rule of switching at end". Switching of the position indicates that the stereoscopic image at that position is displayed on the main window.

A "number of skipped images" on the "setting of image display" dialog box is an item for moving the image by being skipped by the number of skipped images instead of moving to the next position, when switching the position on the two-dimensional arrangement of serial images during automatic display. When the user inputs a number of skipped image on each of "horizontal" and "vertical" editing boxes, the respective numbers of skipped images when moving the image in the horizontal direction and the vertical direction are set.

When a "default setting" button on the "setting of image display" dialog box has been depressed, the "return to the head of the image series when the image reaches the end of the image series" ratio button is selected and the "→(↓)" radio button is selected as the "switching direction" as the "rule of switching at end", and a value 0 is input to each of the "horizontal" and the "vertical" of the "number of skipped images". When an "OK" button on the "setting of image display" dialog box is depressed, the "setting of image display" dialog box is closed, and the setting values of the above-described respective items become effective.

The setting of image display is stored on the hard disk (HD) 205 when the stereoscopic-image display program is terminated. When starting the program the next time, the setting of image display stored on the hard disk (HD) 205 is read and becomes effective.

Figure 38:
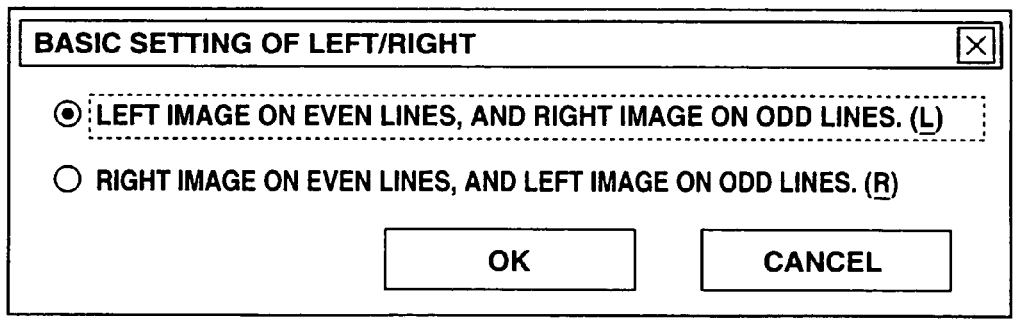
FIG. 38 is a diagram illustrating a "basic setting of left/right" dialog box.

A "basic setting of left/right" menu item 1309 is selected when setting at which pixel position or line position of the direct-view display 102 that one of the left and right images is to be displayed. When the "basic setting of left/right" menu item 1309 has been selected, a "basic setting of left/right" dialog box is displayed. FIG. 38 is a diagram illustrating the "basic setting of left/right" dialog box. On the "basic setting of left/right" dialog box, when the user selects one of two radio buttons and then depresses an "OK" button, the "basic setting of left/right" dialog box is closed, and basic setting of left/right becomes effective.

In the case of FIG. 38, it is assumed that the direct-view display 102 is designed so as to alternately display an image for the left eye and an image for the right eye on every other line. On this "basic setting of left/right" dialog box, a "left image on even lines, and right image on odd lines" radio button and a "right image on even lines, and left image on odd lines" radio button indicate the above-described basic setting of left/right.

Means for realizing the effects and the method of storage differ between the "basic setting of left/right" menu item 1309 and the above-described "inversion in horizontal direction" menu item 1213. The basic setting of left/right is transmitted to the stereoscopic-image-data processing unit 306 shown in FIG. 14. The stereoscopic-image-data processing unit 306 synthesizes left and right images based on the basic setting of left/right to form a stereoscopic image. The basic setting of left/right is stored on the hard disk (HD) 205 when the stereoscopic-image display program is terminated. When starting the program the next time, the basic setting of left/right stored on the hard disk (HD) 205 is read and is transmitted to the stereoscopic-image-data processing unit 306.

Figure 25:
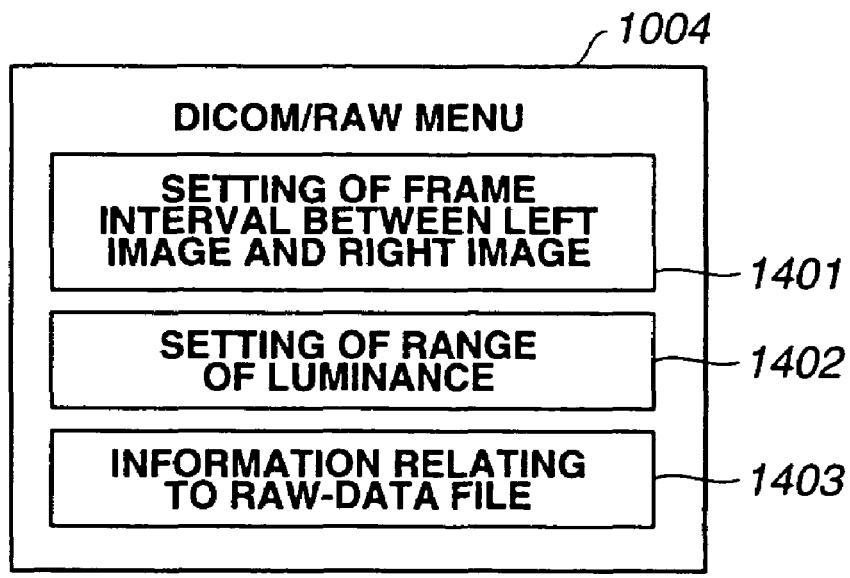
FIG. 25 is a diagram illustrating a DICOM/RAW menu 1004 shown in FIG. 21.

FIG. 25 is a diagram illustrating the DICOM/RAW menu 1004. The DICOM/RAW menu 1004 is a menu for setting information necessary only when dealing with a DICOM file or a RAW-data file, and includes the following menu items.

Figure 39:
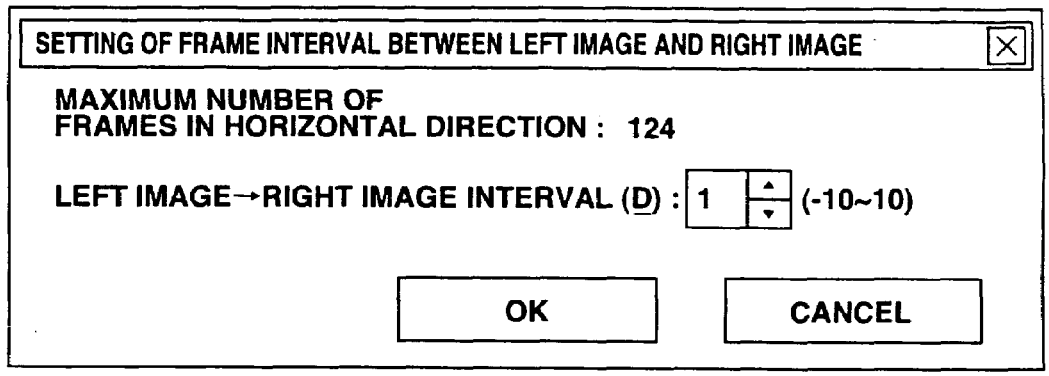
FIG. 39 is a diagram illustrating a "setting of frame interval between left image and right image" dialog box.

A "setting of frame interval between left image and right image" menu item 1401 is selected when assigning the number of frames before or after the left image to an image to be used as the right image, when images of a plurality of frames are stored in one DICOM file or RAW-data file. When the "setting of frame interval between left image and right image" menu item 1401 has been selected, a "setting of frame interval between left image and right image" dialog box is displayed. FIG. 39 is a diagram illustrating the "setting of frame interval between left image and right image" dialog box.

On this "setting of frame interval between left image and right image" dialog box, the number of frames contained in the currently opened DICOM file or RAW-data file is displayed on a "maximum number of frames in horizontal direction" item. When the user inputs a value equal or larger than −10, equal to or smaller than 10, and less than the value of the "maximum number of frames in horizontal direction" in a "left image→right image interval" editing box, and then depresses an "OK" button, the "setting of frame interval between left image and right image" dialog box is closed, then the left image and the right image are read from the file based on the assigned frame interval between the left image and the right image and are synthesized, and a stereoscopic image is displayed.

Immediately after opening a new DICOM file or RAW-data file containing a plurality of frames, the frame interval between the left image and the right image is initialized to a value 1. The frame interval between the left image and the right image is included in the setting values of display correction mentioned in the description of the "open setting of display correction" menu item 1103 shown in FIG. 22. Hence, when the display-correction-setting file is opened, the frame interval between the left image and the right image is again initialized by the setting values of display correction read from the file.

A "setting of range of luminance" menu item 1402 is selected when setting a method for reducing, when the number of bits per sample (one color for one pixel) of image data included in a DICOM file or a RAW-data file is at least 9, the number of bits per sample to 8 so that the image can be displayed on the direct-view display 102 (a method for setting the range of luminance).

Figure 40:
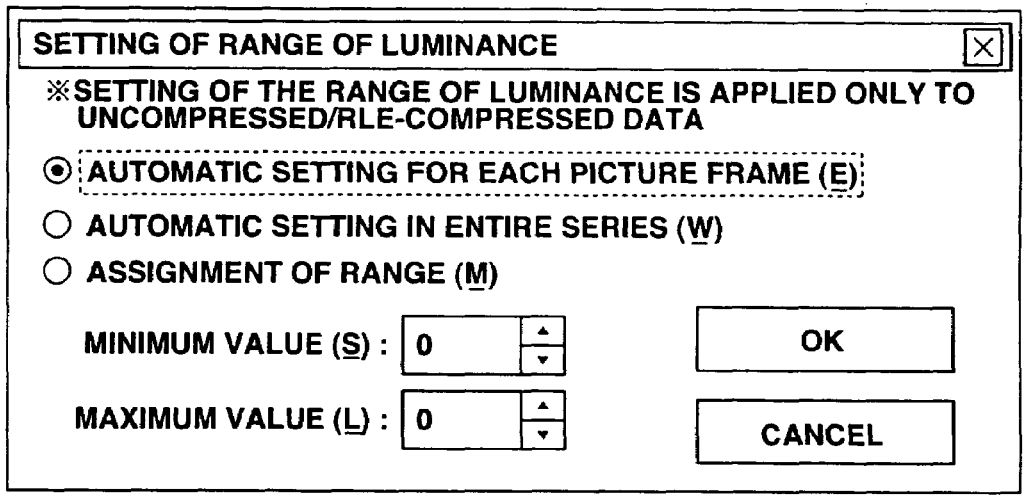
FIG. 40 is a diagram illustrating a "setting of range of luminance" dialog box.

When the "setting of range of luminance" menu item 1402 has been selected, a "setting of rage of luminance" dialog box is displayed. FIG. 40 is a diagram illustrating the "setting of range of luminance" dialog box. On the "setting of range of luminance" dialog box, when the user either depresses an "OK" button after selecting an "automatic setting for each picture frame" radio button, depresses the "OK" button after selecting an "automatic setting in entire system" radio button, or inputs appropriate numerical values in "minimum value" and "maximum value" editing boxes after selecting an "assignment of range" radio button (see FIG. 41) and then depresses the "OK" button, the "setting of range of luminance" dialog box is closed, and the method for setting the range of luminance becomes effective.

Figure 41:
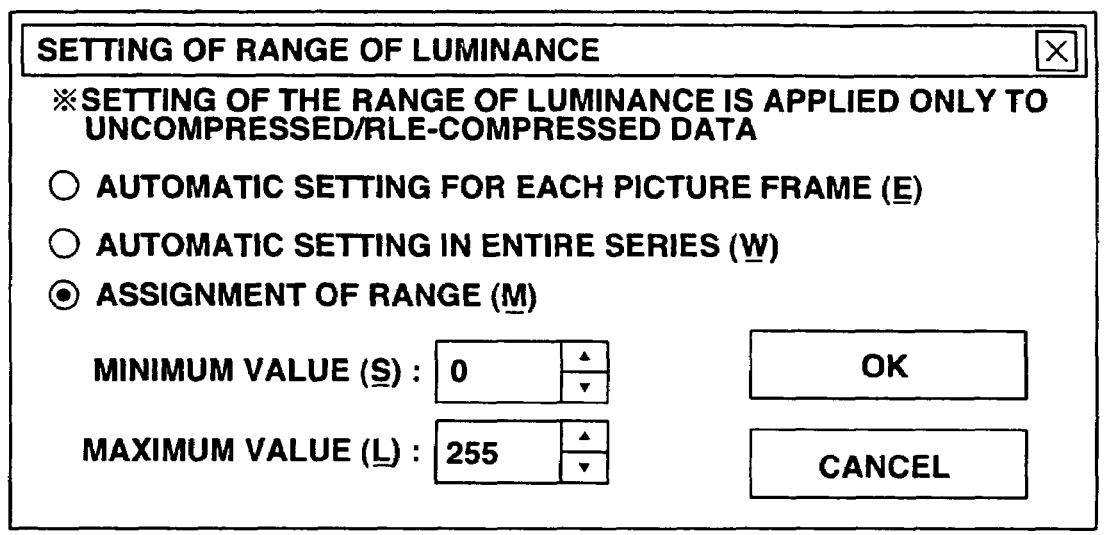
FIG. 41 is a diagram illustrating the "setting of range of luminance" dialog box when an "assignment of range" radio button has been selected.

FIG. 41 is a diagram illustrating a "setting of range of luminance" dialog box when the "assignment of range" radio button has been selected. On the "setting of luminance" dialog box, when the user selects the "automatic setting for each picture frame" radio button, all sample values of the stereoscopic image to be displayed are checked, and the minimum value and the maximum value of the sample values are obtained. Linear transformation of the sample values is performed so that the range between the minimum value and the maximum value is within a range of 0–255.

On the "setting of range of luminance" dialog box, when the user selects an "automatic setting in entire series" radio button, all sample values of all stereoscopic images included in serial images are checked, and the minimum value and the maximum value of the sample values are obtained. Linear transformation of the sample values is performed so that the range between the minimum value and the maximum value is within a range of 0–255.

On the "setting of range of luminance" dialog box, when the user inputs appropriate values in the "minimum value" and "maximum value" editing boxes after selecting the "assignment of range" radio button, samples values of the stereoscopic image are converted according to the following rule. That is, when a sample value is smaller than the assigned minimum value, the sample value is converted into a value 0. When the sample value is larger than the assigned maximum value, the sample value is converted into a value 255. When the sample values are within the range between the minimum value and the maximum value, linear transformation of the sample values is performed so that the assigned range between the minimum value and the maximum value is within a range of 0–255.

Immediately after opening a new DICOM file or RAW-data file, the method for setting the range of luminance is initialized to the "automatic setting for each picture frame". This method for setting the range of luminance is included in the setting values of display correction mentioned in the description of the "open setting of display correction" menu item 1103 shown in FIG. 22. Hence, when the display-correction-setting file is opened, the method for setting the range of luminance is again initialized by the setting values of display correction read from the file.

Figure 42:
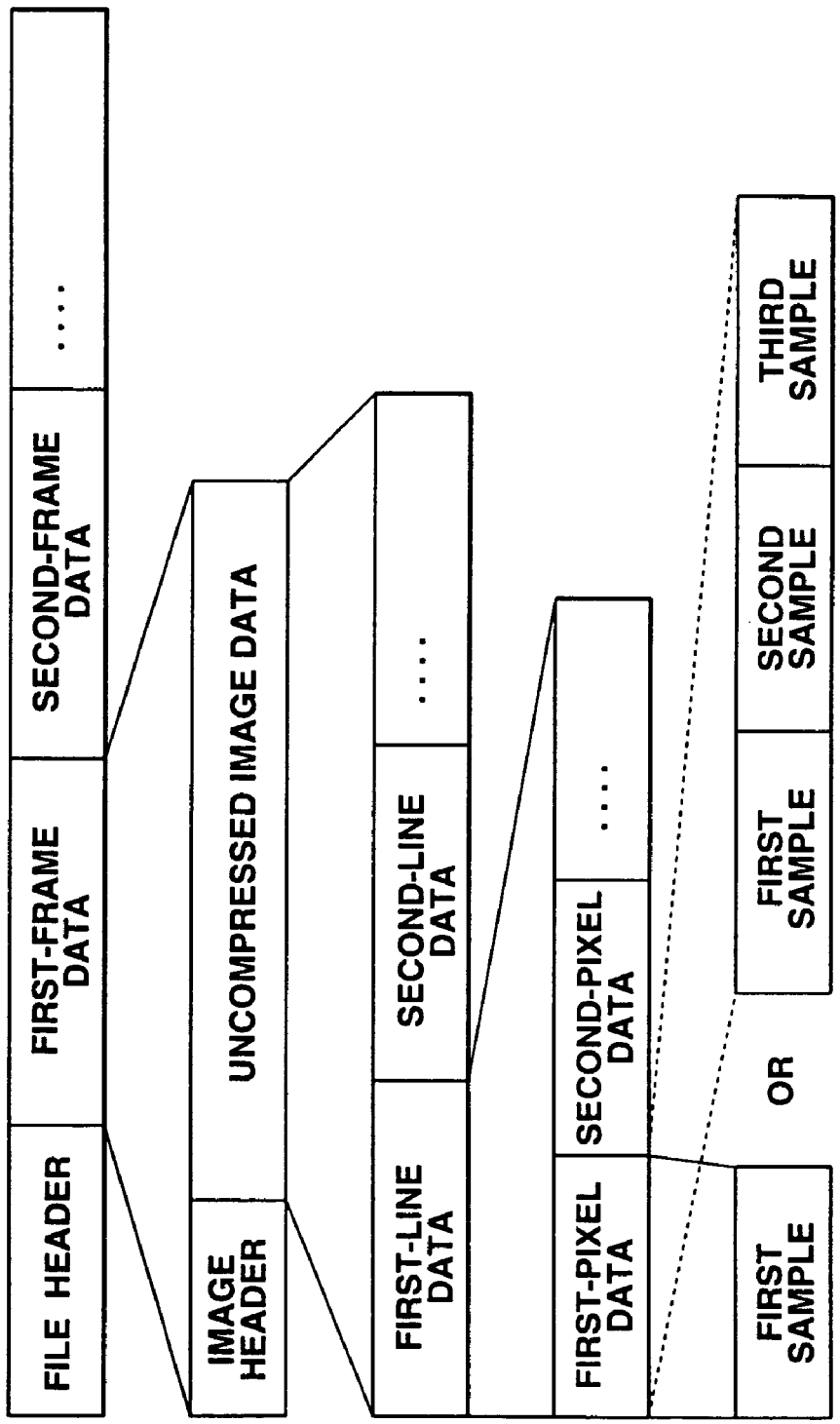
FIG. 42 is a diagram illustrating the data structure of a RAW-data file.

An "information relating to RAW-data file" menu item 1403 is selected when setting information necessary for opening a RAW-data file. If information necessary for opening a RAW-data file has not been set in advance, a RAW-data file cannot be opened. In the stereoscopic-image display program, it is assumed that all RAW-data files have a data structure shown in FIG. 42. Hence, it is impossible to open an undefined file having a data structure other than the data structure shown in FIG. 42. FIG. 42 is a diagram illustrating the data structure of a RAW-data file.

In FIG. 42, the uppermost rectangle 4201 represents the structure of the RAW-data file. A file header may not be provided. In such a case, the size of the file header is assumed to have a value 0. Although the first-frame data is always necessary, the second and succeeding frames may not be provided. The second rectangle 4202 from above represents the structure of frame data. An image header may not be provided. In such case, the size of the image header is assumed to have a value 0. Uncompressed image data is always necessary. The third rectangle 4203 from above represents the structure of uncompressed image data. Line data whose number equals the height of the image are present sequentially starting from the first-line data. The fourth rectangle 4204 from above represents the structure of line data. Image data whose number equals the width of the image are present sequentially starting from the first-pixel data. Each of the lowermost rectangles 4205 represents the structure of image data. When the image data represents a monochromatic image, only the first sample is present. On the other hand, when the image data represents an image comprising R, G and B colors, the first sample, the second sample and the third sample are present. Although in the third embodiment, a RAW-data file having a format of colors other than monochrome or R, G and B colors, a RAW-data file having any other color format may be dealt with.

When the "information relating to RAW-data file" menu item 1403 has been selected, an "information relating to RAW-data file" dialog box is displayed. FIG. 43 is a diagram illustrating the "information relating to RAW-data file" dialog box. On the "information relating to RAW-data file" dialog box, the user must input appropriate numerical values in the following items by referring to the above-described data structure of the RAW-data file, and selects a radio button.

Appropriate values must be input in "file-header size", "image-header size", "width of image", "height of image", and "number of frames". On a "color representation [number of samples per pixel]" item, a "monochrome [1 sample]" or "RGB color [3 samples]" radio button is selected. On a "number of bits and sign per sample" item, a "8 bits without sign", "8 bits with sign", "16 bits without sign" or "16 bits with sign" radio button is selected.

On the "number of bits and sign per sample" item, when the "16 bits without sign" or "16 bits with sign" radio button has been selected, a "lower byte at leading address" or "upper byte at leading address" radio button is selected on an "order in byte data" item (see FIG. 44). FIG. 44 is a diagram illustrating an "information relating to RAW-data file" dialog box when "16 bits without sign" radio button has been selected.

On the "order in byte data" item, the "lower byte at leading address" is in other words "Little Endian", and indicates a form of storage of data which is adopted in most of CPUs of Intel Corporation. On the other hand, the "upper byte at leading address" is in other words "Big Endian", and indicates a form of storage of data which is adopted in most of CPUs of Motorola Corporation. Information relating to the RAW-data file is stored in the RAM 203 only during the operation of the stereoscopic-image display program.

Figure 26:
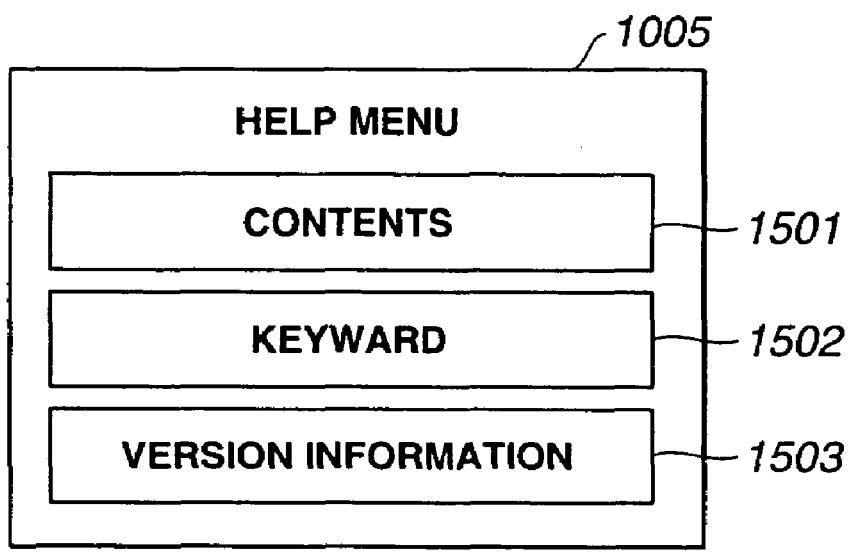
FIG. 26 is a diagram illustrating a help menu 1005 shown in FIG. 21.
Figure 45:
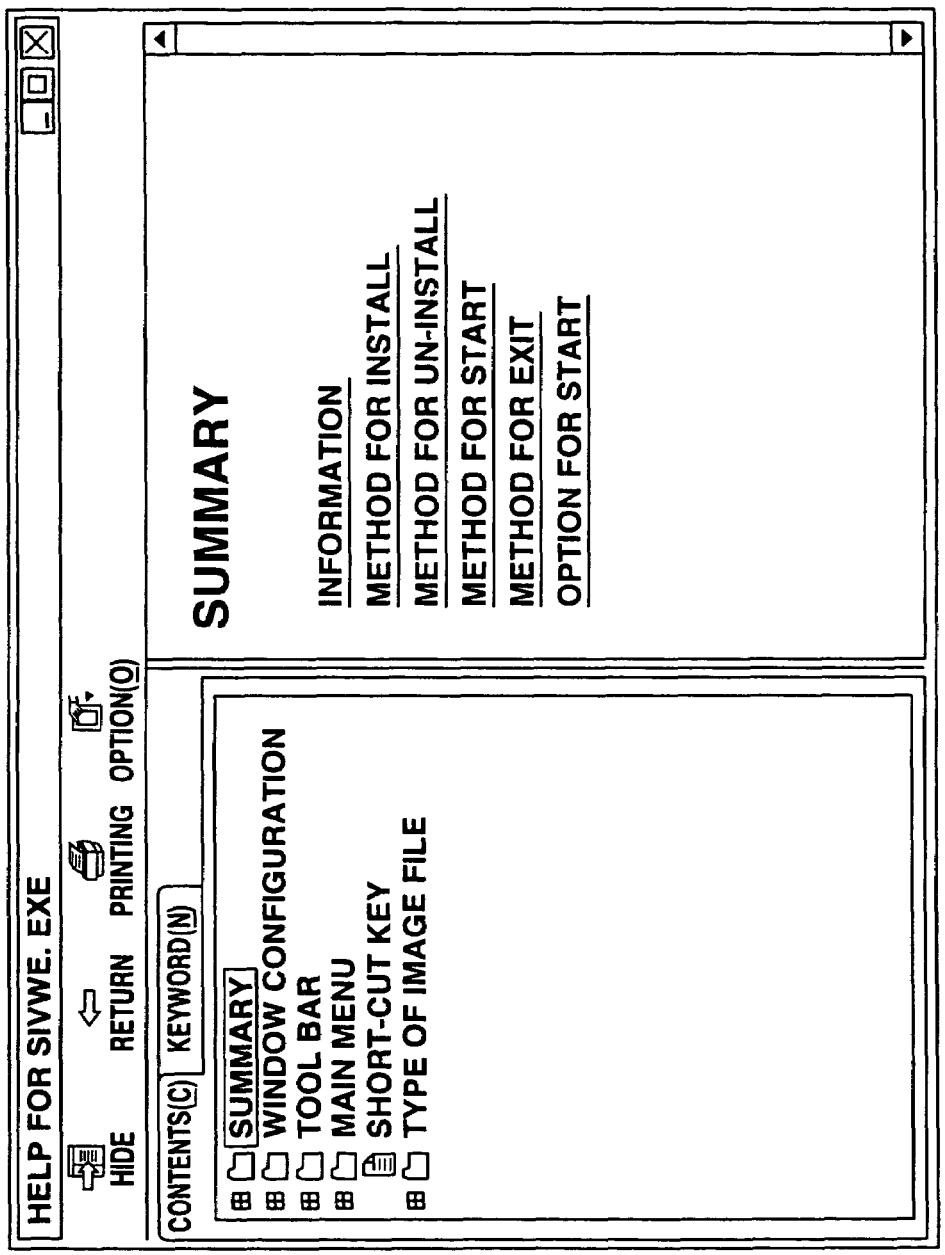
FIGS. 45 and 46 are diagrams, each illustrating a help window.

FIG. 26 is a diagram illustrating the help menu 1005. The help menu 1005 includes the following menu items. A "contents" menu item 1501 is selected when retrieving a help picture frame using contents. When the "contents" menu item 1501 has been selected, a help window shown in FIG. 45 is displayed. By performing mouse clicking of an item described in the contents, the user can find a desired help picture frame. FIG. 45 is a diagram illustrating the help window.

Figure 46:
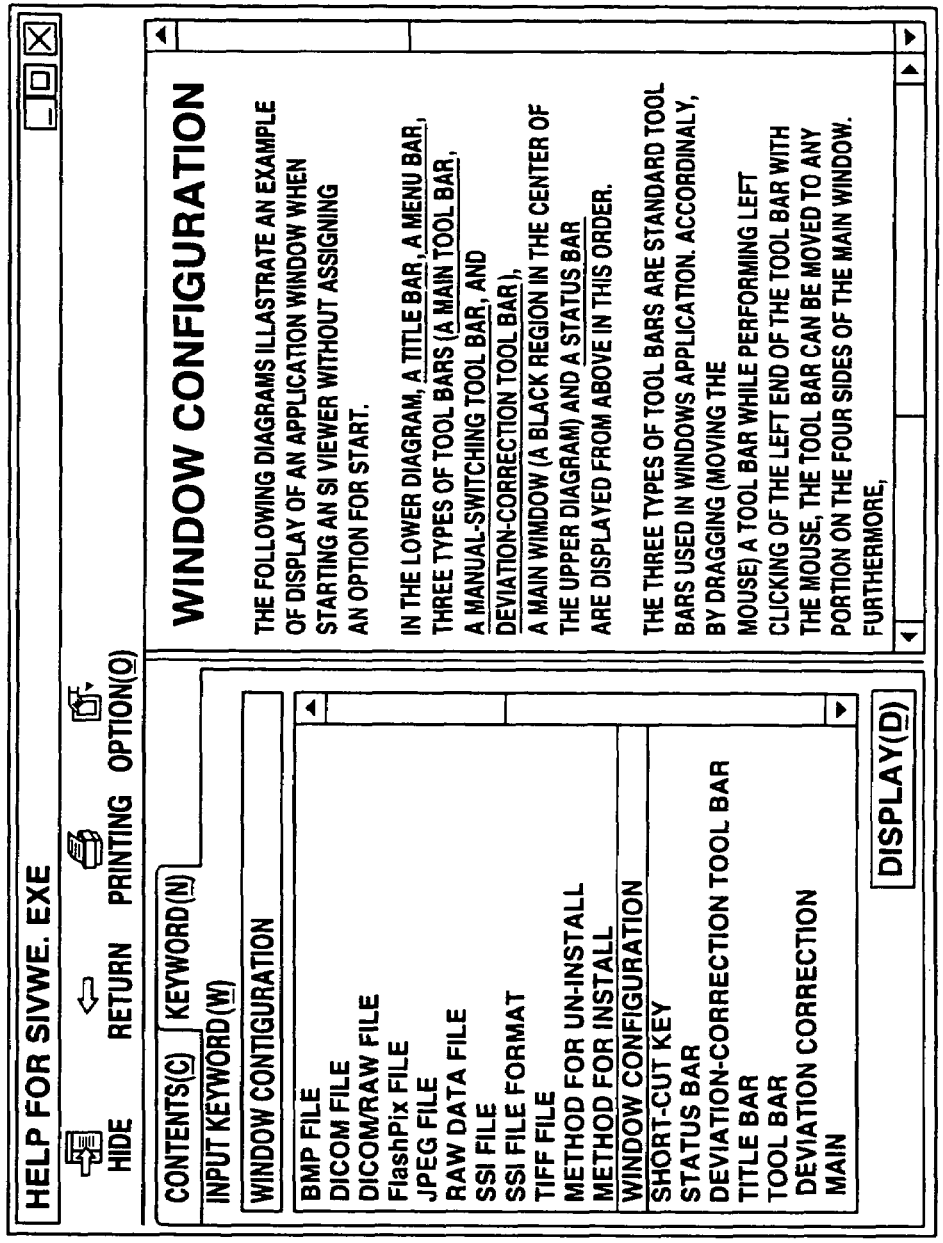

A "keyword" menu item 1502 is selected when retrieving a help picture frame using a keyword. When the "keyword" menu item 1502 has been selected, a help window shown in FIG. 46 is displayed. By depressing a "display" button after inputting an appropriate keyword on an editing box, the user can find a desired help picture frame. FIG. 46 is a diagram illustrating the help window.

A "version information" menu item 1503 is selected when displaying version information of the stereoscopic-image display program. When the "version information" menu item 1503 has been selected, a "version information" dialog box is displayed.

Figure 47:
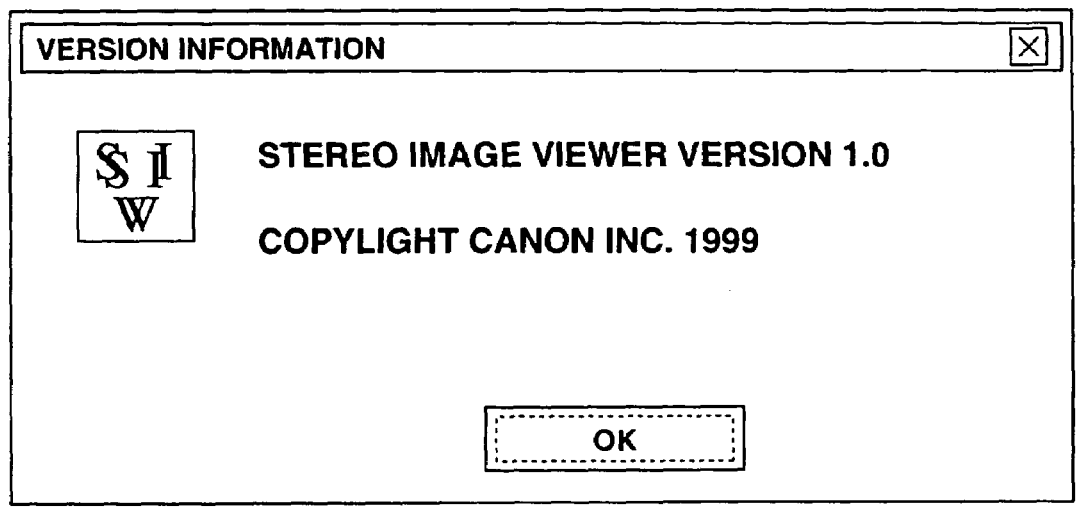
FIG. 47 is a diagram illustrating a "version information" dialog box.

FIG. 47 is a diagram illustrating the "version information" dialog box. On the "version information" dialog box, the trade name, the copyright and the like of the stereoscopic-image display program are displayed.

Figure 48:
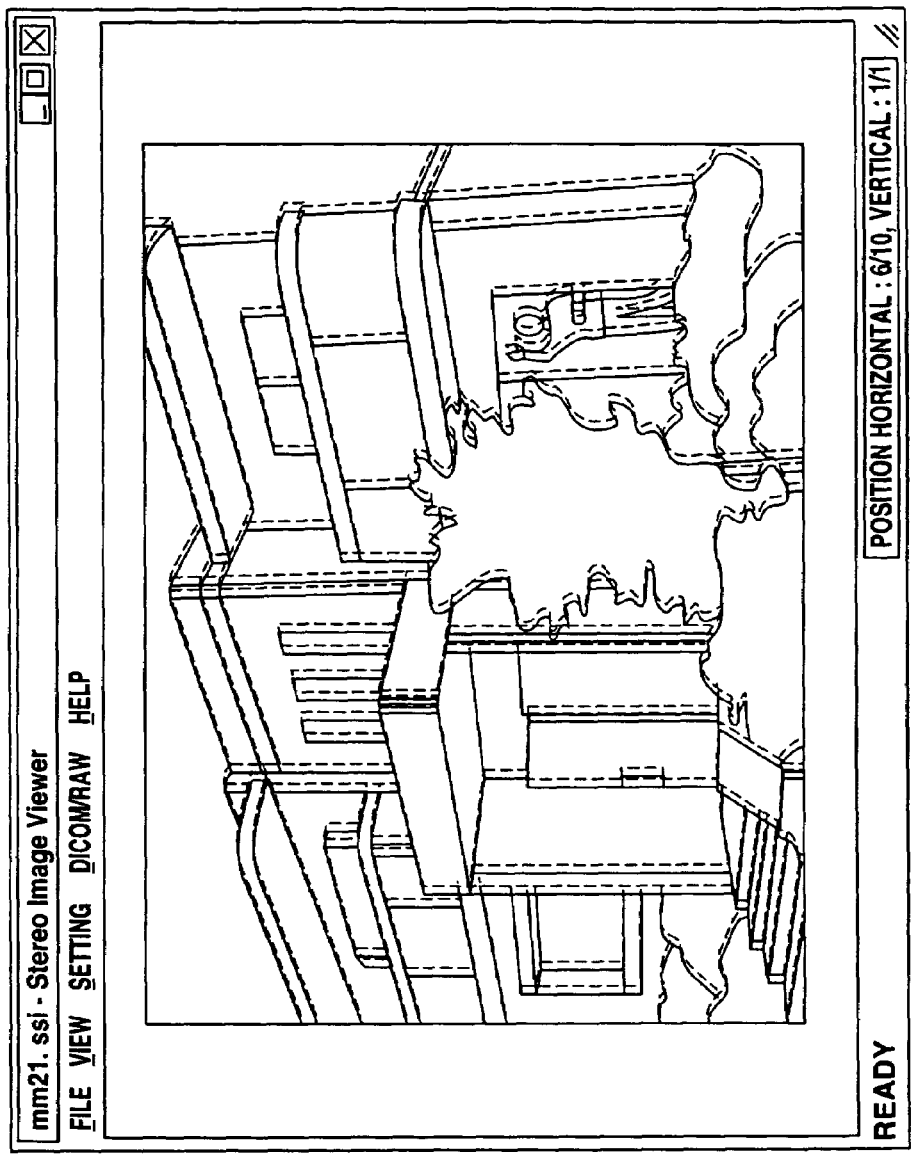
FIGS. 48–50 are diagrams, each illustrating a method for displaying a stereoscopic image on a main window in a stereoscopic-image display program.
Figure 49:
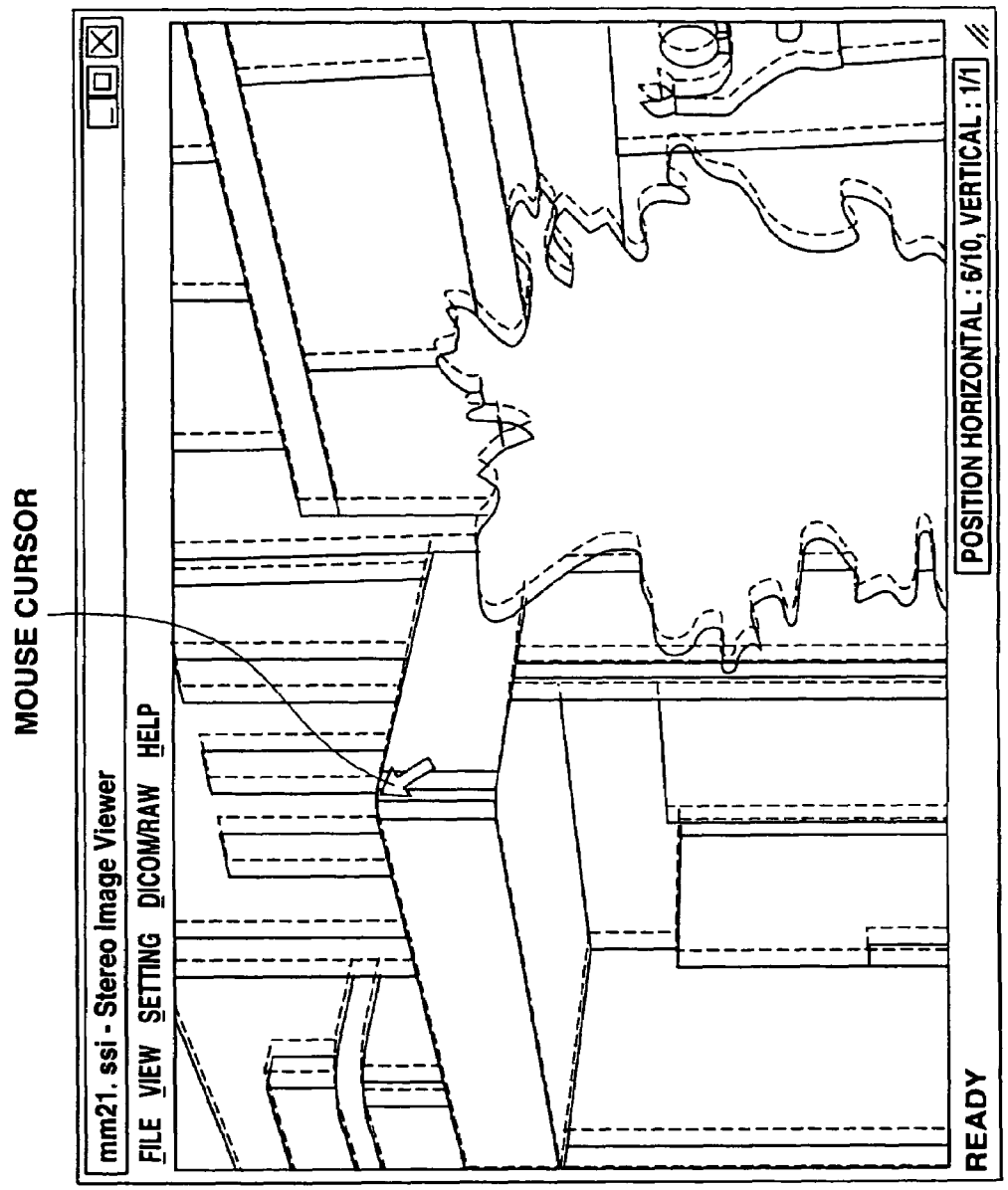
Figure 50:
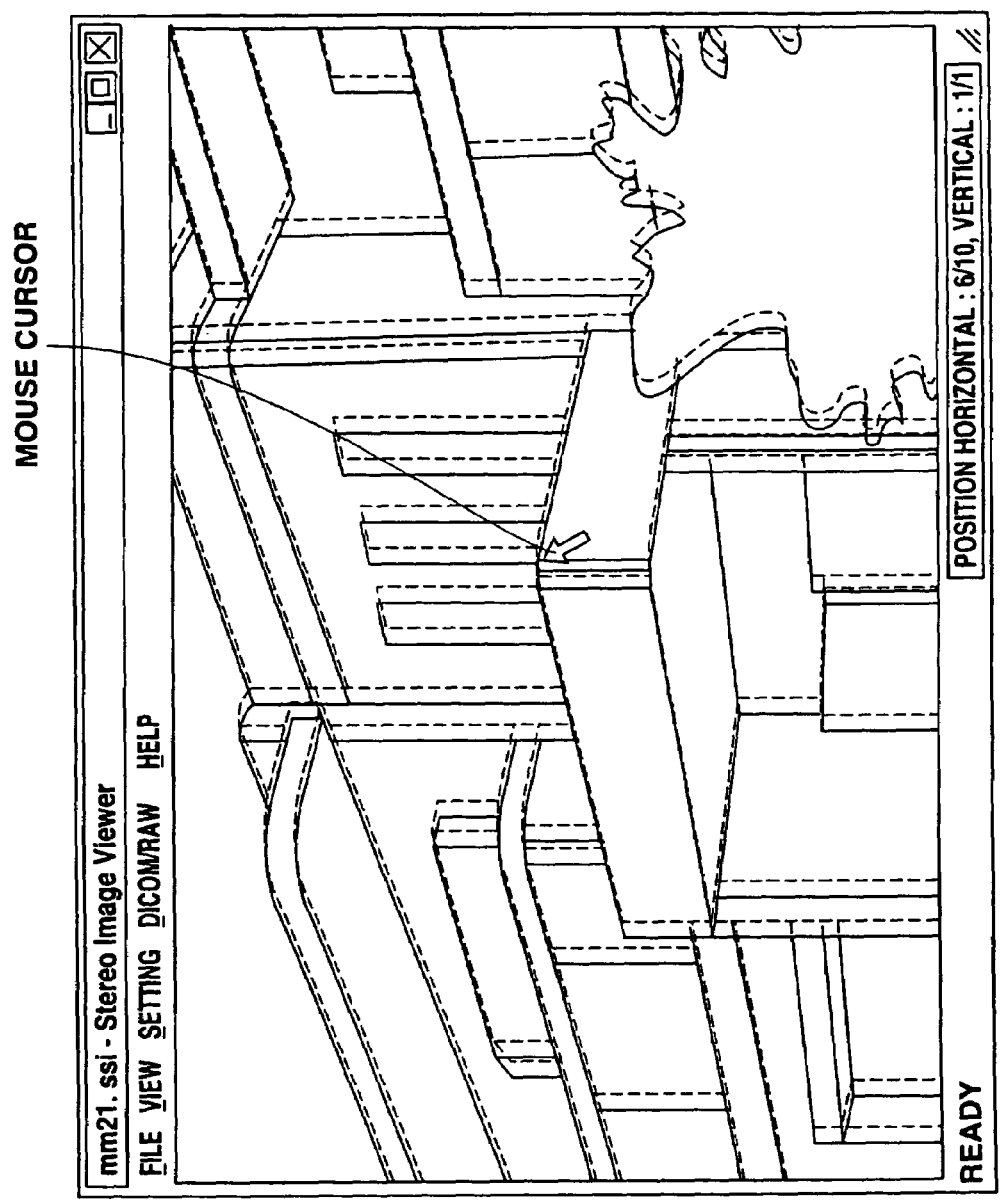

FIGS. 48–50 are diagrams, each illustrating a method for displaying a stereoscopic image on a main window in the stereoscopic-image display program. In these figures, since all tool bars are not related to the following description, they are in a non-displayed state. In the following description, an XY coordinate system in which the upper left corner of a desk-top window (the entire display surface of the display) is made the origin, the rightward direction is made the positive direction of the x axis, and the downward direction is made the positive direction of the y axis is used.

In this case, the x coordinate and the y coordinate of the upper left corner of the main window are represented by Xm and Ym, and the x coordinate and the y coordinate of the upper left corner of the stereoscopic image displayed on the main window are represented by Xs and Ys, respectively. The width and the height of the main window are represented by Wm and Hm, and the width and the height of the stereoscopic image are represented by Ws and Hs, respectively.

In the following description, it is assumed that the direct-view display 102 is designed so as to display an image for the left eye and an image for the right eye on even lines and on odd lines, respectively. It is also assumed that the stereoscopic-image-data processing unit 306 shown in FIG. 14 forms a stereoscopic image by inserting an image for the left eye and an image for the right eye on even lines and on odd lines, respectively.

FIG. 48 is a diagram illustrating a state of display of a stereoscopic image when the size of display of the stereoscopic image is smaller than the size of the main window. When the size of display of the stereoscopic image is smaller than the size of the main window, the stereoscopic image is arranged at the center of the main window. At that time, the stereoscopic-image display program calculates the x coordinate and the y coordinate of the upper left corner of the stereoscopic image according to the following formula (1), and formulas (2) and (3), respectively:

$$Xs = (Wm - Ws)/2 + Xm \quad (1)$$

$$Ys' = (Hm - Hs)/2 + Ym \quad (2)$$

$$Ys = Ys' + (Ys' \% 2) \quad (3).$$

In formula (3), (Ys' % 2) indicates a "remainder when dividing Ys' by 2", which has a value 0 or 1. By performing such calculations, even lines of the stereoscopic image are always displayed on even lines of the desk-top window. Hence, even if the display position of the main window moves in the vertical direction, the phenomenon that the left and the right of the stereoscopic image are seen by being inverted does not occur.

FIG. 49 is a diagram illustrating a state of display of a stereoscopic image when the size of display of the stereoscopic image is larger than the size of the main window. When the size of display of the stereoscopic image is larger than the size of the main window, in the initial state, the center of the stereoscopic image is arranged at the center of the main window. In this case, also, the stereoscopic-image display program calculates the x coordinate and the y coordinate of the upper left corner of the stereoscopic image according to formula (1), and formulas (2) and (3), respectively. However, when the size of display of the stereoscopic image is larger than the size of the main window, Ys' in formula (2) has a negative value, (Ys' % 2) in formula (3) has a value 0 or −1, and Ys in formula (3) has a negative value.

In FIG. 49, if the mouse cursor is moved to an arbitrary position on the stereoscopic image, and the left button of the mouse is clicked at that position, then, as shown in FIG. 50, the position of display of the stereoscopic image is changed so that the clicked position comes to the center of the main window. FIG. 50 is a diagram illustrating the state of display of the stereoscopic image when the left button of the mouse is clicked at an arbitrary position on the stereoscopic image.

At that time, the position of the mouse cursor simultaneously moves in accordance with the movement of the position of display of the stereoscopic image, and the stereoscopic-image display program recalculates the position of display of the stereoscopic image and the position of the mouse cursor according to the following procedure.

The x coordinate and the y coordinate of the mouse cursor when the left button of the mouse is clicked are represented by $Xc$ and $Yc$, respectively, and the amount of movement of the position of display of the stereoscopic image in the x direction and in the y direction are represented by $\delta x$ and $\delta y$, respectively.

At that time, provisional values for $\delta x$ and $\delta y$ can be calculated according to the following formulas (4) and (5):

$$\delta x' = Wm/2 + Xm - Xc \quad (4)$$

$$\delta y' = Hm/2 + Ym - Yc \quad (5).$$

When the x coordinate and the y coordinate of the stereoscopic image after the movement are represented by $Xns$ and $Yns$, respectively, provisional values for $Xns$ and $Yns$ can be calculated according to the following formulas (6) and (7):

$$Xns' = Xs + \delta x' \quad (6)$$

$$Yns' = Ys + \delta y' \quad (7).$$

When $Xns'$ is larger than $Xm$, $Xns'$ is recalculated using formula (8) below. When $Xns'$ is smaller than $(Xm+Wm-Ws)$, $Xns'$ is recalculated using formula (9) below. When $Yns'$ is larger than $Ym$, $Yns'$ is recalculated using formula (10) below. When $Yns'$ is smaller than $(Ym+Hm-Hs)$, $Yns'$ is recalculated using formula (11) below.

According to such recalculations, the situation that although the size of display of the stereoscopic image is larger than the size of the main window, a part of the window becomes blank (only a background color is displayed) because the amount of movement of the stereoscopic image is too large can be avoided.

$$Xns' = Xm \quad (8)$$

$$Xns' = Xm + Wm - Ws \quad (9)$$

$$Yns' = Ym \quad (10)$$

$$Yns' = Ym + Hm - Hs \quad (11).$$

After performing the above-described calculations, the position of display of the stereoscopic image after the movement can be calculated using the following formulas (12) and (13):

$$Xns = Xns' \quad (12)$$

$$Yns = Yns' + (Yns' \% 2) \quad (13).$$

The amount of movement of the position of display of the stereoscopic image can be calculated according to the following formulas (14) and (15):

$$\delta x = Xns - Xs \quad (14)$$

$$\delta y = Yns - Ys \quad (15).$$

When the x coordinate and the y coordinate of the mouse cursor after the movement are represented by $Xnc$ and $Ync$, respectively, $Xnc$ and $Ync$ can be calculated according to the following formulas (16) and (17):

$$Xnc = Xc + \delta x \quad (16)$$

$$Ync = Yc + \delta y \quad (17).$$

By using the above-described formulas, it is possible to move the clicked position on the stereoscopic image to the center of the main window, and also to move the position of the mouse in accordance with the movement of the position of display of the stereoscopic image. Usually, the user sees the mouse cursor when clicking the mouse. Hence, if the mouse cursor moves in accordance with the position of display of the stereoscopic image, the movement of the position of display of the stereoscopic image can be intuitively understood.

In the foregoing description of FIGS. 48–50, in order to facilitate understanding, the formulas for the x coordinate and the formulas for the y coordinate are shown as a group. However, calculation for the x coordinate and calculation for the y coordinate are entirely independent of each other. Accordingly, a case in which although the width of the stereoscopic image is smaller than the width of the main window, the height of the stereoscopic image is larger than the height of the main window, or a case in which the relationship between the width and the height is inverted from the above-described relationship, may also be dealt with by appropriately combining the description relating to the x coordinate and the description relating to the y coordinate shown in FIGS. 48–50.

The present invention may be applied to a system comprising a plurality of apparatuses (such as a host computer, a data communication apparatus, a data input terminal, a display and the like in a distributed computer environment), or to an apparatus comprising a single unit (for example, an apparatus in which a keyboard, a pointing device, a display and the like are integrated, such as a note PC).

The object of the present invention may, of course, also be achieved by supplying a system or an apparatus with a storage medium storing program codes of software (a stereoscopic-image display program) for realizing the functions of the above-described embodiments, and reading and executing the program codes stored in the storage medium by means of a computer (or a CPU or an MPU) of the system or the apparatus. In such a case, the program codes themselves read from the storage medium realize the functions of the above-described embodiments, so that the storage medium storing the program codes constitutes the present invention.

For example, a floppy disk, a hard disk, an optical disk, a magnetooptical disk, a CD-ROM, a CD-R, a CD-RAM, a CD-RW, a magnetic tape, a nonvolatile memory card/memory stick, a ROM or the like may be used as the storage medium for supplying the program codes.

The present invention may, of course, be applied not only to a case in which the functions of the above-described embodiments are realized by executing program codes read by a computer, but also to a case in which an OS or the like operating in a computer executes a part or the entirety of actual processing, and the functions of the above-described embodiments are realized by the processing.

The present invention may, of course, be applied to a case in which, after writing program codes read from a storage medium into a memory provided in a function expanding board inserted into a computer or in a function expanding unit connected to the computer, a CPU or the like provided in the function expanding board or the function expanding unit performs a part or the entirety of actual processing, and the functions of the above-described embodiments are realized by the processing.

According to the third embodiment, a plurality of stereoscopic images can be displayed in an exact order for general purposes, without the user's input of image-file names of a pair of left and right stereoscopic images every time.

It is also possible to store and read setting values relating to formation or display of a stereoscopic image set by the user, for general purposes.

Even if the display characteristic of a display is inverted in the horizontal direction for some reasons, or the user's position to see a direct-view display is inappropriate, by changing the method for forming dr displaying a stereoscopic image in accordance with respective conditions, it is possible to display a stereoscopic image which causes the user to have a normal stereoscopic sense.

The individual components shown in outline or designated by blocks in the drawings are all well known in the stereoscopic-image display apparatus arts and their specific construction and operation are not critical to the operation or the best mode for carrying out the invention.

While the present invention has been described with respect to what are presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A stereoscopic-image display apparatus for reading and displaying image files of a pair of left and right stereoscopic images, said apparatus comprising:

left-and-right-interval input means for inputting, when a numeral consecutively changing so as to correspond to a change in the contents of an image is given to a part of each of respective file names of a plurality of image files, each including an image which rotates with a constant angle in a predetermined direction, and when two image files separated by an interval between the values of numerals, each given to the part of the corresponding file name, are made to be image files of a pair of left and right stereoscopic images, the interval between the numerical values in accordance with an instruction of a user;

stereoscopic-image-file determination means for automatically determining two image files, each including one of two numerals having the interval between the numerical values input by said left-and-right-interval input means as a part of a file name, as image files of a pair of left and right stereoscopic images; and stereoscopic-image display means for displaying the image files of the stereoscopic images determined by said stereoscopic-image-file determination means in an ascending order or a descending order of the values of numerals, each given to the part of the corresponding image-file name.

2. An apparatus according to claim 1, further comprising stereoscopic-image-file-name recording means for recording the image-file names of the stereoscopic images determined by said stereoscopic-image-file determination means in a predetermined file in an ascending order or a descending order of the values of the numerals, each given to the part of the corresponding image-file name, wherein said stereoscopic-image display means reads and displays image-file names of a plurality of stereoscopic images recorded by said stereoscopic-image-file-name recording means in an order of recording.

3. An apparatus according to claim 2, further comprising recording-file-name input means for inputting in advance a file name of a file to be utilized by said stereoscopic-image-file-name recording means as a recording file, in accordance with an instruction of the user.

4. A stereoscopic-image display apparatus for reading and displaying image files of a pair of left and right stereoscopic images, said apparatus comprising:

left-and-right-frame-interval input means for inputting, when a plurality of image frames, each including an image which rotates with a constant angle in a predetermined direction, are stored in an image file in an order of changes of the contents of respective images, and when two image frames separated by a predetermined frame interval from among the plurality of image frames stored in the image file are made to be a pair of left and right stereoscopic images, the frame interval in accordance with an instruction of a user;

stereoscopic-image determination means for automatically determining two image files having the frame interval input by said left-and-right-frame-interval input means as a pair of left and right stereoscopic images; and stereoscopic-image display means for displaying the stereoscopic images determined by said stereoscopic-image determination means in an order of storage of the image frames.

5. A stereoscopic-image display apparatus for reading and displaying image files of a pair of left and right stereoscopic images, said apparatus comprising:

left-and-right-frame-interval input means for inputting, when a plurality of image frames, each including an image which rotates with a constant angle in a predetermined direction, are stored in a plurality of image files which are referred from a file in an order of changes of the contents of respective images, and when two image frames separated by a predetermined frame interval from among the plurality of image frames stored in the plurality of image files which are referred from the file are made to be a pair of left and right stereoscopic images, the frame interval in accordance with an instruction of a user;

stereoscopic-image determination means for automatically determining two image files having the frame interval input by said left-and-right-frame-interval input means as a pair of left and right stereoscopic images; and stereoscopic-image display means for displaying a stereoscopic image represented by the pair of left and right stereoscopic images determined by said stereoscopic-image determination means in an order of reference from the file.

6. An apparatus according to claim 5, further comprising stereoscopic-image-position display means for displaying to which numerical order of a plurality of stereoscopic images the currently displayed stereoscopic image belongs.

7. An apparatus according to claim 6, further comprising display-order inversion means for inverting the order of display of stereoscopic images.

8. A stereoscopic-image display method for reading and displaying image files of a pair of left and right stereoscopic images, said method comprising:
- a left-and-right-interval input step of inputting, when a consecutively changing numeral corresponding to a change in the contents of an image is given to a part of each of respective file names of a plurality of image files, each including an image which rotates with a constant angle in a predetermined direction, and when two image files separated by an interval between the values of numerals, each given to the part of the corresponding file name, are made to be image files of a pair of left and right stereoscopic images, the interval between the numerical values in accordance with an instruction of a user;
- a stereoscopic-image-file determination step of automatically determining two image files, each including one of two numerals having the interval between the numerical values input in said left-and-right-interval input step as a part of a file name, as image files of a pair of left and right stereoscopic images; and
- a stereoscopic-image display step of displaying the image files of the stereoscopic images determined in said stereoscopic-image-file determination step in an ascending order or a descending order of the values of numerals, each given to the part of the corresponding image-file name.

9. A method according to claim 8, further comprising a stereoscopic-image-file-name recording step of recording the image-file names of the stereoscopic images determined in said stereoscopic-image-file determination step in a predetermined file in an ascending order or a descending order of the values of the numerals, each given to the part of the corresponding image-file name, wherein in said stereoscopic-image display step, image-file names of a plurality of stereoscopic images recorded in said stereoscopic-image-file-name recording step are read and displayed in an order of recording.

10. A method according to claim 9, further comprising a recording-file-name input step of inputting in advance a file name of a file to be utilized in said stereoscopic-image-file-name recording step as a recording file, in accordance with an instruction of the user.

11. A stereoscopic-image display method for reading and displaying image files of a pair of left and right stereoscopic images, said method comprising:
- a left-and-right-frame-interval input step of inputting, when a plurality of image frames, each including an image which rotates with a constant angle in a predetermined direction, are stored in an image file in an order of changes of the contents of respective images, and when two image frames separated by a predetermined frame interval from among the plurality of image frames stored in the image file are made to be a pair of left and right stereoscopic images, the frame interval in accordance with an instruction of a user;
- a stereoscopic-image determination step of automatically determining two image files having the frame interval input in said left and-right-frame-interval input step as a pair of left and right stereoscopic images; and
- a stereoscopic-image display step of displaying the stereoscopic images determined in said stereoscopic-image determination step in an order of storage of the image frames.

12. A stereoscopic-image display method for reading and displaying image files of a pair of left and right stereoscopic images, said method comprising:
- a left-and-right-frame-interval input step of inputting, when a plurality of image frames, each including an image which rotates with a constant angle in a predetermined direction, are stored in a plurality of image files which are referred from a file in an order of changes of the contents of respective images, and when two image frames separated by a predetermined frame interval from among the plurality of image frames stored in the plurality of image files which are referred from the file are made to be a pair of left and right stereoscopic images, the frame interval in accordance with an instruction of a user;
- a stereoscopic-image determination step of automatically determining two image files having the frame interval input in said left-and-right-frame-interval input step as a pair of left and right stereoscopic images; and
- a stereoscopic-image display step of displaying the stereoscopic images determined in said stereoscopic-image determination step in an order of reference from the file.

13. A method according to claim 12, further comprising a stereoscopic-image-position display step of displaying to which numerical order of a plurality of stereoscopic images the currently displayed stereoscopic image belongs.

14. A method according to claim 13, further comprising a display-order inversion step of inverting the order of display of stereoscopic images.

15. A storage medium for storing a program, capable of being executed by a computer, for reading and displaying image files of a pair of left and right stereoscopic images, said program comprising:
- a left-and-right-interval input procedure of inputting, when a consecutively changing numeral corresponding to a change in the contents of an image is given to a part of each of respective file names of a plurality of image files, each including an image which rotates with a constant angle in a predetermined direction, and when two image files separated by an interval between the values of numerals, each given to the part of the corresponding file name, are made to be image files of a pair of left and right stereoscopic images, the interval between the numerical values in accordance with an instruction of a user;
- a stereoscopic-image-file determination procedure of automatically determining two image files, each including one of two numerals having the interval between the numerical values input in said left-and-right-interval input procedure as a part of a file name, as image files of a pair of left and right stereoscopic images; and
- a stereoscopic-image display procedure of displaying the image files of the stereoscopic images determined ins aid stereoscopic-image-file determination procedure in an ascending order or a descending order of the values of numerals, each given to the part of the corresponding image file name.

16. A storage medium according to claim 15, said program further comprising a stereoscopic-image-file-name recording procedure of recording the image-file names of the stereoscopic images determined in said stereoscopic-image-file determination procedure in a predetermined file in an ascending order or a descending order of the values of the numerals, each given to the part of the corresponding image-file name, wherein in said stereoscopic-image display procedure, image-file names of a plurality of stereoscopic images recorded in said stereoscopic-image-file-name recording procedure are read and displayed in an order of recording.

17. A storage medium according to claim 16, said program further comprising a recording-file-name input procedure of inputting in advance a file name of a file to be utilized in said stereoscopic-image-file-name recording procedure as a recording file, in accordance with an instruction of the user.

18. A storage medium for storing a program, capable of being executed by a computer, for reading and displaying image files of a pair of left and right stereoscopic images, said program comprising:
   a left-and-right-frame-interval input procedure of inputting, when a plurality of image frames, each including an image which rotates with a constant angle in a predetermined direction, are stored in an image file in an order of changes of the contents of respective images, and when two image frames separated by a predetermined frame interval from among the plurality of image frames stored in the image file are made to be pair of left and right stereoscopic images, the frame interval in accordance with an instruction of a user;
   a stereoscopic-image determination procedure of automatically determining two image files having the frame interval input in said left-and-right-frame-interval input procedure as a pair of left and right stereoscopic images; and
   a stereoscopic-image display procedure of displaying the stereoscopic images determined in said stereoscopic-image determination procedure in an order of storage of the image frames.

19. A storage medium for storing a program, capable of being executed by a computer, for reading and displaying image files of a pair of left and right stereoscopic images, said program comprising:
   a left-and-right-frame-interval input procedure of inputting, when a plurality of image frames, each including an image which rotates with a constant angle in a predetermined direction, are stored in a plurality of image files which are referred from a file in an order of changes of the contents of respectively images, and when two image frames separated by a predetermined frame interval from among the plurality of image frames stored in the plurality of image files which are referred from the file are made to be a pair of left and right stereoscopic images, the frame interval in accordance with an instruction of a user;
   a stereoscopic-image determination procedure of automatically determining two image files having the frame interval input in said left-and-right-frame-interval input procedure as a pair of left and right stereoscopic images; and
   a stereoscopic-image display procedure of displaying the stereoscopic images determined in said stereoscopic-image determination procedure in an order of reference from the file.

20. A storage medium according to claim 19, said program further comprising a stereoscopic-image-position display procedure of displaying to which numerical order of a plurality of stereoscopic images the currently displayed stereoscopic image belongs.

21. A storage medium according to claim 20, said program further comprising a display-order inversion procedure of inverting the order of display of stereoscopic images.

* * * * *

UNITED STATES PATENT AND TRADEMARK OFFICE
CERTIFICATE OF CORRECTION

| | | |
|---|---|---|
| PATENT NO. | : 7,064,754 B2 | |
| APPLICATION NO. | : 10/699801 | |
| DATED | : June 20, 2006 | |
| INVENTOR(S) | : Yoshio Iizuka et al. | |

It is certified that error appears in the above-identified patent and that said Letters Patent is hereby corrected as shown below:

[75] INVENTORS:

"Yoshio Iizuka, Kanagawa-ken (JP); Tomoaki Kawai, Kanagawa-ken (JP)" should read --Yoshio Iizuka, Kanagawa (JP); Tomoaki Kawai, Kanagawa (JP)--.

COLUMN 15:

Line 58, "Let" should read --Left--.

COLUMN 17:

Line 28, "Let" should read --Left--.

COLUMN 43:

Line 23, "dr" should read --or--.

COLUMN 46:

Line 58, "ins" should read --in--.
Line 59, "aid" should read --said--.

COLUMN 47:

Line 26, "pair" should read --a pair--.

UNITED STATES PATENT AND TRADEMARK OFFICE
CERTIFICATE OF CORRECTION

PATENT NO. : 7,064,754 B2
APPLICATION NO. : 10/699801
DATED : June 20, 2006
INVENTOR(S) : Yoshio Iizuka et al.

It is certified that error appears in the above-identified patent and that said Letters Patent is hereby corrected as shown below:

COLUMN 48:

Line 10, "respectively" should read --respective--.

Signed and Sealed this

Twenty-fifth Day of December, 2007

JON W. DUDAS
*Director of the United States Patent and Trademark Office*